US010375439B2

(12) United States Patent
Hirabayashi et al.

(10) Patent No.: US 10,375,439 B2
(45) Date of Patent: Aug. 6, 2019

(54) INFORMATION PROCESSING APPARATUS AND INFORMATION PROCESSING METHOD

(71) Applicant: SONY CORPORATION, Tokyo (JP)

(72) Inventors: Mitsuhiro Hirabayashi, Tokyo (JP); Toru Chinen, Kanagawa (JP); Yuki Yamamoto, Tokyo (JP); Runyu Shi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/311,950

(22) PCT Filed: May 22, 2015

(86) PCT No.: PCT/JP2015/064674
§ 371 (c)(1),
(2) Date: Nov. 17, 2016

(87) PCT Pub. No.: WO2015/182492
PCT Pub. Date: Dec. 3, 2015

(65) Prior Publication Data
US 2017/0127118 A1   May 4, 2017

(30) Foreign Application Priority Data

May 30, 2014 (JP) ................................ 2014-113486
Jun. 6, 2014 (JP) ................................ 2014-117330

(51) Int. Cl.
*G06F 17/00* (2019.01)
*H04N 21/439* (2011.01)
(Continued)

(52) U.S. Cl.
CPC ........... *H04N 21/439* (2013.01); *G10K 15/02* (2013.01); *G10L 19/00* (2013.01); *G10L 19/008* (2013.01);
(Continued)

(58) Field of Classification Search
CPC ..... G10L 19/008; G10L 19/00; H04N 21/439; H04N 21/233; H04N 21/235; G10K 15/02;
(Continued)

(56) References Cited

U.S. PATENT DOCUMENTS

2004/0146285 A1* 7/2004 Matsui ................. G11B 27/005
386/244
2006/0209652 A1   9/2006 Toms et al.
(Continued)

FOREIGN PATENT DOCUMENTS

CN   102577309 A   7/2012
CN   102870424 A   1/2013
(Continued)

OTHER PUBLICATIONS

"Text of ISO/IEC 23009-1:2012 DAM 1 Support for Event Messages and Extended Audio Channel Configuration", ISO/IEC JTC1/SC29/WG11, Coding of Moving Pictures and Audio, Shanghai, China, Nov. 2012, 35 pages.
(Continued)

*Primary Examiner* — Joseph Saunders, Jr.
(74) *Attorney, Agent, or Firm* — Chip Law Group

(57) ABSTRACT

The present disclosure relates to an information processing apparatus and an information processing method which are capable of improving an efficiency of acquiring a predetermined type of audio data among a plurality of types of audio data. Audio data of a predetermined track is acquired in one audio file in which audio data of 3D audio is divided into a plurality of tracks depending on the type of 3D audio and the tracks are arranged, the audio data of each track being successively arranged in the file for a predetermined length of time. The present disclosure is applicable to, for example, an information processing system including a file generation device that generates a file, a Web server that records a file generated by the file generation device, and a video playback terminal that plays back a file.

10 Claims, 70 Drawing Sheets

(51) Int. Cl.
*G11B 27/00* (2006.01)
*G10K 15/02* (2006.01)
*G10L 19/00* (2013.01)
*G10L 19/008* (2013.01)
*H04N 21/233* (2011.01)
*H04N 21/2343* (2011.01)
*H04N 21/81* (2011.01)
*H04N 21/845* (2011.01)

(52) U.S. Cl.
CPC .......... *G11B 27/00* (2013.01); *H04N 21/233* (2013.01); *H04N 21/23439* (2013.01); *H04N 21/8106* (2013.01); *H04N 21/8456* (2013.01)

(58) Field of Classification Search
CPC ........ G06F 13/00; H04S 2420/11; H04S 7/30; G11B 20/12; G11B 27/34; G11B 27/00
See application file for complete search history.

(56) References Cited

U.S. PATENT DOCUMENTS

| | | | |
|---|---|---|---|
| 2012/0002947 A1* | 1/2012 | Rhyu | G11B 27/034 386/248 |
| 2012/0233345 A1 | 9/2012 | Hannuksela | |
| 2015/0195327 A1* | 7/2015 | Bouazizi | H04L 65/4076 709/219 |

FOREIGN PATENT DOCUMENTS

| | | |
|---|---|---|
| JP | 2013-240111 A | 11/2013 |
| JP | 2014-096766 A | 5/2014 |
| WO | 2012/046437 A1 | 4/2012 |
| WO | 2012/8046437 A1 | 4/2012 |
| WO | 2014/057896 A1 | 4/2014 |

OTHER PUBLICATIONS

Text of ISO/IEC 23009-1:2012 DAM 1 Support for Event Messages and Extended Audio Channel Configuration—Information Technology—Coding of Audio-Visual Objects—Part 12: Iso Base Media File Format, Technical Corrigendum 5, ISO/IEC JTC1/SC29/WG11, Nov. 2012, pp. 47.

"ISO/IEC 14496-12", Information technology—Coding of audio-visual objects, Oct. 1, 2005, 94 pages.

"3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH), (Release 12)", 3GPP TS 26.247, Version 12.2.0, Mar. 2014, 118 pages.

Extended European Search Report of Ep Application No. 15799025_0, issued on Nov. 14, 2017, 11 pp. Of Eesr.

Office Action for CN Patent Application No. 201580026922.2, dated Nov. 5, 2018, 07 pages of Office Action and 08 pages of English Translation.

* cited by examiner

FIG. 18

```
aligned(8) class GeneralSubsegmentIndexBox extends FullBox('ssix', 0, 0) {
    grouping_type int(32);
    unsigned int(32) subsegment_count;
    for(i=1;i<=subsegment_count;i++)
    {
        unsigned int(32) entry_count;
        for (j=1;j<= entry_count;j++) {
            unsigned int(8) entry_index;
            unsigned int(24) range_size;
        }
    }
}
```

FIG. 20

A
```
Class AudioObjectSampleGroupEntry extends AudioSampleGroupEntry('obja') {
    unsigned int(32) audio_object_id;
    unsigned int(32) reserved=0;
}
```

B
```
Sample Group Description Box("sgpd")
Grouping_type="obja"
Entry_count=4
```
- AudioObjectSampleGroupEntry("obja") "1"
- AudioObjectSampleGroupEntry("obja") "2"
- AudioObjectSampleGroupEntry("obja") "3"
- AudioObjectSampleGroupEntry("obja") "4"

FIG. 21

```
aligned(8) class TypeAssignmentBox extends FullBox('typa', 0,0)
{
    unsigned int(8) entry_count;
    for (j=1;j<= entry_count;j++) {
        unsigned int(32)track_id;
        unsigned int(7)assignment_type;
        if(assignment_type == 0) {
            unsigned int(32) grouping_type;
        }
        else if (assignment_type == 1) {
            unsigned int(32) grouping_type;
            unsigned int(32) grouping_type_parameter;
        }
    }
    // other assignment_type values are reserved
}
```

FIG. 34

```
class MHASampleEntry() extends AudioSampleEntry('mha') {
    MHAConfigurationBox config;
    MHAViewingAngleBox config;                      //optional
    MPEG4BitRateBox();                              // optional
    MPEG4ExtensionDescriptorsBox ();                // optional
} class MHAConfigurationBox extends Box('mhaC') {
    MHADecoderConfigurationRecord() MHAConfig;
} aligned(8) class MHADecoderConfigurationRecord {
    unsigned int(8)  configurationVersion = 1;
    unsigned int(8)  MPEGH_AudioProfile;
    unsigned int(8)  MPEGH_AudioLevel;
    unsigned int(8)  referenceChannelLayout;
    unsigned int(16) mpeghConfigLength;
    bit(8*mpeghConfigLength) mpeghSideConfig;
} class MHAViewingAngleConfigurationBox() extends Box('mhvs') { MHAVCconfig;
    MHAViewingAngleConfigurationRecord() MHAVConfig;
} aligned(8) class MHAViewingAngleConfigurationRecord {
    unsigned int(8)  configurationVersion = 1;
    unsigned int(16) width;
    unsigned int(16) height;
    unsigned int(16) theta;
    unsigned int(16) track2;
    unsigned int(16) gamma1;
    unsigned int(16) gamma2;
}
```

ASSUMPTION FOR CALCULATION OF COORDINATES OF THIS track
WidthxHeight INFORMATION USING pixels OF Video,
LIKELIHOOD INFORMATION IN VERTICAL AND HORIZONTAL DIRECTIONS OF Audio
=> ON THE BASIS OF THESE PIECES OF INFORMATION, audio IS MAPPED TO VIDEO pixel COORDINATES

FIG. 35

```
class MHAChannelAudioSampleEntry() extends AudioSampleEntry('hac1') {
    MHAChannelAudioConfigurationBox config;
    MPEG4BitRateBox();              // optional
    MPEG4ExtensionDescriptorsBox ();  // optional
} class MHAChannelAudioConfigurationBox() extends Box('hacC') {
    MHAChannelAudioDecoderConfigurationRecord() MHACAConfig;
} aligned(8) class MHAChannelAudioDecoderConfigurationRecord {
    unsigned int(8)  configurationVersion = 1;
    unsigned int(8)  MPEGHAudioProfile;
    unsigned int(8)  MPEGHAudioLevel;
}
```

Profile/Level INFORMATION NECESSARY FOR decoding Channel Audio

FIG. 37

```
class MHAHOAAudioSampleEntry() extends AudioSampleEntry('hah1') {
    MHAHOAAudioConfigurationBox config;
    MPEG4BitRateBox();              // optional
    MPEG4ExtensionDescriptorsBox (); // optional
} class MHAHOAAudioConfigurationBox() extends Box('hahC') {
    MHAHOAAudioDecoderConfigurationRecord() MHAHAConfig;
} aligned(8) class MHAHOAAudioDecoderConfigurationRecord {
    unsigned int(8)  configurationVersion = 1;
    unsigned int(8)  MPEGHAudioProfile;
    unsigned int(8)  MPEGHAudioLevel;
}
```

Profile/Level INFORMATION NECESSARY FOR HOA audio STORED IN THIS track

FIG. 38

```
class MHAMetadataSampleEntry() extends AudioSampleEntry('ham1') {
    MHAMetadataConfigurationBox config;
    MPEG4BitRateBox();                      // optional
    MPEG4ExtensionDescriptorsBox ();        // optional
} class MHAMetadataConfigurationBox() extends Box('hahC') {
    MHAMetadataConfigurationRecord() MHAMConfig;
} aligned(8) class MHAMetadataConfigurationRecord {
    unsigned int(8)  configurationVersion = 1;
    unsigned int(16) reserved
}
```

FIG. 43

AudioType
1 channel audio
2 HOA audio
3 object audio
4 metadata

Priority IS
DEFINED BY 23008-3

| contentKind | description |
|---|---|
| 0 | undefined |
| 1 | complete main |
| 2 | dialogue |
| 3 | music |
| 4 | effect |
| 5 | mixed |
| 6 | LFE |
| 7 | voiceover |
| 8 | spoken subtitle |
| 9 | audiodescription/visually impaired |
| 10 | commentary |
| 11 | hearing impaired |
| 12 | emergency |
| 13-15 | reserved |

FIG. 52

```
class MHASampleEntry() extends AudioSampleEntry('mha2') {
    MHAConfigurationBox config;
    MPEG4BitRateBox();                    // optional
    MPEG4ExtensionDescriptorsBox ();      // optional
} class MHAConfigurationBox() extends Box('mhaC'){
    MHADecoderConfigurationRecord() MHAConfig;
} aligned(8) class MHADecoderConfigurationRecord {
    unsigned int(8)  configurationVersion = 1;
    unsigned int(8)  MPEGHAudioProfile;
    unsigned int(8)  MPEGHAudioLevel;
    unsigned int(8)  referenceChannelLayout;
    unsigned int(16) mpegh3daConfigLength;
    bit(8*mpegh3daConfigLength) mpegh3daConfig;
}
```

FIG. 54

| Syntax | No. of bits | Mnemonic |
|---|---|---|
| mpegh3daFrame() {<br>  usacIndependencyFlag;<br>  for (elemIdx=0; elemIdx<numElements; ++elemIdx) {<br>    if ( (usacElementType[elemIdx] != ID_USAC_EXT) &&<br>      (elementLengthPresent == 1) ) {<br>      elementLength<br>    }<br>    switch (usacElementType[elemIdx]) {<br>    case ID_USAC_SCE:<br>      mpegh3daSingleChannelElement(usacIndependencyFlag);<br>      break;<br>    case ID_USAC_CPE:<br>      mpegh3daChannelPairElement(usacIndependencyFlag);<br>      break;<br>    case ID_USAC_LFE:<br>      mpegh3daLfeElement(usacIndependencyFlag);<br>      break;<br>    case ID_USAC_EXT:<br>      mpegh3daExtElement(usacIndependencyFlag);<br>      break;<br>    }<br>  }<br>} | <br>1<br><br><br><br>16<br><br><br><br>elementLength, NOTE 1<br><br>elementLength, NOTE 1<br><br><br>elementLength, NOTE 1 | <br>uimsbf<br><br><br><br>uimsbf |

NOTE 1: if present, elementLength represents the length of the corresponding element it refers to in number of bits.

→ DEFINE extractor TO REFER TO EXTERNAL sub-sample AS mpeg3daExtElement

FIG. 55

| Bitstream Field | Value |
|---|---|
| usacExtElementType | ID_EXT_ELE_EXTRACTOR |
| usacExtElementConfigLength | 0 |
| usacExtElementDefaultLengthPresent | 0 |
| usacExtElementPayloadFrag | 0 |

STORE TYPE, OFFSET, AND SIZE INFORMATION OF REFERENCE sub-sample AS ACTUAL DATA

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2015/064674 filed on May 22, 2015, which claims priority benefit of Japanese Patent Application No. JP 2014-113486 filed in the Japan Patent Office on May 30, 2014 and also claims priority benefit of Japanese Patent Application No. JP 2014-117330 filed in the Japan Patent Office on Jun. 6, 2014. Each of the above-referenced applications is hereby incorporated herein by reference in its entirety.

TECHNICAL FIELD

The present disclosure relates to an information processing apparatus and an information processing method, and more particularly, to an information processing apparatus and an information processing method which are capable of improving the efficiency of acquiring a predetermined type of audio data among a plurality of types of audio data.

BACKGROUND ART

One of the recent most popular streaming services is the over-the-top video (OTT-V) via the Internet. The moving picture experts group phase-dynamic adaptive streaming over HTTP (MPEG-DASH) is widely used as its underlying technology (see, for example, Non-Patent Document 1).

In MPEG-DASH, a delivery server prepares a group of video data having different screen sizes and coding rates for one video content item, and a playback terminal requests a group of video data having an optimal screen size and coding rate depending on transmission line conditions, thus adaptive streaming delivery is achieved.

CITATION LIST

Non-Patent Document

Non-Patent Document 1: MPEG-DASH (Dynamic Adaptive Streaming over HTTP) (URL: http://mpeg.chiariglione.org/standards/mpeg-dash/media-presentation-description-and-segment-formats/text-isoiec-23009-12012-dam-1)

SUMMARY OF THE INVENTION

Problems to be Solved by the Invention

However, no consideration is given to an improvement in efficiency of acquiring a predetermined type of audio data among a plurality of types of audio data of a video content.

The present disclosure has been made in view of the above-mentioned circumstances and is capable of improving the efficiency of acquiring a predetermined type of audio data among a plurality of types of audio data.

Solutions to Problems

An information processing apparatus according to a first aspect of the present disclosure is an information processing apparatus including an acquisition unit that acquires audio data of a predetermined track in one file in which a plurality of types of audio data are divided into a plurality of tracks depending on the types and the tracks are arranged, the audio data of each track being successively arranged in the file for a predetermined length of time.

An information processing method according to the first aspect of the present disclosure corresponds to the information processing apparatus according to the first aspect of the present disclosure.

In the first aspect of the present disclosure, audio data of a predetermined track is acquired in one file in which a plurality of types of audio data are divided into a plurality of tracks depending on the types and the tracks are arranged, the audio data of each track being successively arranged in the file for a predetermined length of time.

An information processing apparatus according to a second aspect of the present disclosure is an information processing apparatus including a generation unit that generates one file in which a plurality of types of audio data are divided into a plurality of tracks depending on the types and the tracks are arranged, the audio data of each track being successively arranged in the file for a predetermined length of time.

An information processing method according to the second aspect of the present disclosure corresponds to the information processing apparatus according to the second aspect of the present disclosure.

In the second aspect of the present disclosure, one file is generated in which a plurality of types of audio data are divided into a plurality of tracks depending on the types and the tracks are arranged, the audio data of each track being successively arranged in the file for a predetermined length of time.

Note that the information processing apparatuses according to the first and second aspects can be implemented by causing a computer to execute a program.

Further, in order to achieve the information processing apparatuses according to the first and second aspects, a program executed by a computer can be provided by transmitting the program via a transmission medium, or by recording the program in a recording medium.

Effects of the Invention

According to a first aspect of the present disclosure, audio data can be acquired. Further, according to the first aspect of the present disclosure, a predetermined type of audio data among a plurality of types of audio data can be acquired efficiently.

According to the second aspect of the present disclosure, a file can be generated. Further, according to the second aspect of the present disclosure, a file that improves the efficiency of acquiring a predetermined type of audio data among a plurality of types of audio data can be generated.

BRIEF DESCRIPTION OF DRAWINGS

FIG. 18 is a diagram showing an exemplary description of gsix.

FIG. 20 is a diagram showing an exemplary description of AudioObjectSampleGroupEntry.

FIG. 21 is a diagram showing an exemplary description of a type assignment box.

FIG. 34 is a diagram showing an exemplary syntax of a sample entry of a base track shown in FIG. 33.

FIG. 35 is a diagram showing an exemplary syntax of a sample entry of a channel audio track shown in FIG. 33.

FIG. 37 is a diagram showing an exemplary syntax of a sample entry of an HOA audio track shown in FIG. 33.

FIG. 38 is a diagram showing an exemplary syntax of a sample entry of an object metadata track shown in FIG. 33.

FIG. 43 is a diagram showing a definition of Essential Property.

FIG. 52 is a diagram showing an exemplary syntax of a sample entry of a base track shown in FIG. 51.

FIG. 54 is a diagram showing an exemplary syntax of a base sample.

FIG. 55 is a diagram showing an example of data of an extractor.

MODE FOR CARRYING OUT THE INVENTION

Modes for carrying out the present disclosure (hereinafter referred to as embodiments) will be described below in the following order.
0. Premise of the present disclosure (FIGS. 1 to 30)
1. First embodiment (FIGS. 31 to 50)
2. Second embodiment (FIGS. 51 to 55)
3. Third embodiment (FIG. 56)
4. Fourth embodiment (FIGS. 57 to 67)
5. Fifth embodiment (FIG. 68)
6. Sixth embodiment (FIG. 69)
7. Seventh embodiment (FIG. 70)
<Premise of Present Disclosure>
(Outline of First Example of Information Processing System)

Figure 1:
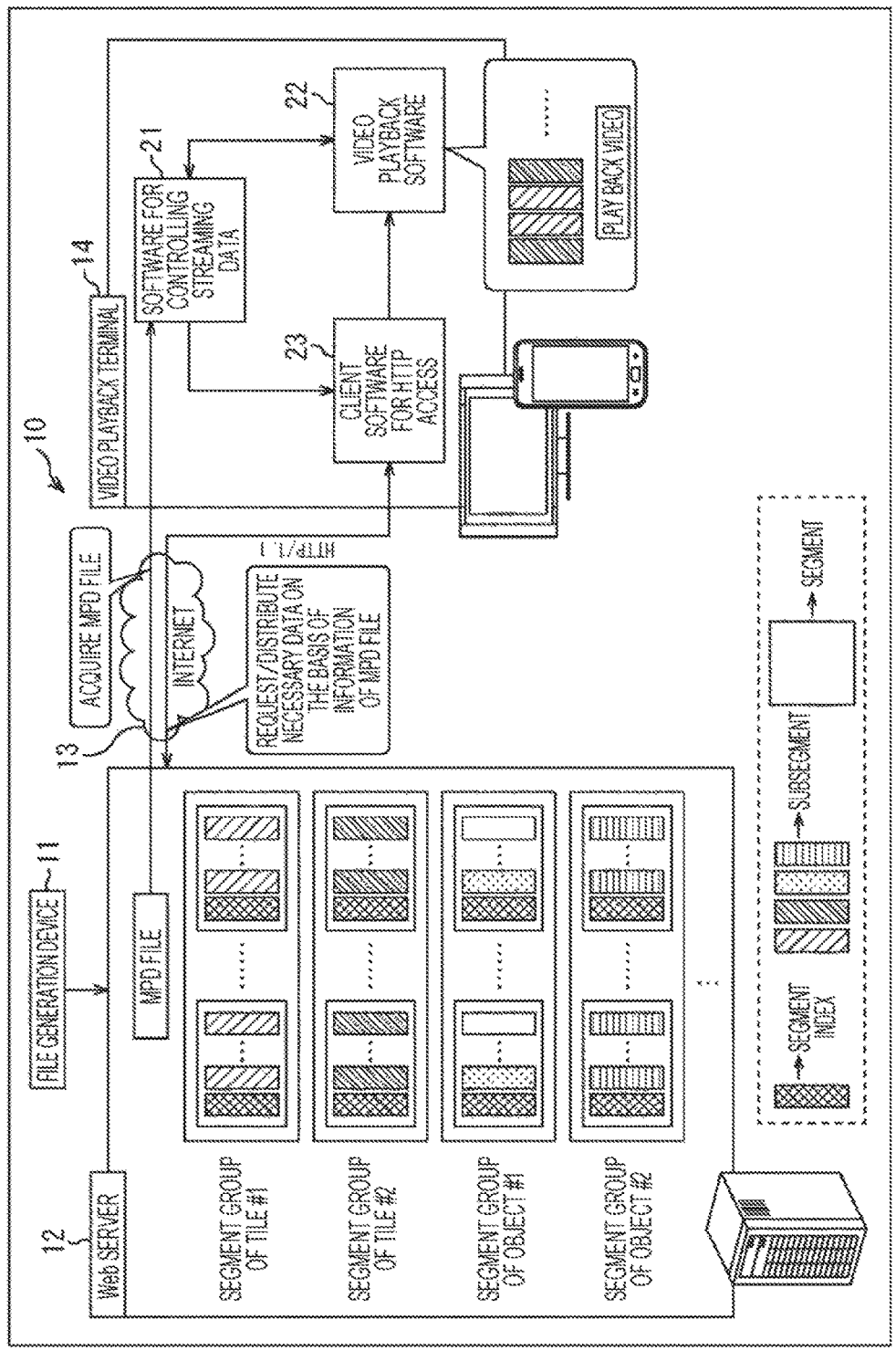
FIG. 1 is a diagram illustrating an outline of a first example of an information processing system to which the present disclosure is applied.

FIG. 1 is a diagram illustrating an outline of a first example of an information processing system to which the present disclosure is applied.

An information processing system 10 shown in FIG. 1 has a configuration in which a Web server 12, which is connected to a file generation device 11, and a video playback terminal 14 are connected via the Internet 13.

In the information processing system 10, the Web server 12 delivers (tiled streaming) image data of video content to the video playback terminal 14 in units of tiles by a method compliant with MPEG-DASH.

Specifically, the file generation device 11 acquires the image data of video content and encodes the image data in units of tiles to generate a video stream. The file generation device 11 processes the video stream of each tile into a file format at time intervals ranging from several seconds to approximately ten seconds, which is called a segment. The file generation device 11 uploads the resulting image file of each tile to the Web server 12.

Further, the file generation device 11 acquires audio data of video content for each object (to be described in detail later) and encodes the image data in units of objects to generate an audio stream. The file generation device 11 processes the audio stream of each object into a file format in units of segments, and uploads the resulting audio file of each object to the Web server 12.

Note that the object is a sound source. The audio data of each object is acquired through a microphone or the like attached to the object. The object may be an object such as a fixed microphone stand, or may be a moving body such as a person.

The file generation device 11 encodes audio metadata including object position information (audio position information) indicating the position of each object (the position at which audio data is acquired) and an object ID that is an ID unique to the object. The file generation device 11 processes the encoded data obtained by encoding the audio metadata into a file format in unit of segments, and uploads the resulting audio metafile to the Web server 12.

Further, the file generation device 11 generates a media presentation description (MPD) file (control information) managing an image file and audio file and including image frame size information that indicates the frame size of images of video content and tile position information that indicates the position of each tile on an image. The file generation device 11 uploads the MPD file to the Web server 12.

The Web server 12 stores the image file, audio file, audio metafile, and MPD file which are uploaded from the file generation device 11.

In the example shown in FIG. 1, the Web server 12 stores a segment group of a plurality of segments composed of image files of a tile with a tile ID "1" and a segment group of a plurality of segments composed of image files of a tile with a tile ID "2". The Web server 12 also stores a segment group of a plurality of segments composed of audio files of an object with an object ID "1" and a segment group of a plurality of segments composed of audio files of an object with an object ID "2". Although not shown, a segment group composed of audio metafiles is similarly stored.

Note that a file with a tile ID of i is hereinafter referred to as "tile #i", and an object with an object ID of i is hereinafter referred to as "object #i".

The Web server 12 functions as a transmitter and transmits the stored image file, audio file, audio metafile, MPD file, and the like to the video playback terminal 14 in response to a request from the video playback terminal 14.

The video playback terminal 14 executes, for example, software for control of streaming data (hereinafter referred to as control software) 21, video playback software 22, and client software for hypertext transfer protocol (HTTP) access (hereinafter referred to as access software) 23.

The control software 21 is software to control data delivered via streaming from the Web server 12. Specifically, the control software 21 allows the video playback terminal 14 to acquire the MPD file from the Web server 12.

Further, the control software 21 specifies a tile in a display area on the basis of the display area that is an area in an image used to display a video content indicated by the video playback software 22 and the tile position information included in the MPD file. The control software 21 instructs the access software 23 to issue a request to transmit an image file of the specified tile.

Further, the control software 21 instructs the access software 23 to issue a request to transmit the audio metafile. The control software 21 specifies an object corresponding to an image in the display area, on the basis of the display area, the image frame size information included in the MPD file, and the object position information included in the audio metafile. The control software 21 instructs the access software 23 to issue a request to transmit an audio file of the specified object.

The video playback software 22 is software to playback the image file and audio file acquired from the Web server 12. Specifically, when a user specifies a display area, the video playback software 22 indicates the specified display area to the control software 21. The video playback software 22 decodes the image file and audio file acquired from the Web server 12 in response to the indication, and the video playback software 22 synthesizes and outputs the decoded files.

The access software 23 is software to control communication with the Web server 12 via the Internet 13 using HTTP. Specifically, the access software 23 allows the video playback terminal 14 to transmit the request to transmit the image file, audio file, and audio metafile in response to the instruction from the control software 21. Further, the access software 23 allows the video playback terminal 14 to receive the image file, audio file, and audio metafile transmitted from the Web server 12 in response to the transmission request.

(Example of Tile)

Figure 2:
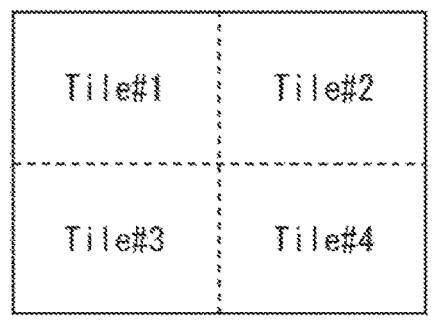
FIG. 2 is a diagram showing an example of a file.

FIG. 2 is a diagram showing an example of a tile.

As shown in FIG. 2, an image of video content is divided into a plurality of tiles. A tile ID that is a sequential number starting from 1 is assigned to each tile. In the example shown in FIG. 2, an image of video content is divided into four tiles #1 to #4.

(Explanation of Object)

Figure 3:
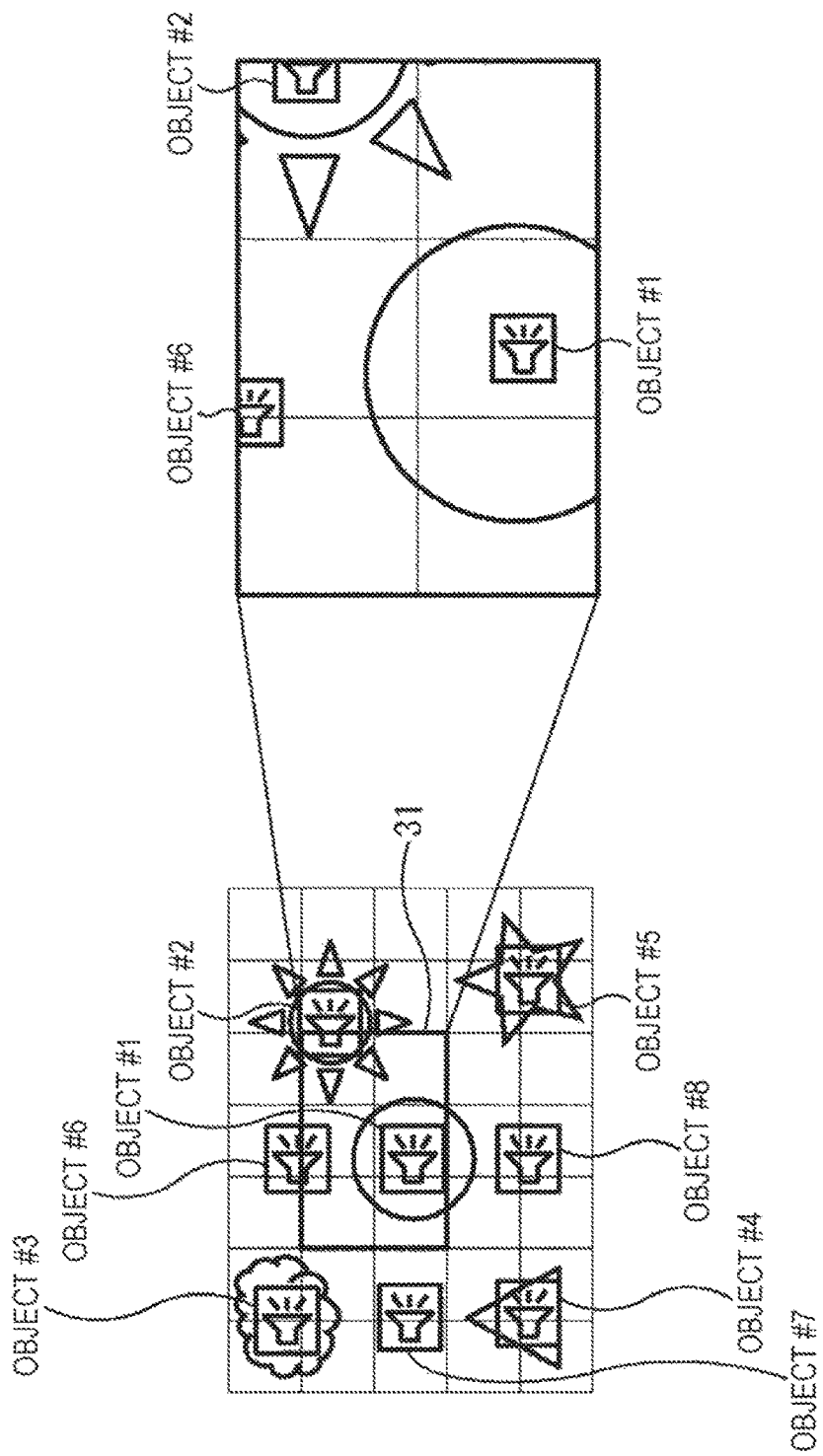
FIG. 3 is a diagram illustrating an object.

FIG. 3 is a diagram illustrating an object.

The example of FIG. 3 illustrates eight audio objects in an image acquired as an audio of video content. An object ID that is a sequential number starting from 1 is assigned to each object. Objects #1 to #5 are moving bodies, and objects #6 to #8 are fixed material bodies. Further, in the example of FIG. 3, the image of video content is divided into 7 (width)×5 (height) tiles.

In this case, as shown in FIG. 3, when the user specifies a display area 31 composed of 3 (width)×2 (height) tiles, the display area 31 includes only objects #1, #2, and #6. Thus, the video playback terminal 14 acquires and plays back, for example, only the audio files of the objects #1, #2, and #6 from the Web server 12.

The objects in the display area 31 can be specified on the basis of the image frame size information and the object position information as described below.

(Explanation of Object Position Information)

Figure 4:
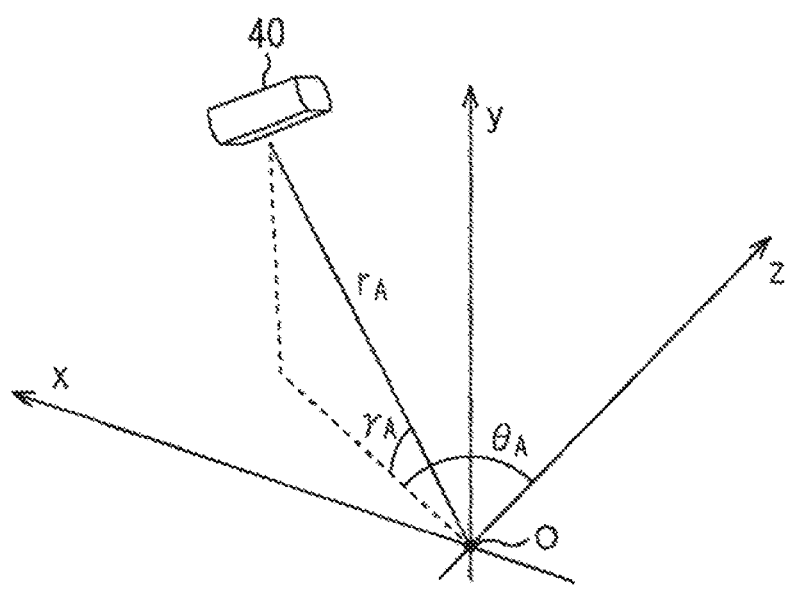
FIG. 4 is a diagram illustrating object position information.

FIG. 4 is a diagram illustrating the object position information.

As shown in FIG. 4, the object position information includes a horizontal angle $\theta_A$ ($-180° \leq \theta_A \leq 180°$), a vertical angle $\gamma_A$ ($-90° \leq \gamma_A \leq 90°$), and a distance $r_A$ ($0 < r_A$) of an object 40. The horizontal angle $\theta_A$ is the angle in the horizontal direction formed by the straight line connecting the object 40 and an origin O and a YZ plane, for example, when a shooting position in the center of an image may be set to the origin (base point) O; the horizontal direction of the image is set to an X direction; the vertical direction of the image is set to a Y direction; and the depth direction perpendicular to the XY plane is set to a Z direction. The vertical angle $\gamma_A$ is the angle in the vertical direction formed by the straight line connecting the object 40 and the origin O and the XZ plane. The distance $r_A$ is the distance between the object 40 and the origin O.

Furthermore, assume herein that the angle of the left and up rotation is set to a positive angle, and the angle of the right and down rotation is set to a negative angle.

(Explanation of Image Frame Size Information)

Figure 5:
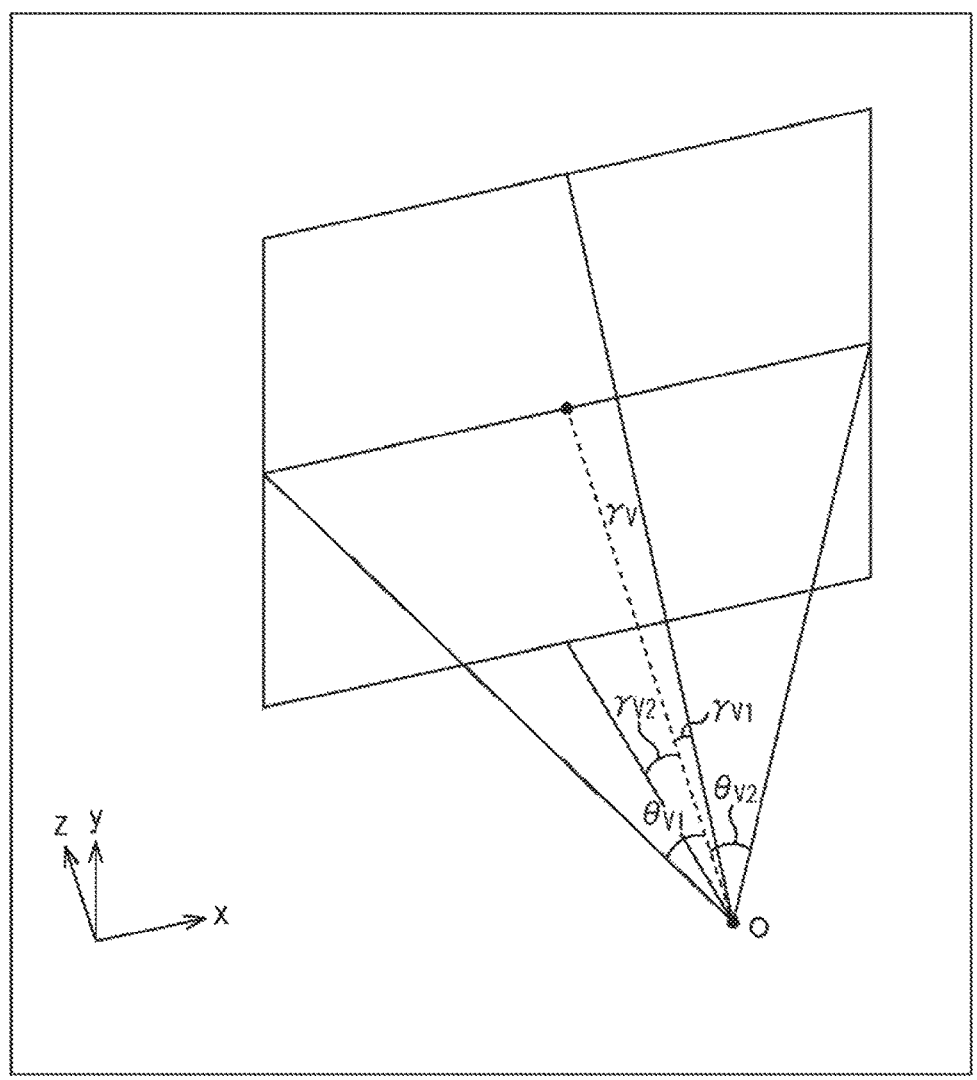
FIG. 5 is a diagram illustrating image frame size information.

FIG. 5 is a diagram illustrating the image frame size information.

As shown in FIG. 5, the image frame size information includes a horizontal angle $\theta_{v1}$ of the left end, a horizontal angle $\theta_{v2}$ of the right end, a vertical angle $\gamma_{v1}$ of the upper end, a vertical angle $\gamma_{v2}$ of the lower end, and a distance $r_v$ in the image frame.

The horizontal angle $\theta_{v1}$ is the angle in the horizontal direction formed by the straight line connecting the left end of an image frame and the origin O and the YZ plane, for example, when a shooting position in the center of an image is set to the origin O; the horizontal direction of the image is set to the X direction; the vertical direction of the image is set to the Y direction; and the depth direction perpendicular to the XY plane is set to the Z direction. The horizontal angle $\theta_{v2}$ is the angle in the horizontal direction formed by the straight line connecting the right end of an image frame and the origin O and the YZ plane. Thus, an angle obtained by combining the horizontal angle $\theta_{v1}$ and the horizontal angle $\theta_{v2}$ is a horizontal angle of view.

The vertical angle $\gamma_{V1}$ is the angle formed by the XZ plane and the straight line connecting the upper end of the image frame and the origin O, and the vertical angle $\gamma_{v2}$ is the angle formed by the XZ plane and the straight line connecting the lower end of the image frame and the origin O. An angle obtained by combining the vertical angles $\gamma_{V1}$ and $\gamma_{v2}$ becomes a vertical angle of view. The distance $r_v$ is the distance between the origin O and the image plane.

As described above, the object position information represents the positional relationship between the object 40 and the origin O, and the image frame size information represents the positional relationship between the image frame and the origin O. Thus, it is possible to detect (recognize) the position of each object on the image on the basis of the object position information and the image frame size information. As a result, it is possible to specify an object in the display area 31.

(Explanation of Structure of MPD File)

Figure 6:
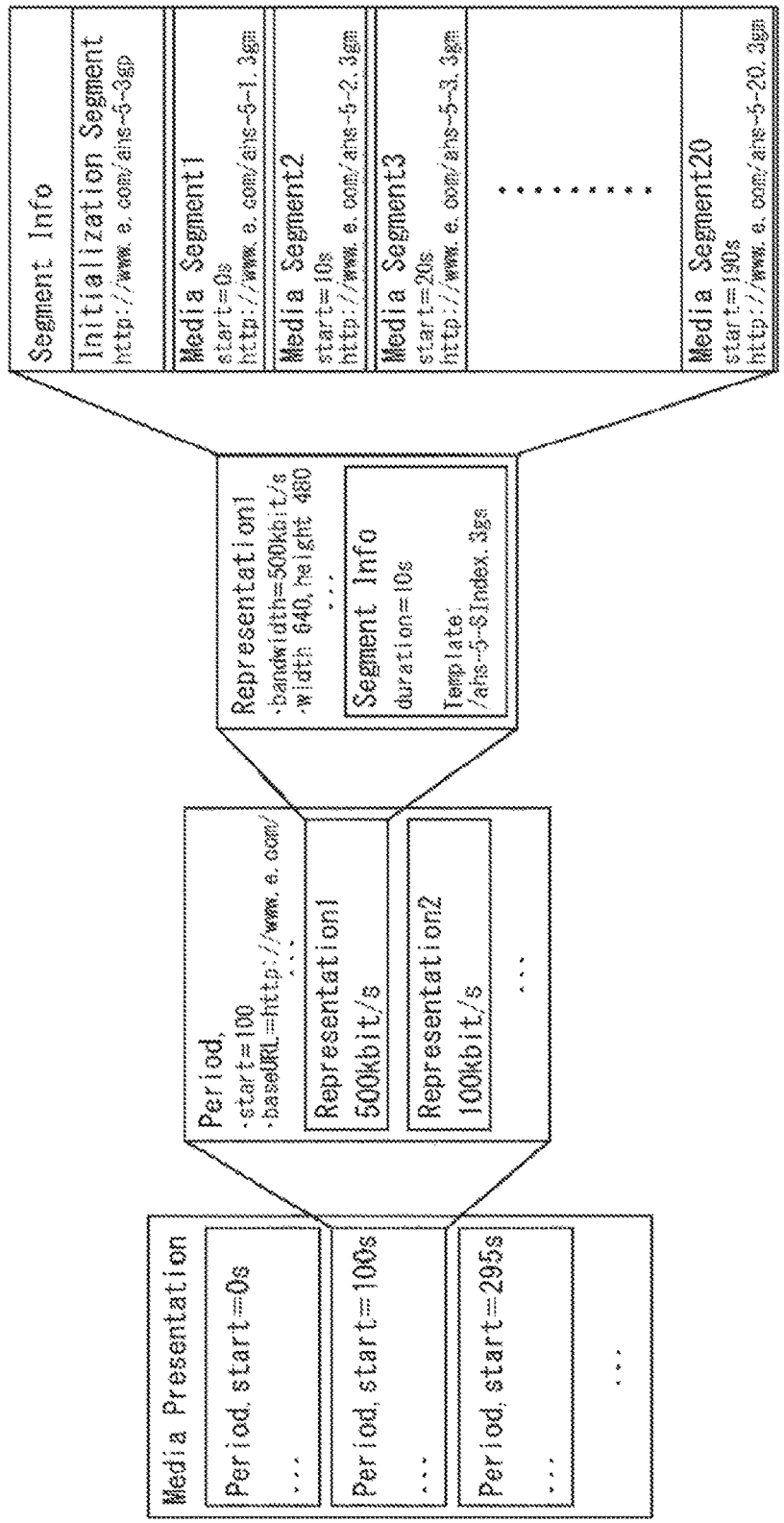
FIG. 6 is a diagram showing a structure of an MPD file.

FIG. 6 is a diagram illustrating the structure of an MPD file.

In the analysis (parsing) of an MPD file, the video playback terminal 14 selects an optimum one among attributes of "Representation" included in "Period" of the MPD file (Media Presentation in FIG. 6).

The video playback terminal 14 acquires a file by referring to a uniform resource locator (URL) or the like of "Initialization Segment" at the head of the selected "Representation", and processes the acquired file. Then, the video playback terminal 14 acquires a file by referring to the URL or the like of the subsequent "Media Segment", and plays back the acquired file.

Figure 7:
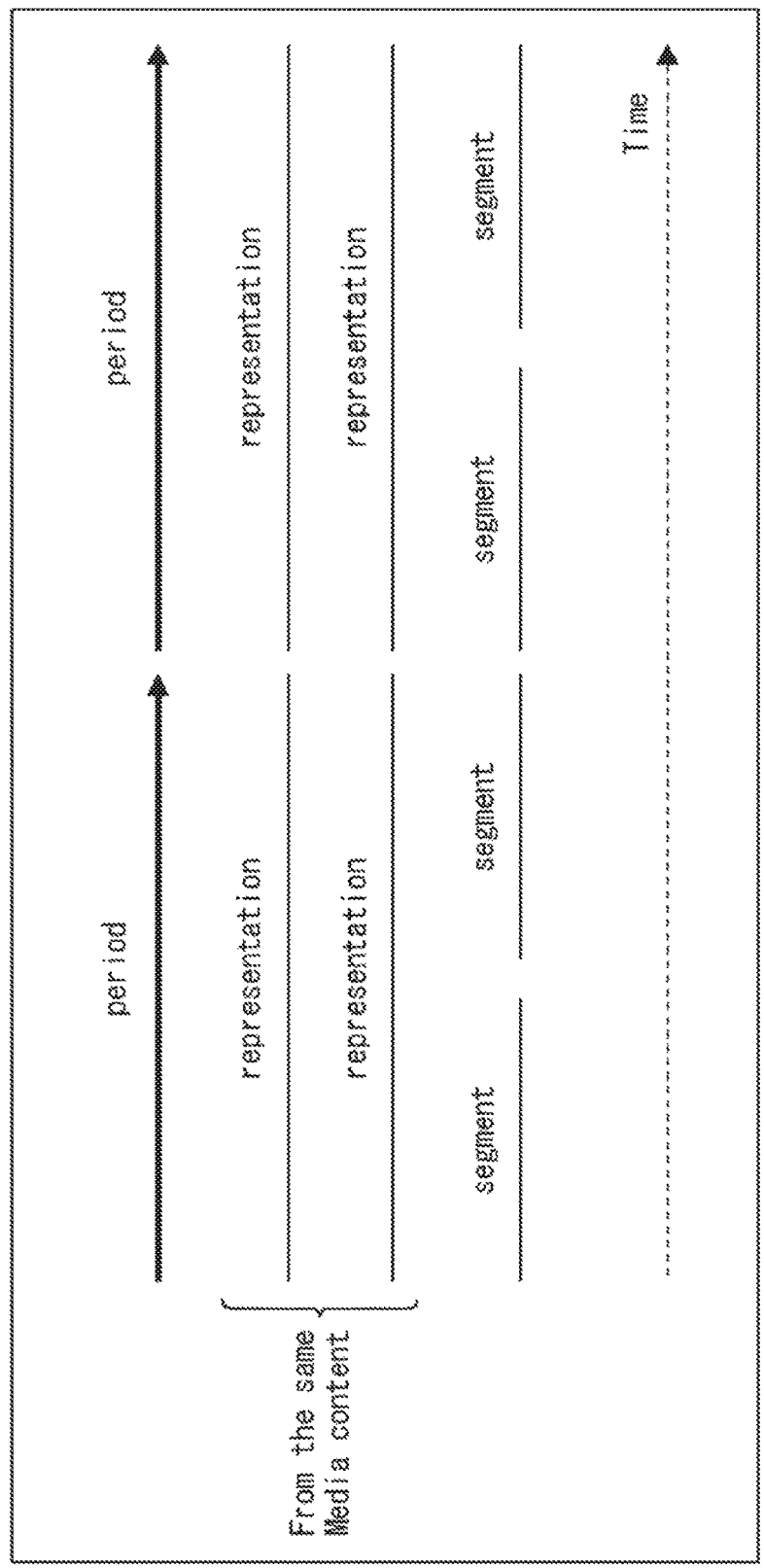
FIG. 7 is a diagram showing a relationship among "Period", "Representation", and "Segment".

Note that in the MPD file, the relationship among "Period", "Representation", and "Segment" becomes as shown in FIG. 7. In other words, a single video content item can be managed in a longer time unit than the segment by "Period", and can be managed in units of segments by "Segment" in each "Period". Further, in each "Period", it is possible to manage the video content in units of stream attributes by "Representation".

Figure 8:
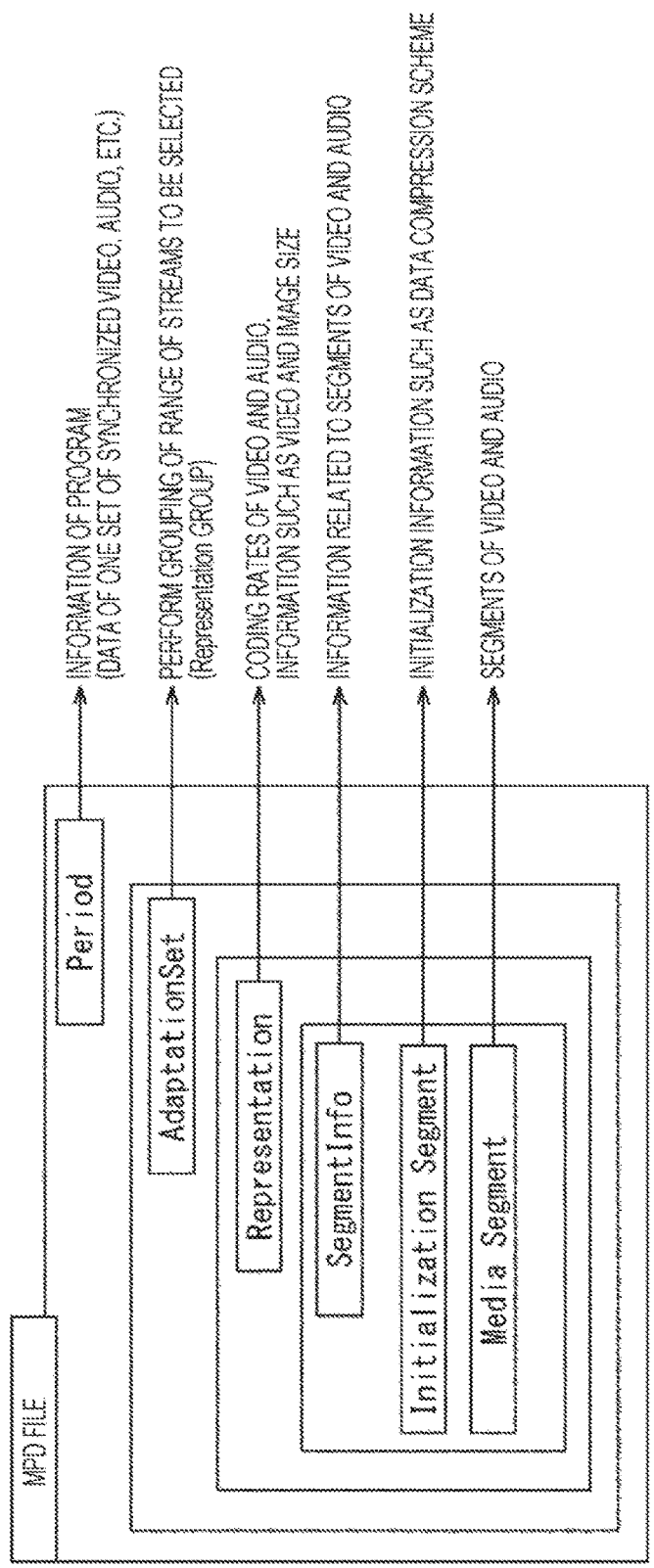
FIG. 8 is a diagram showing a hierarchical structure of an MPD file.
Figure 9:
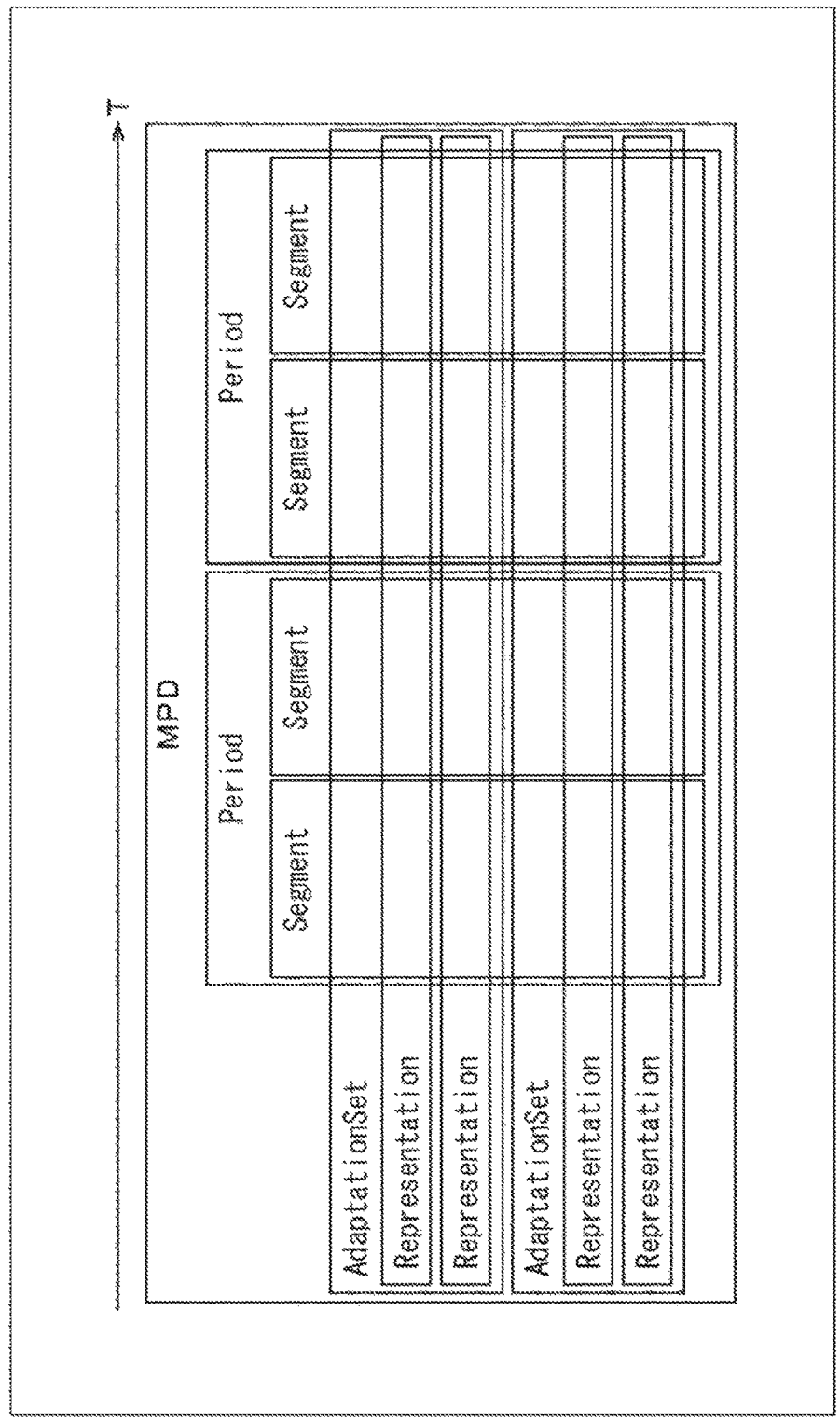
FIG. 9 is a diagram showing a relationship between a structure of an MPD file and a time axis.

Thus, the MPD file has a hierarchical structure shown in FIG. 8, starting from the "Period". Further, the structure of the MPD file arranged on the time axis becomes the configuration as shown in FIG. 9. As is clear from FIG. 9, there are a plurality of "Representation" elements in the same segment. The video playback terminal 14 selects any one from among these elements adaptively, and thus it is possible to acquire an image file and audio file in the display area selected by the user and to play back the acquired file.

(Explanation of Description of MPD File)

Figure 10:
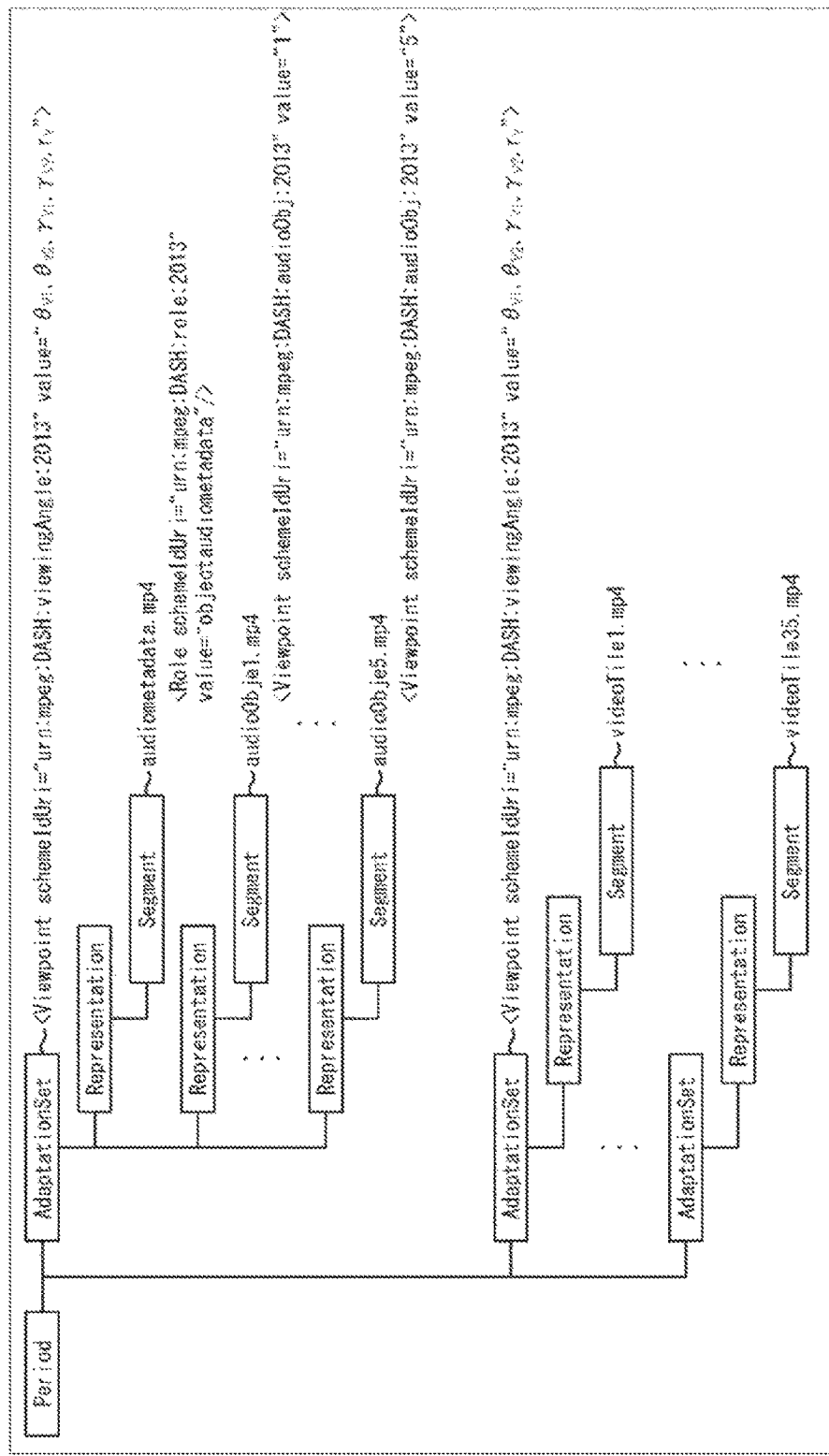
FIG. 10 is a diagram illustrating an exemplary description of the MPD file.

FIG. 10 is a diagram illustrating the description of an MPD file.

As described above, in the information processing system 10, the image frame size information is included in the MPD file to allow an object in the display area to be specified by the video playback terminal 14. As shown in FIG. 10, Scheme (urn:mpeg:DASH:viewingAngle:2013) used to define new image frame size information (viewing angle) is extended by utilizing a DescriptorType element of Viewpoint, and thus the image frame size information is arranged in an "Adaptation Set" for audio and an "Adaptation Set" for image. The image frame size information may be arranged only in the "Adaptation Set" for image.

Further, the "Representation" for audio metafile is described in the "Adaptation Set" for audio of the MPD file. A URL or the like as information for specifying the audio metafile (audiometadata.mp4) is described in "Segment" of the "Representation". In this case, it is described that the file to be specified in "Segment" is the audio metafile (objectaudiometadata) by utilizing Role element.

The "Representation" for audio file of each object is also described in "Adaptation Set" for audio of the MPD file. A URL or the like as information for specifying the audio file (audioObje1.mp4, audioObje5.mp4) of each object is described in "Segment" of the "Representation". In this case, object IDs (1 and 5) of the objects corresponding to the audio file are also described by extending Viewpoint.

Note that, although not shown, the tile position information is arranged in the "Adaptation Set" for image.

(Configuration Example of File Generation Device)

Figure 11:
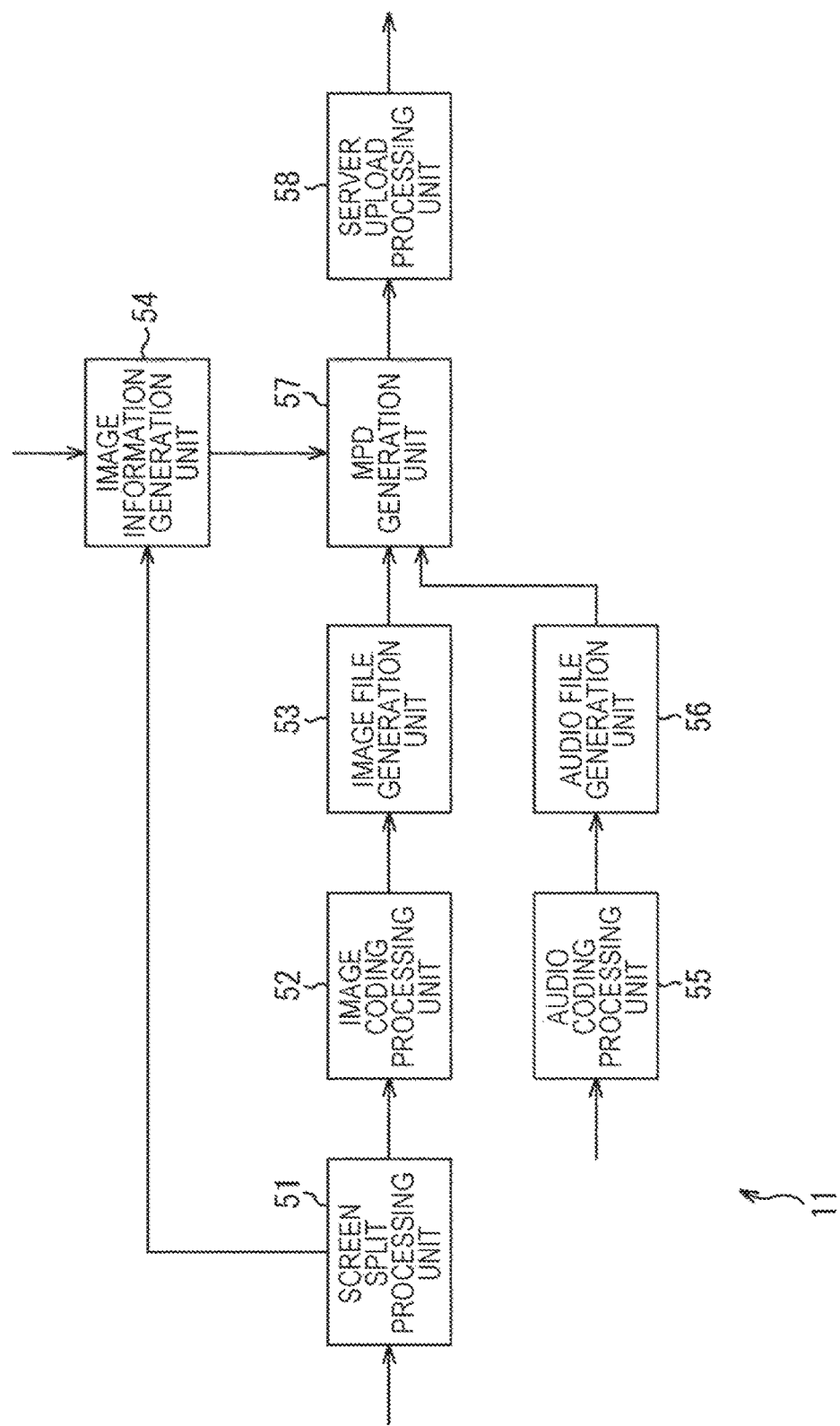
FIG. 11 is a block diagram showing a configuration example of a file generation device.

FIG. 11 is a block diagram showing a configuration example of the file generation device 11 shown in FIG. 1.

The file generation device 11 shown in FIG. 11 includes a screen split processing unit 51, an image coding processing unit 52, an image file generation unit 53, an image information generation unit 54, an audio coding processing unit 55, an audio file generation unit 56, an MPD generation unit 57, and a server upload processing unit 58.

The screen split processing unit 51 of the file generation device 11 splits image data of video content input from the outside into tile units. The screen split processing unit 51 supplies the image information generation unit 54 with the tile position information. Further, the screen split processing unit 51 supplies the image coding processing unit 52 with the image data configured in units of tiles.

The image coding processing unit 52 encodes the image data, which is configured in units of tiles and is supplied from the screen split processing unit 51, for each tile to generate a video stream. The image coding processing unit 52 supplies the image file generation unit 53 with the video stream of each tile.

The image file generation unit 53 processes the video stream of each tile supplied from the image coding processing unit 52 into a file format in units of segments and supplies the MPD generation unit 57 with the resulting image file of each tile.

The image information generation unit 54 supplies the MPD generation unit 57 with the tile position information supplied from the screen split processing unit 51 and with the image frame size information input from the outside as image information.

The audio coding processing unit 55 encodes audio data, which is configured in units of objects of video content input from the outside, for each object, and generates an audio stream. Further, the audio coding processing unit 55 encodes the object position information of each object input from the outside and the audio metadata including the object ID and the like to generate encoded data. The audio coding processing unit 55 supplies the audio file generation unit 56 with the audio stream of each object and the encoded data of the audio metadata.

The audio file generation unit 56 functions as an audio file generation unit, processes the audio stream of each object supplied from the audio coding processing unit 55 into a file format in units of segments, and supplies the MPD generation unit 57 with the resulting audio file of each object.

Further, the audio file generation unit 56 functions as a metafile generation unit, processes the encoded data of audio metadata supplied from the audio coding processing unit 55 into a file format in units of segments, and supplies the MPD generation unit 57 with the resulting audio metafile.

The MPD generation unit 57 determines the URL or the like of the Web server 12 for storing the image file of each tile supplied from the image file generation unit 53. Further, the MPD generation unit 57 determines the URL or the like of the Web server 12 for storing the audio file of each object and the audio metafile which are supplied from the audio file generation unit 56.

The MPD generation unit 57 arranges the image information supplied from the image information generation unit 54 in "AdaptationSet" for an image of the MPD file. Further, the MPD generation unit 57 arranges the image frame size information among the pieces of image information in "AdaptationSet" for audio of the MPD file. The MPD generation unit 57 arranges the URL or the like of the image file of each tile in "Segment" of "Representation" for the image file of the tile.

The MPD generation unit 57 arranges the URL or the like of the audio file of each object in "Segment" of "Representation" for audio file of the object. Further, the MPD generation unit 57 functions as an information generation unit, and arranges a URL or the like as information for specifying an audio metafile in "Segment" of "Representation" for audio metafile. The MPD generation unit 57 supplies the server upload processing unit 58 with the MPD file in which various types of information are arranged as described above, the image file, the audio file, and the audio metafile.

The server upload processing unit 58 uploads the image file of each tile, the audio file of each object, the audio metafile, and the MPD file, which are supplied from the MPD generation unit 57, to the Web server 12.

(Explanation of Process of File Generation Device)

Figure 12:
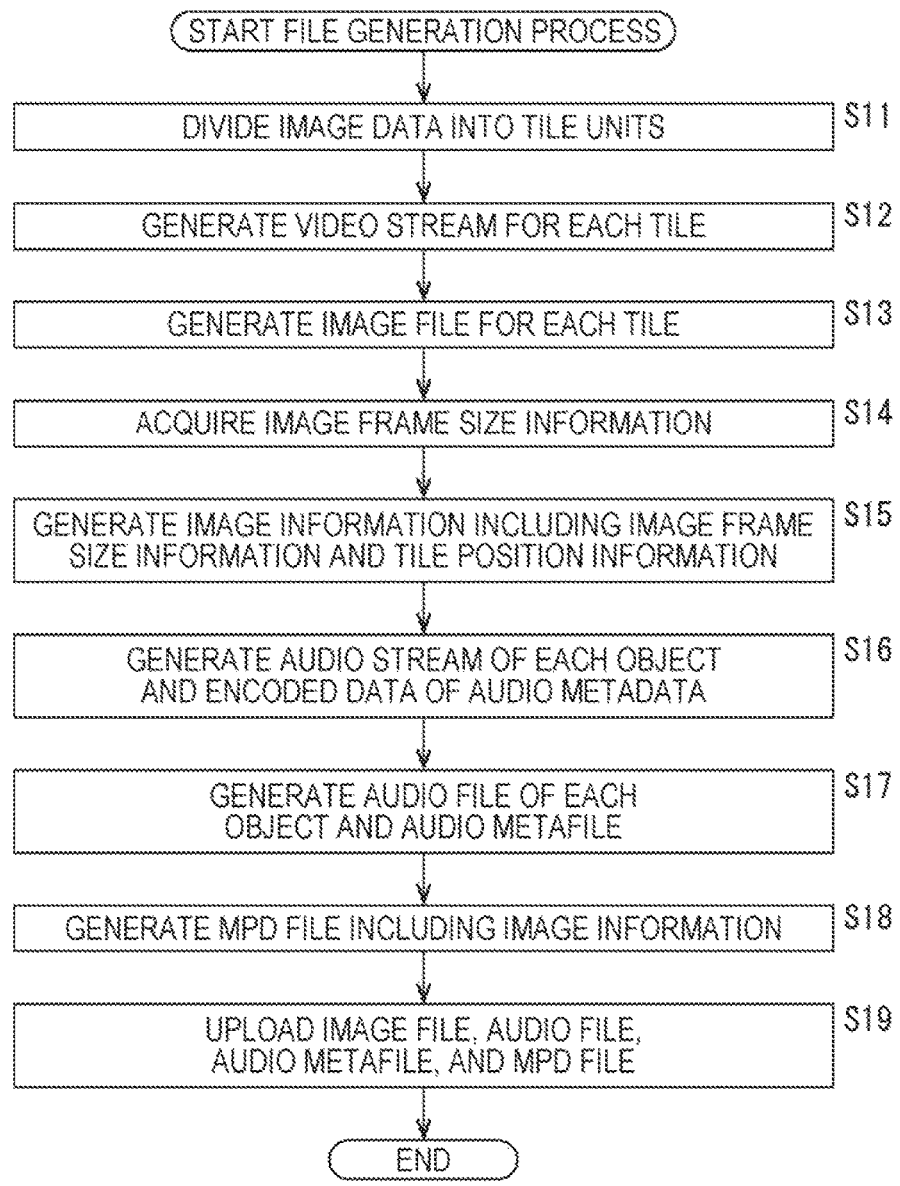
FIG. 12 is a flowchart illustrating file generation process of the file generation device.

FIG. 12 is a flowchart illustrating a file generation process of the file generation device 11 shown in FIG. 11.

In step S11 of FIG. 12, the screen split processing unit 51 of the file generation device 11 splits image data of video content input from the outside into tile units. The screen split processing unit 51 supplies the image information generation unit 54 with the tile position information. Further, the screen split processing unit 51 supplies the image coding processing unit 52 with the image data configured in units of tiles.

In step S12, the image coding processing unit 52 encodes the image data, which is configured in units of tiles and is supplied from the screen split processing unit 51, for each tile to generate a video stream of each tile. The image coding processing unit 52 supplies the image file generation unit 53 with the video stream of each tile.

In step S13, the image file generation unit 53 processes the video stream of each tile supplied from the image coding processing unit 52 into a file format in units of segments to generate an image file of each tile. The image file generation unit 53 supplies the MPD generation unit 57 with the image file of each tile.

In step S14, the image information generation unit 54 acquires the image frame size information from the outside. In step S15, the image information generation unit 54 generates image information including the tile position information supplied from the screen split processing unit 51 and the image frame size information, and supplies the MPD generation unit 57 with the image information.

In step S16, the audio coding processing unit 55 encodes audio data, which is configured in units of objects of video content input from the outside, for each object, and generates an audio stream of each object. Further, the audio coding processing unit 55 encodes the object position information of each object input from the outside and the audio metadata including the object ID to generate encoded data. The audio coding processing unit 55 supplies the audio file generation unit 56 with the audio stream of each object and the encoded data of the audio metadata.

In step S17, the audio file generation unit 56 processes the audio stream of each object supplied from the audio coding processing unit 55 into a file format in units of segments to generate an audio file of each object. Further, the audio file generation unit 56 processes the encoded data of the audio metadata supplied from the audio coding processing unit 55 into a file format in units of segments to generate an audio metafile. The audio file generation unit 56 supplies the MPD generation unit 57 with the audio file of each object and the audio metafile.

In step S18, the MPD generation unit 57 generates an MPD file including the image information supplied from the image information generation unit 54, the URL or the like of each file. The MPD generation unit 57 supplies the server upload processing unit 58 with the MPD file, the image file of each tile, the audio file of each object, and the audio metafile.

In step S19, the server upload processing unit 58 uploads the image file of each tile, the audio file of each object, the audio metafile, and the MPD file, which are supplied from the MPD generation unit 57, to the Web server 12. Then, the process is terminated.

(Functional Configuration Example of Video Playback Terminal)

Figure 13:
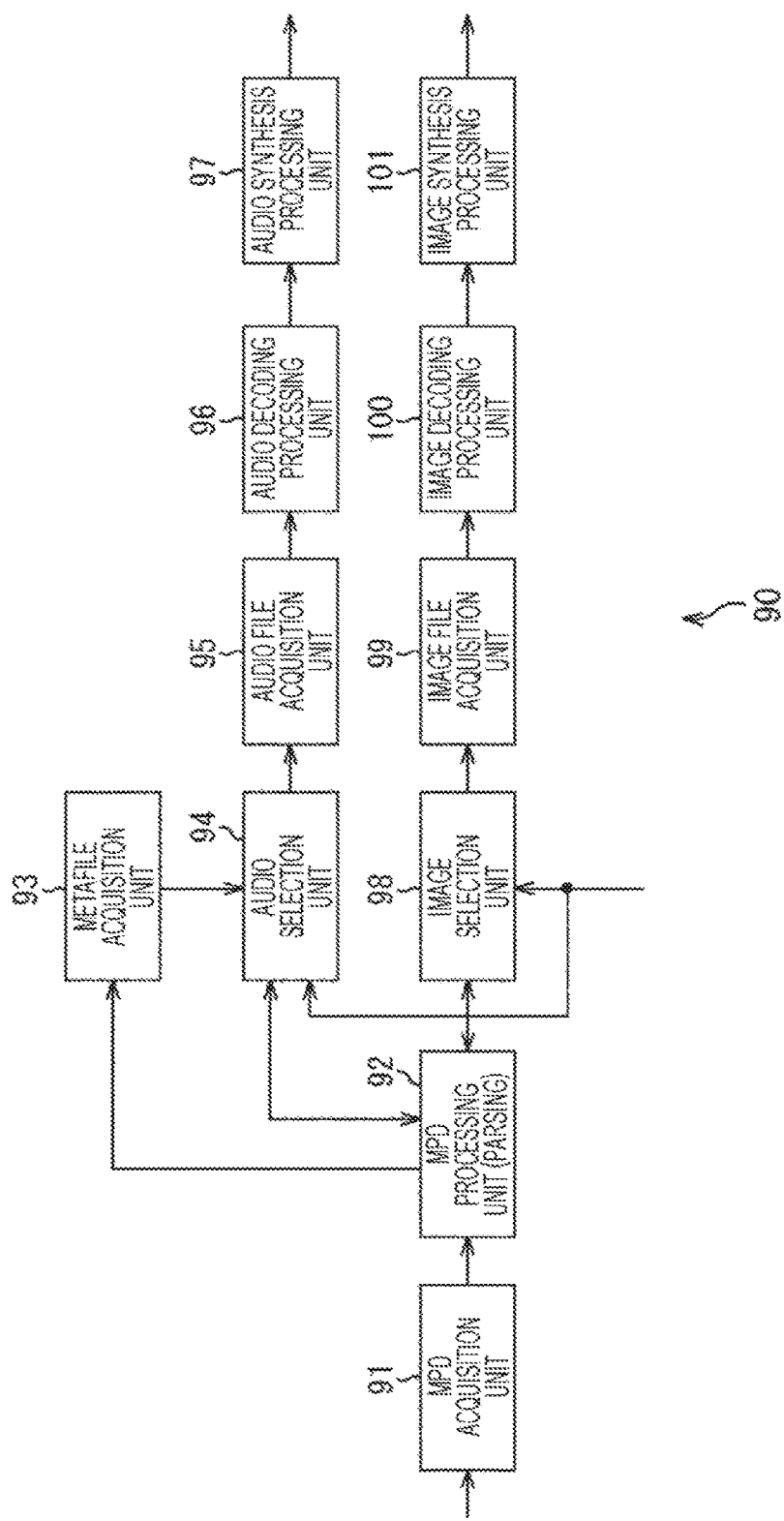
FIG. 13 is a block diagram showing a configuration example of a streaming playback unit.

FIG. 13 is a block diagram showing a configuration example of the streaming playback unit which is implemented in such a manner that the video playback terminal 14 shown in FIG. 1 executes the control software 21, the video playback software 22, and the access software 23.

A streaming playback unit 90 shown in FIG. 13 includes an MPD acquisition unit 91, an MPD processing unit 92, a metafile acquisition unit 93, an audio selection unit 94, an audio file acquisition unit 95, an audio decoding processing unit 96, an audio synthesis processing unit 97, an image selection unit 98, an image file acquisition unit 99, an image decoding processing unit 100, and an image synthesis processing unit 101.

The MPD acquisition unit 91 of the streaming playback unit 90 functions as a receiver, acquires an MPD file from the Web server 12, and supplies the MPD processing unit 92 with the MPD file.

The MPD processing unit 92 extracts information such as a URL, which is described in "Segment" for audio metafile, from the MPD file supplied from the MPD acquisition unit 91, and supplies the metafile acquisition unit 93 with the extracted information. Further, the MPD processing unit 92 extracts image frame size information, which is described in "AdaptationSet" for image, from the MPD file, and supplies the audio selection unit 94 with the extracted information. The MPD processing unit 92 extracts information such as a URL, which is described in "Segment" for audio file of the object requested from the audio selection unit 94, from the MPD file, and supplies the audio selection unit 94 with the extracted information.

The MPD processing unit 92 extracts the tile position information described in "AdaptationSet" for image from the MPD file and supplies the image selection unit 98 with the extracted information. The MPD processing unit 92 extracts information such as a URL, which is described in "Segment" for the image file of the tile requested from the image selection unit 98, from the MPD file, and supplies the image selection unit 98 with the extracted information.

On the basis of the information such as a URL supplied from the MPD processing unit 92, the metafile acquisition unit 93 requests the Web server 12 to send an audio metafile specified by the URL, and acquires the audio metafile. The metafile acquisition unit 93 supplies the audio selection unit 94 with object position information included in the audio metafile.

The audio selection unit 94 functions as a position determination unit, and calculates a position of each object on the image on the basis of the image frame size information supplied from the MPD processing unit 92 and the object position information supplied from the metafile acquisition unit 93. The audio selection unit 94 selects an object in the display area designated by the user on the basis of the position of each object on the image. The audio selection unit 94 requests the MPD processing unit 92 to send information such as the URL of the audio file of the selected object. The audio selection unit 94 supplies the audio file acquisition unit 95 with the information such as the URL supplied from the MPD processing unit 92 in response to the request.

The audio file acquisition unit 95 functions as a receiver. On the basis of the information such as a URL supplied from the audio selection unit 94, the audio file acquisition unit 95 requests the Web server 12 to send an audio file, which is specified by the URL and configured in units of objects, and acquires the audio file. The audio file acquisition unit 95 supplies the audio decoding processing unit 96 with the acquired audio file in units of objects.

The audio decoding processing unit 96 decodes an audio stream included in the audio file, which is supplied from the audio file acquisition unit 95 and configured in units of objects, to generate audio data in units of objects. The audio decoding processing unit 96 supplies the audio synthesis processing unit 97 with the audio data in units of objects.

The audio synthesis processing unit 97 synthesizes the audio data, which is supplied from the audio decoding processing unit 96 and configured in units of objects, and outputs the synthesized data.

The image selection unit 98 selects a tile in the display area designated by the user on the basis of the tile position information supplied from the MPD processing unit 92. The image selection unit 98 requests the MPD processing unit 92 to send information such as a URL for the image file of the selected tile. The image selection unit 98 supplies the image file acquisition unit 99 with the information such as a URL supplied from the MPD processing unit 92 in response to the request.

On the basis of the information such as a URL supplied from the image selection unit 98, the image file acquisition unit 99 requests the Web server 12 to send an image file, which is specified by the URL and configured in units of tiles, and acquires the image file. The image file acquisition unit 99 supplies the image decoding processing unit 100 with the acquired image file in units of tiles.

The image decoding processing unit 100 decodes a video stream included in the image file, which is supplied from the image file acquisition unit 99 and configured in units of tiles, to generate image data in units of tiles. The image decoding processing unit 100 supplies the image synthesis processing unit 101 with the image data in units of tiles.

The image synthesis processing unit 101 synthesizes the image data, which is supplied from the image decoding processing unit 100 and configured in units of tiles, and outputs the synthesized data.

(Explanation of Process of Moving Image Playback Terminal)

Figure 14:
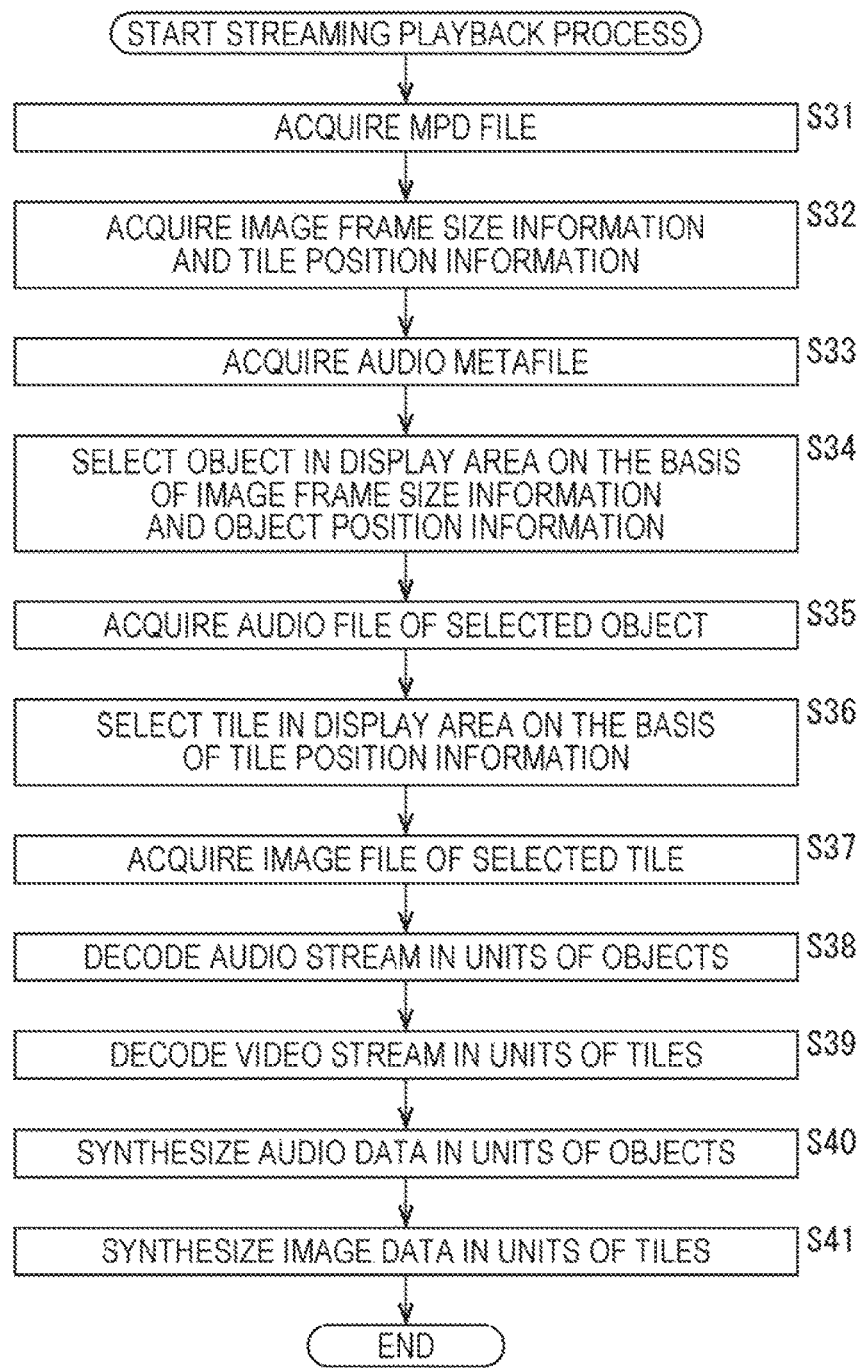
FIG. 14 is a flowchart illustrating a streaming playback process of the streaming playback unit.

FIG. 14 is a flowchart illustrating a streaming playback process of the streaming playback unit 90 (FIG. 13) of the video playback terminal 14.

In step S31 of FIG. 14, the MPD acquisition unit 91 of the streaming playback unit 90 acquires the MPD file from the Web server 12 and supplies the MPD processing unit 92 with the MPD file.

In step S32, the MPD processing unit 92 acquires the image frame size information and the tile position information, which are described in "AdaptationSet" for image, from the MPD file supplied from the MPD acquisition unit 91. The MPD processing unit 92 supplies the audio selection unit 94 with the image frame size information and supplies the image selection unit 98 with the tile position information. Further, the MPD processing unit 92 extracts information such as a URL described in "Segment" for audio metafile and supplies the metafile acquisition unit 93 with the extracted information.

In step S33, on the basis of the information such as a URL supplied from the MPD processing unit 92, the metafile acquisition unit 93 requests the Web server 12 to send an audio metafile specified by the URL, and acquires the audio metafile. The metafile acquisition unit 93 supplies the audio selection unit 94 with object position information included in the audio metafile.

In step S34, the audio selection unit 94 selects an object in the display area designated by the user on the basis of the image frame size information supplied from the MPD processing unit 92 and the object position information supplied from the metafile acquisition unit 93. The audio selection unit 94 requests the MPD processing unit 92 to send the information such as a URL for the audio file of the selected object.

The MPD processing unit 92 extracts information such as a URL, which is described in "Segment" for audio file of the object requested from the audio selection unit 94, from the MPD file, and supplies the audio selection unit 94 with the extracted information. The audio selection unit 94 supplies the audio file acquisition unit 95 with the information such as a URL supplied from the MPD processing unit 92.

In step S35, on the basis of the information such as a URL supplied from the audio selection unit 94, the audio file acquisition unit 95 requests the Web server 12 to send an audio file of the selected object which is specified by the URL, and acquires the audio file. The audio file acquisition unit 95 supplies the audio decoding processing unit 96 with the acquired audio file in units of objects.

In step S36, the image selection unit 98 selects a tile in the display area designated by the user on the basis of the tile position information supplied from the MPD processing unit 92. The image selection unit 98 requests the MPD processing unit 92 to send information such as a URL for the image file of the selected tile.

The MPD processing unit 92 extracts information such as a URL, which is described in "Segment" for image file of the object requested from the image selection unit 98, from the MPD file, and supplies the image selection unit 98 with the extracted information. The image selection unit 98 supplies the image file acquisition unit 99 with the information such as a URL supplied from the MPD processing unit 92.

In step S37, on the basis of the information such as a URL supplied from the image selection unit 98, the image file acquisition unit 99 requests the Web server 12 to send an image file of the selected tile which is specified by the URL, and acquires the image file. The image file acquisition unit 99 supplies the image decoding processing unit 100 with the acquired image file in units of tiles.

In step S38, the audio decoding processing unit 96 decodes an audio stream included in the audio file, which is supplied from the audio file acquisition unit 95 and configured in units of objects, to generate audio data in units of objects. The audio decoding processing unit 96 supplies the audio synthesis processing unit 97 with the audio data in units of objects.

In step S39, the image decoding processing unit 100 decodes a video stream included in the image file, which is supplied from the image file acquisition unit 99 and configured in units of tiles, to generate image data in units of tiles. The image decoding processing unit 100 supplies the image synthesis processing unit 101 with the image data in units of tiles.

In step S40, the audio synthesis processing unit 97 synthesizes the audio data, which is supplied from the audio decoding processing unit 96 and configured in units of objects, and outputs the synthesized data. In step S41, the image synthesis processing unit 101 synthesizes the image data, which is supplied from the image decoding processing unit 100 and configured in units of tiles, and outputs the synthesized data. Then, the process is terminated.

As described above, the Web server 12 transmits the image frame size information and the object position information. Thus, the video playback terminal 14 can specify, for example, an object in the display area to selectively acquire an audio file of the specified object so that the audio file corresponds to the image in the display area. This allows the video playback terminal 14 to acquire only a necessary audio file, which leads to an improvement in transmission efficiency.

Figure 15:
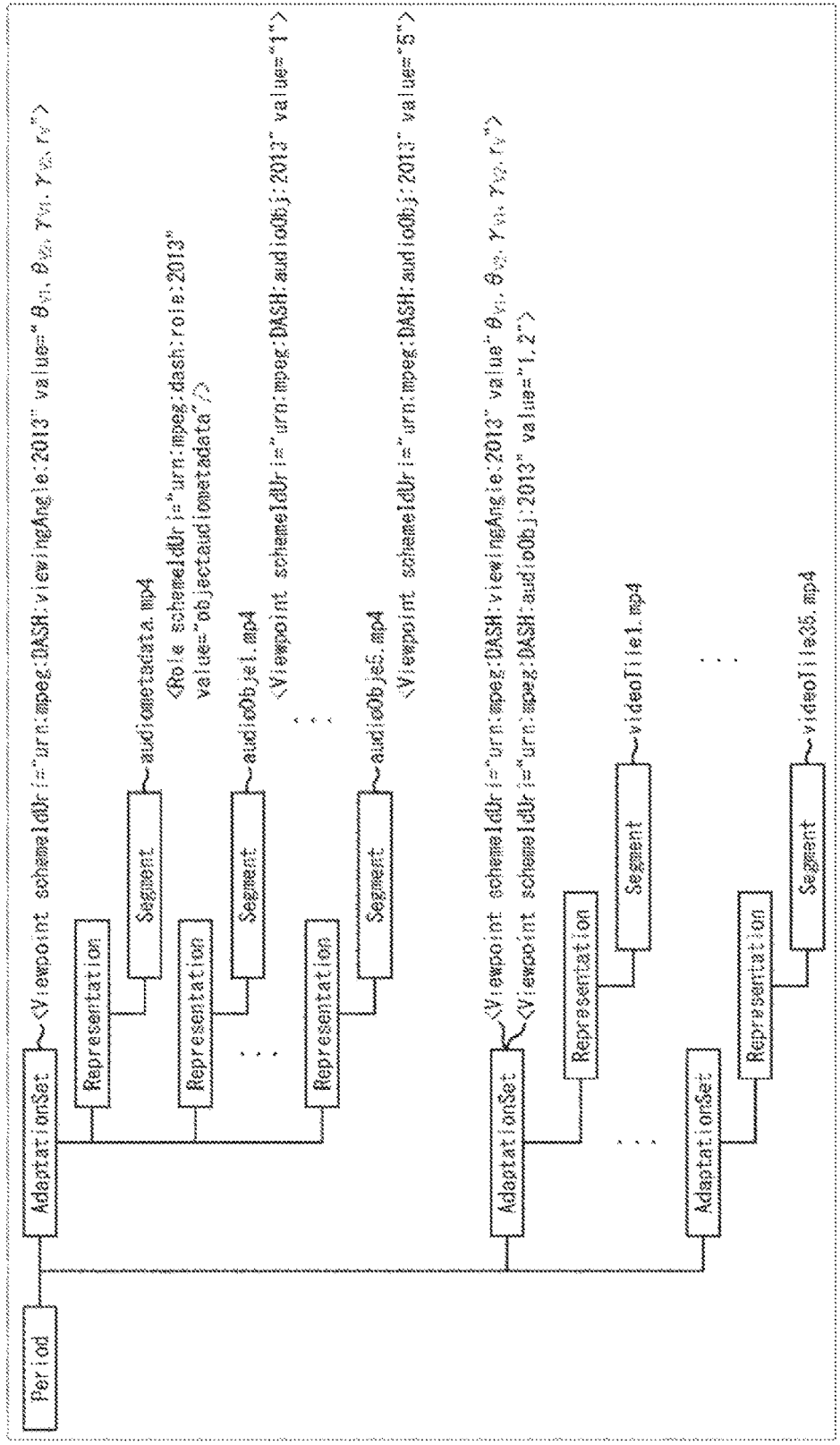
FIG. 15 is a diagram illustrating an exemplary description of the MPD file.

Note that as shown in FIG. 15, an object ID (object specifying information) may be described in "AdaptationSet" for an image of the MPD file as information for specifying an object corresponding to audio to play back at the same time with the image. The object ID may be described by extending Scheme (urn:mpeg:DASH:audioObj:2013) for defining new object ID information (audioObj) by utilizing a DescriptorType element of Viewpoint. In this case, the video playback terminal 14 selects an audio file of the object corresponding to the object ID described in "AdaptationSet" for image, and acquires the audio file for playback.

Instead of generating an audio file in units of objects, the encoded data of all objects may be multiplexed into a single audio stream to generate a single audio file.

Figure 16:
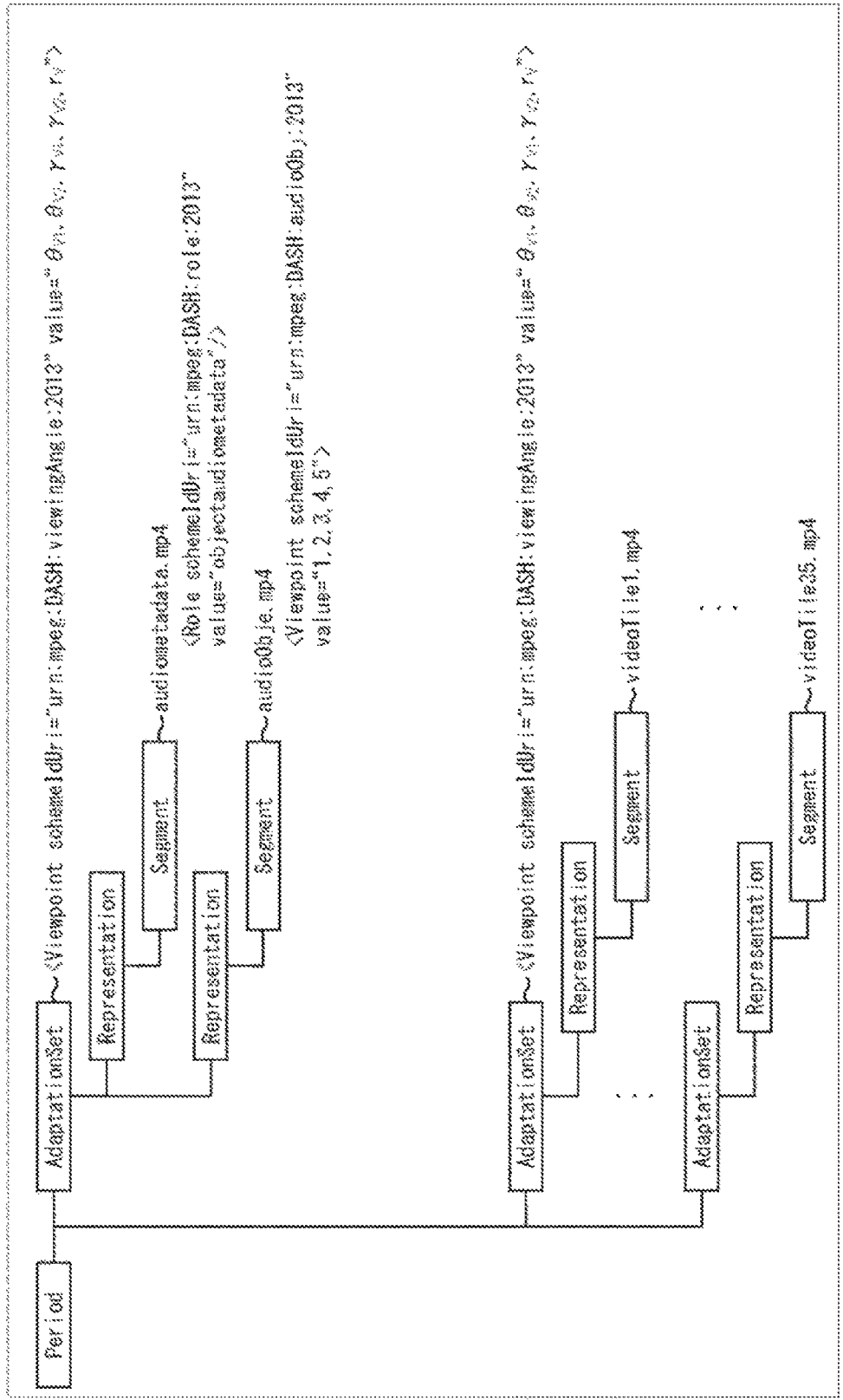
FIG. 16 is a diagram illustrating another exemplary description of the MPD file.

In this case, as shown in FIG. 16, one "Representation" for audio file is provided in "AdaptationSet" for audio of the MPD file, and a URL or the like for the audio file (audioObje.mp4) including the encoded data of all objects is described in "Segment". At this time, object IDs (1, 2, 3, 4, and 5) of all objects corresponding to the audio file are described by extending Viewpoint.

Figure 17:
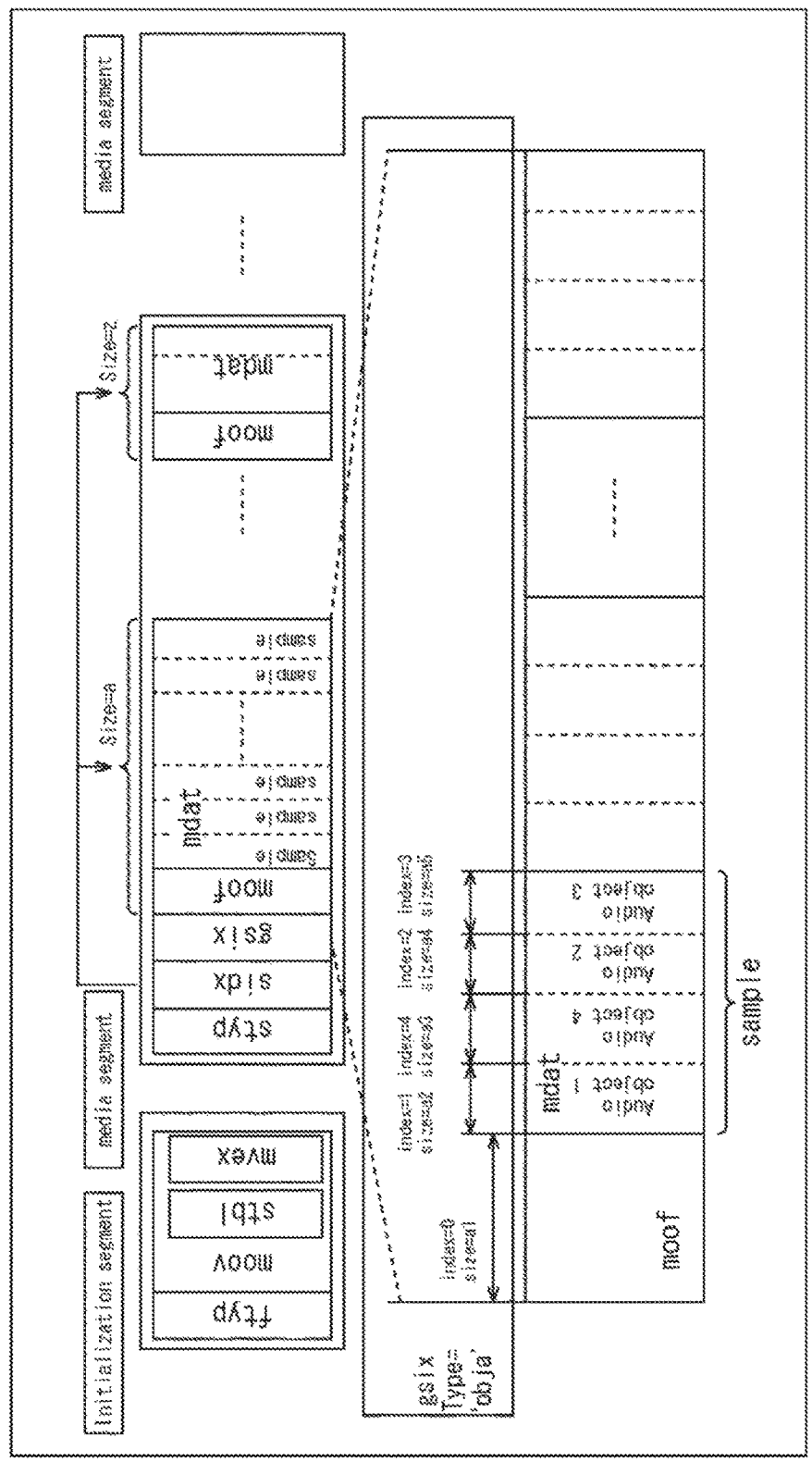
FIG. 17 is a diagram showing an arrangement example of an audio stream.

In addition, in this case, as shown in FIG. 17, the encoded data (Audio object) of each object is arranged, as a subsample, in an mdat box of the audio file (hereinafter also referred to as an audio media file, as appropriate) acquired by referring to "Media Segment" of the MPD file.

Specifically, data is arranged in the audio media file in units of subsegments that are any time shorter than a segment. The position of data in units of subsegments is specified by an sidx box. Further, the data in units of subsegments is composed of a moof box and an mdat box.

The mdat box is composed of a plurality of samples, and the encoded data of each object is arranged as each sub-sample of the sample.

Further, a gsix box in which information on a sample is described is arranged next to the sidx box of the audio media file. In this manner, the gsix box in which the information on the sample is described is provided separately from the moof box, and thus the video playback terminal 14 can acquire the information on the sample rapidly.

As shown in FIG. 18, grouping_type representing the types of Sample group entries each composed of one or more samples or sub-samples managed by the gsix box is described in the gsix box. For example, when the Sample group entry is a sub-sample of the encoded data in units of objects, the type of the Sample group entry is "obja" as shown in FIG. 17. A plurality of gsix boxes of grouping_type are arranged in the audio media file.

Further, as shown in FIG. 18, an index (entry_index) of each Sample group entry and a byte range (range_size) as data position information indicating the position in the audio media file are described in the gsix box. Note that when the index (entry_index) is 0, the corresponding byte range indicates a byte range of the moof box (a1 in the example of FIG. 17).

Information indicating which object is used for allowing each Sample group entry to correspond to a sub-sample of encoded data is described in the audio file acquired by referring to "Initialization Segment" of the MPD file (hereinafter also referred to as an audio initialization file, as appropriate).

Figure 19:
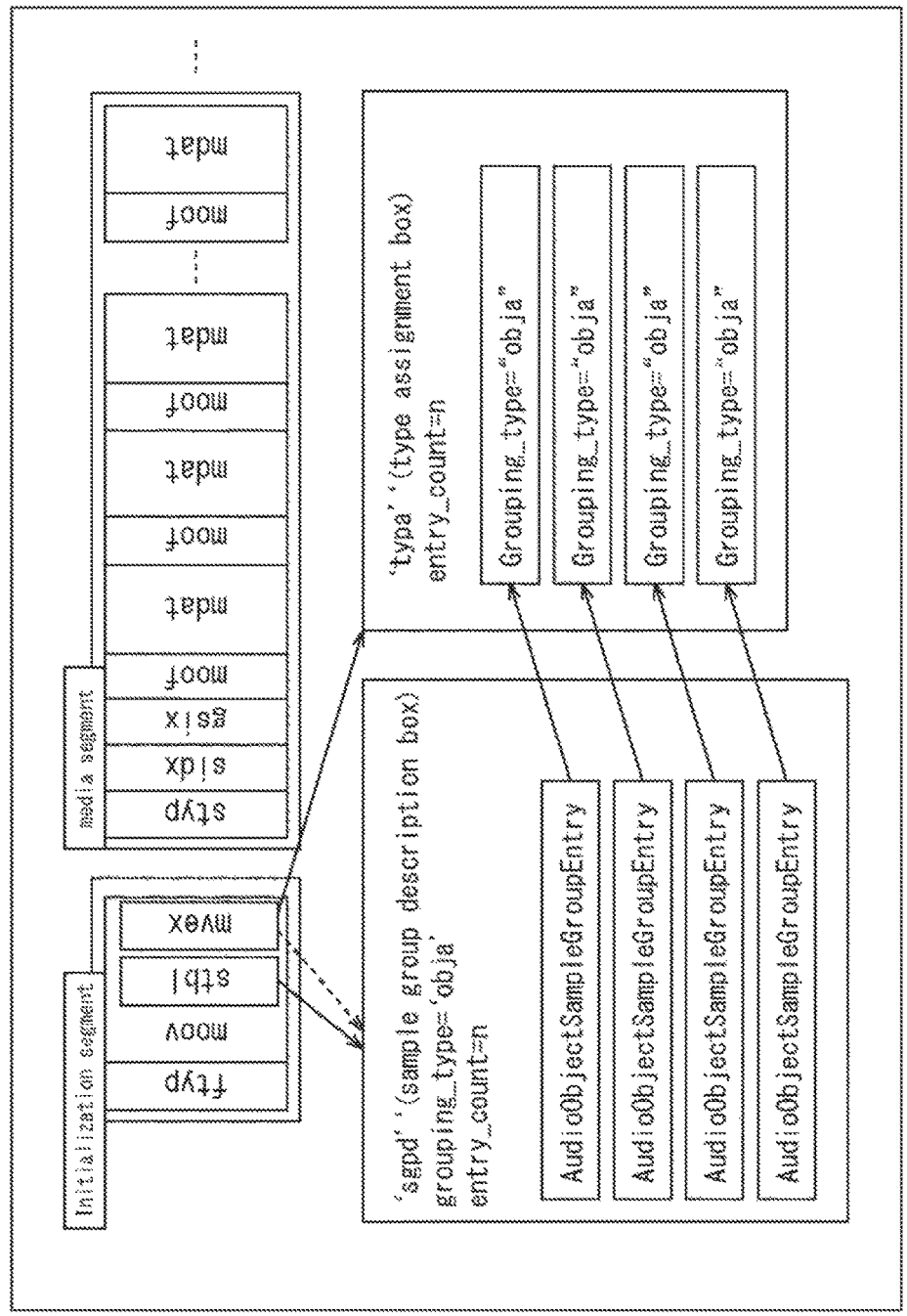
FIG. 19 is a diagram showing an example of information indicating a correspondence relation between a sample group entry and object ID.

Specifically, as shown in FIG. 19, this information is indicated by using a type assignment box (typa) of an mvex box that is associated with AudioObjectSampleGroupEntry of a sample group description box (sgpd) in an sbtl box of the audio initialization file.

In other words, as shown in A of FIG. 20, an object ID (audio_object_id) corresponding to the encoded data included in the sample is described in each AudioObjectSampleGroupEntry box. For example, as shown in B of FIG. 20, object IDs 1, 2, 3, and 4 are described in each of four AudioObjectSampleGroupEntry boxes.

On the other hand, as shown in FIG. 21, in the type assignment box, an index as a parameter (grouping_type_parameter) of the Sample group entry corresponding to the AudioObjectSampleGroupEntry is described for each AudioObjectSampleGroupEntry.

The audio media file and the audio initialization file are configured as described above. Thus, when the video playback terminal 14 acquires the encoded data of the object selected as an object in the display area, the AudioObjectSampleGroupEntry in which the object ID of the selected object is described is retrieved from the stbl box of the audio initialization file. Then, the index of the Sample group entry corresponding to the retrieved AudioObjectSampleGroupEntry is read from the mvex box. Then, the position of data in units of subsegments is read from the sidx of the audio file, and the byte range of the Sample group entry of the read index is read from the gsix. Then, the encoded data arranged in the mdat is acquired on the basis of the position of data in units of subsegments and the byte range. Thus, the encoded data of the selected object is acquired.

Although, in the above description, the index of Sample group entry and the object ID of AudioObjectSampleGroupEntry are associated with each other through the mvex box, they may be associated with each other directly. In this case, the index of Sample group entry is described in the AudioObjectSampleGroupEntry.

Further, when the audio file is composed of a plurality of tracks, the sgpd can be stored in the mvex, which allows the sgpd to be shared among the tracks.

(Outline of Second Example of Information Processing System)

Figure 22:
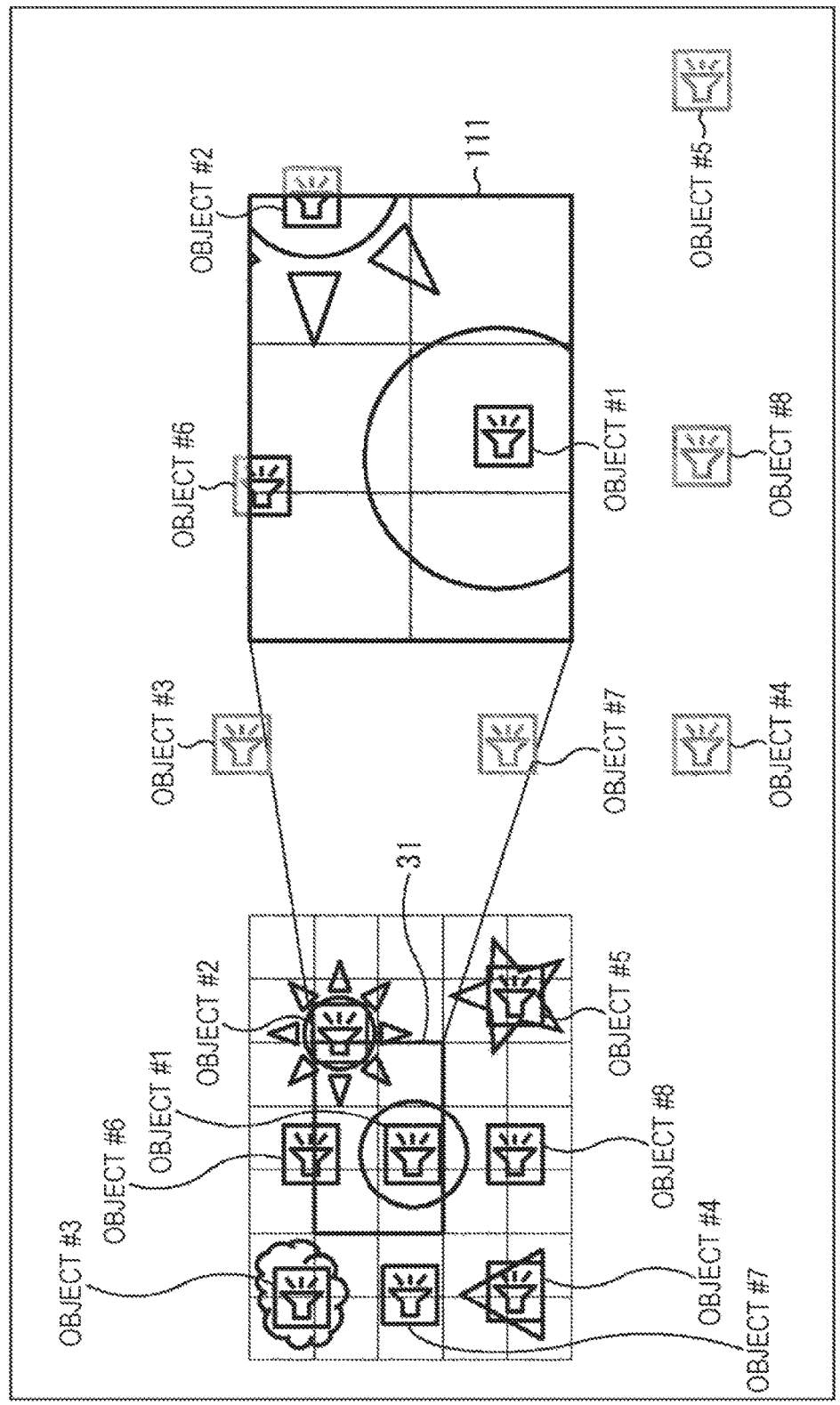
FIG. 22 is a diagram illustrating an outline of a second example of the information processing system to which the present disclosure is applied.

FIG. 22 is a diagram illustrating an outline of a second example of the information processing system to which the present disclosure is applied.

Note that the elements shown in FIG. 22 that are the same as those in FIG. 3 are denoted by the same reference numerals.

In the example shown in FIG. 22, as is the case with FIG. 3, the image of video content is divided into 7 (width)×5 (height) tiles, and audios of objects #1 to #8 are acquired as the audio of video content.

In this case, when the user specifies the display area 31 composed of 3 (width)×2 (height) tiles, the display area 31 is converted (extended) to an area having the same size as the size of the image of video content, thereby obtaining a display image 111 in a second example as shown in FIG. 22. The audios of the objects #1 to #8 are synthesized on the basis of the positions of the objects #1 to #8 in a display image 111 and are output together with the display image 111. In other words, the audios of the objects #3 to #5, #7, and #8, which are outside the display area 31, are output, in addition to the audios of the objects #1, #2, and #6, which are inside the display area 31.

(Configuration Example of Streaming Playback Unit)

The configuration of the second example of the information processing system to which the present disclosure is applied is the same as the configuration of the information processing system 10 shown in FIG. 1 except for the configuration of the streaming playback unit, and thus only of the streaming playback unit will be described below.

Figure 23:
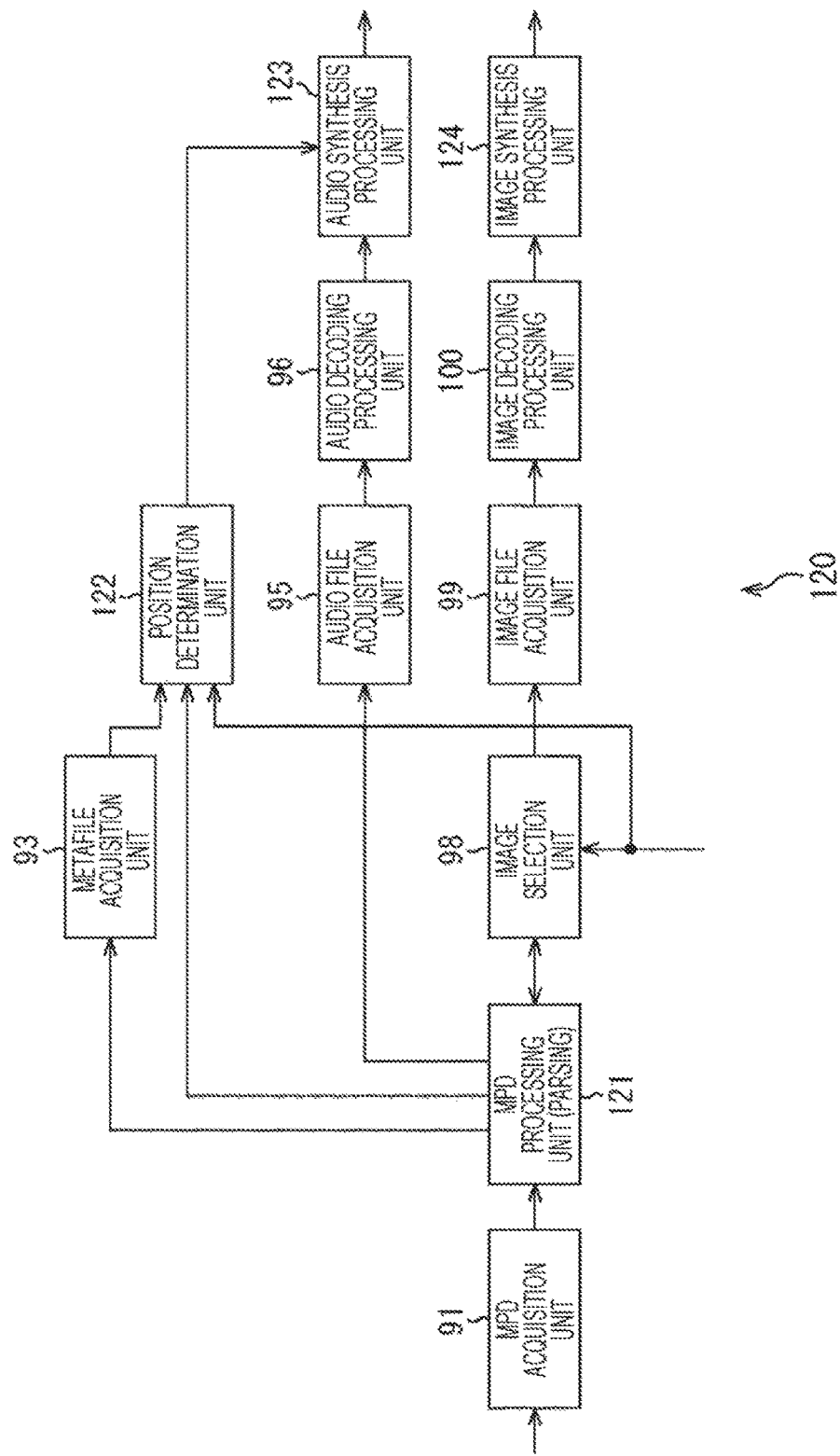
FIG. 23 is a block diagram showing a configuration example of the streaming playback unit of the information processing system to which the present disclosure is applied.

FIG. 23 is a block diagram showing a configuration example of the streaming playback unit of the information processing system to which the present disclosure is applied.

The components shown in FIG. 23 that are the same as those in FIG. 13 are denoted by the same reference numerals, and repeated explanation is omitted as appropriate.

The configuration of the streaming playback unit 120 shown in FIG. 23 differs from the configuration of the streaming playback unit 90 shown in FIG. 13 in that an MPD processing unit 121, an audio synthesis processing unit 123, and an image synthesis processing unit 124 are newly provided instead of the MPD processing unit 92, the audio synthesis processing unit 97, and the image synthesis processing unit 101, respectively, and a position determination unit 122 is additionally provided.

The MPD processing unit 121 of the streaming playback unit 120 extracts information such as a URL, which is described in "Segment" for audio metafile, from the MPD file supplied from the MPD acquisition unit 91, and supplies the metafile acquisition unit 93 with the extracted information. Further, the MPD processing unit 121 extracts image frame size information of an image of the video content (hereinafter referred to as content image frame size information) that is described in "AdaptationSet" for image from the MPD file and supplies the position determination unit 122 with the extracted information. The MPD processing unit 121 extracts information such as a URL, which is described in "Segment" for audio file of all objects, from the MPD file, and supplies the audio file acquisition unit 95 with the extracted information.

The MPD processing unit 121 extracts the tile position information described in "AdaptationSet" for image from the MPD file and supplies the image selection unit 98 with the extracted information. The MPD processing unit 121 extracts information such as a URL, which is described in "Segment" for the image file of the tile requested from the image selection unit 98, from the MPD file, and supplies the image selection unit 98 with the extracted information.

The position determination unit 122 acquires the object position information that is included in the audio metafile obtained by the metafile acquisition unit 93 and the content image frame size information that is supplied from the MPD processing unit 121. Further, the position determination unit 122 acquires display area image frame size information that is the image frame size information of the display area designated by the user. The position determination unit 122 determines (recognizes) the position of each object in the display area on the basis of the object position information, the content image frame size information, and the display area image frame size information. The position determination unit 122 supplies the audio synthesis processing unit 123 with the determined position of each object.

The audio synthesis processing unit 123 synthesizes audio data in units of objects supplied from the audio decoding processing unit 96 on the basis of the object position supplied from the position determination unit 122. Specifically, the audio synthesis processing unit 123 determines audio data to be allocated to each speaker for each object on the basis of the object position and the position of each speaker that outputs sound. The audio synthesis processing unit 123 synthesizes audio data of each object for each speaker and outputs the synthesized audio data as audio data for each speaker. A detailed description of the method of synthesizing audio data of each object on the basis of the object position is disclosed in, for example, Ville Pulkki, "Virtual Sound Source Positioning Using Vector Base Amplitude Panning", Journal of AES, vol. 45, no. 6, pp. 456-466, 1997.

The image synthesis processing unit 124 synthesizes image data in units of tiles supplied from the image decoding processing unit 100. The image synthesis processing unit 124 functions as a converter, and converts the size of the image corresponding to the synthesized image data to the size of the video content to generate a display image. The image synthesis processing unit 124 outputs the display image.

(Explanation of Object Position Determination Method)

Figure 24:
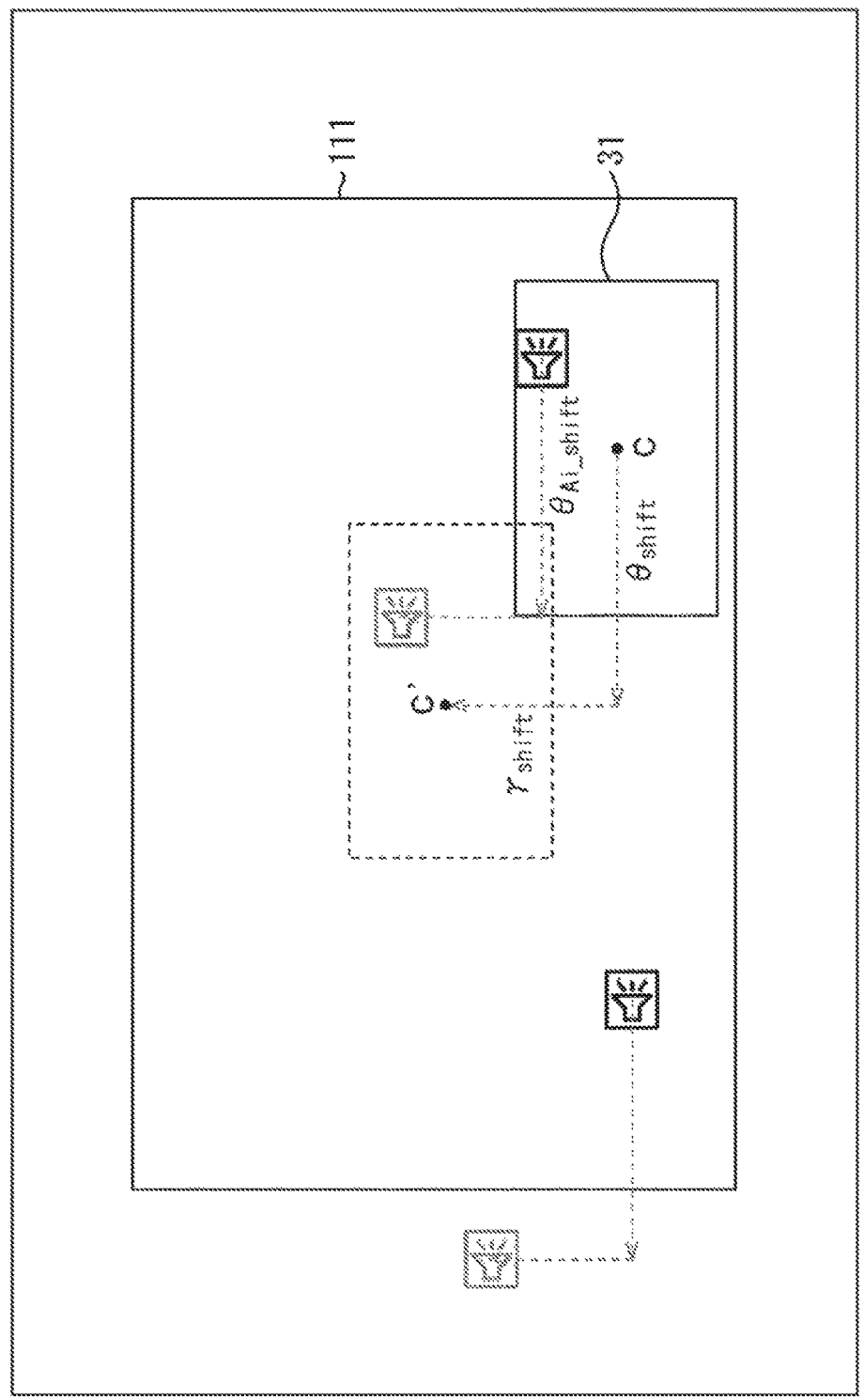
FIG. 24 is a diagram illustrating a method of determining a position of an object.
Figure 25:
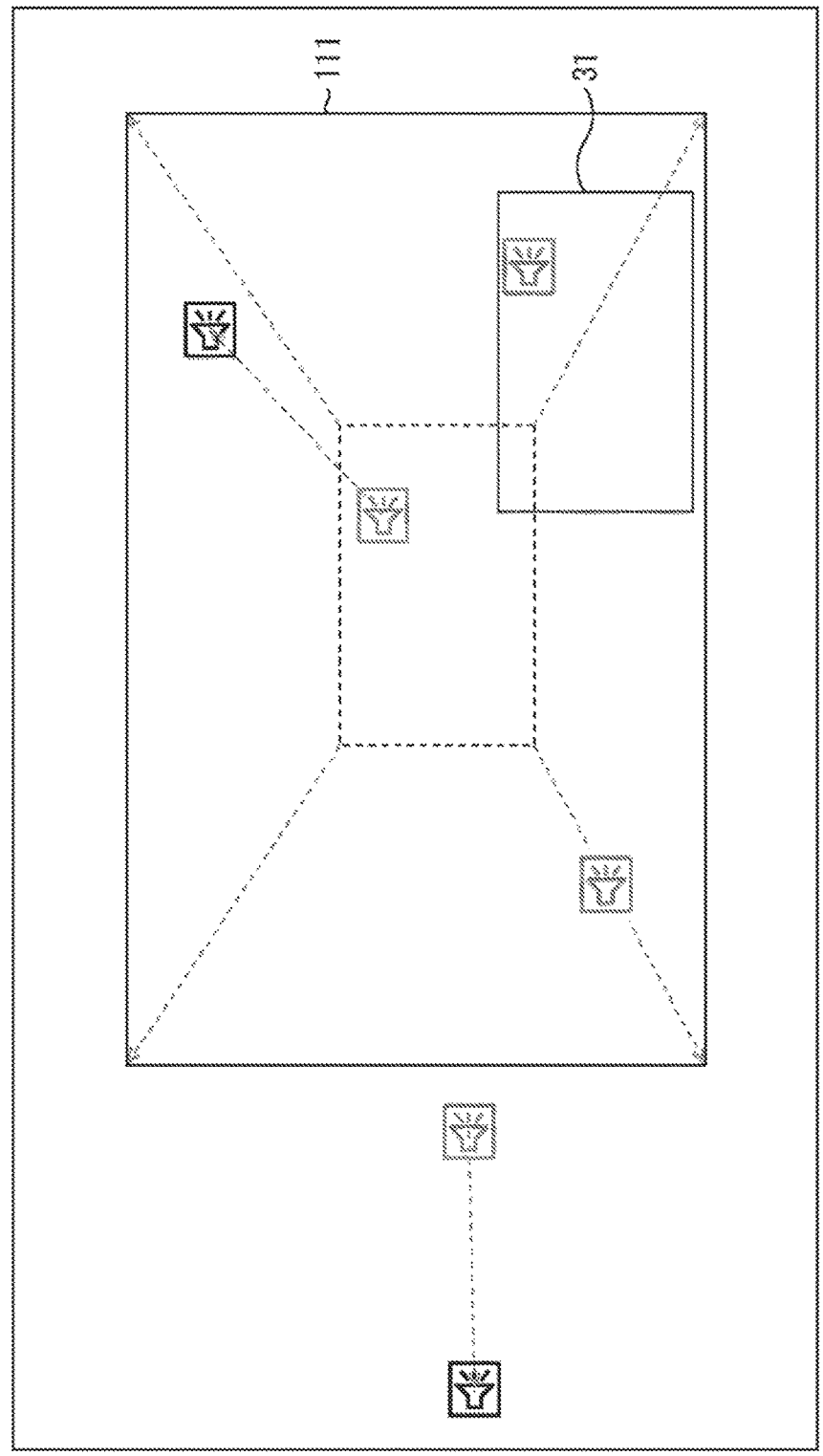
FIG. 25 is a diagram illustrating a method of determining a position of an object.
Figure 26:
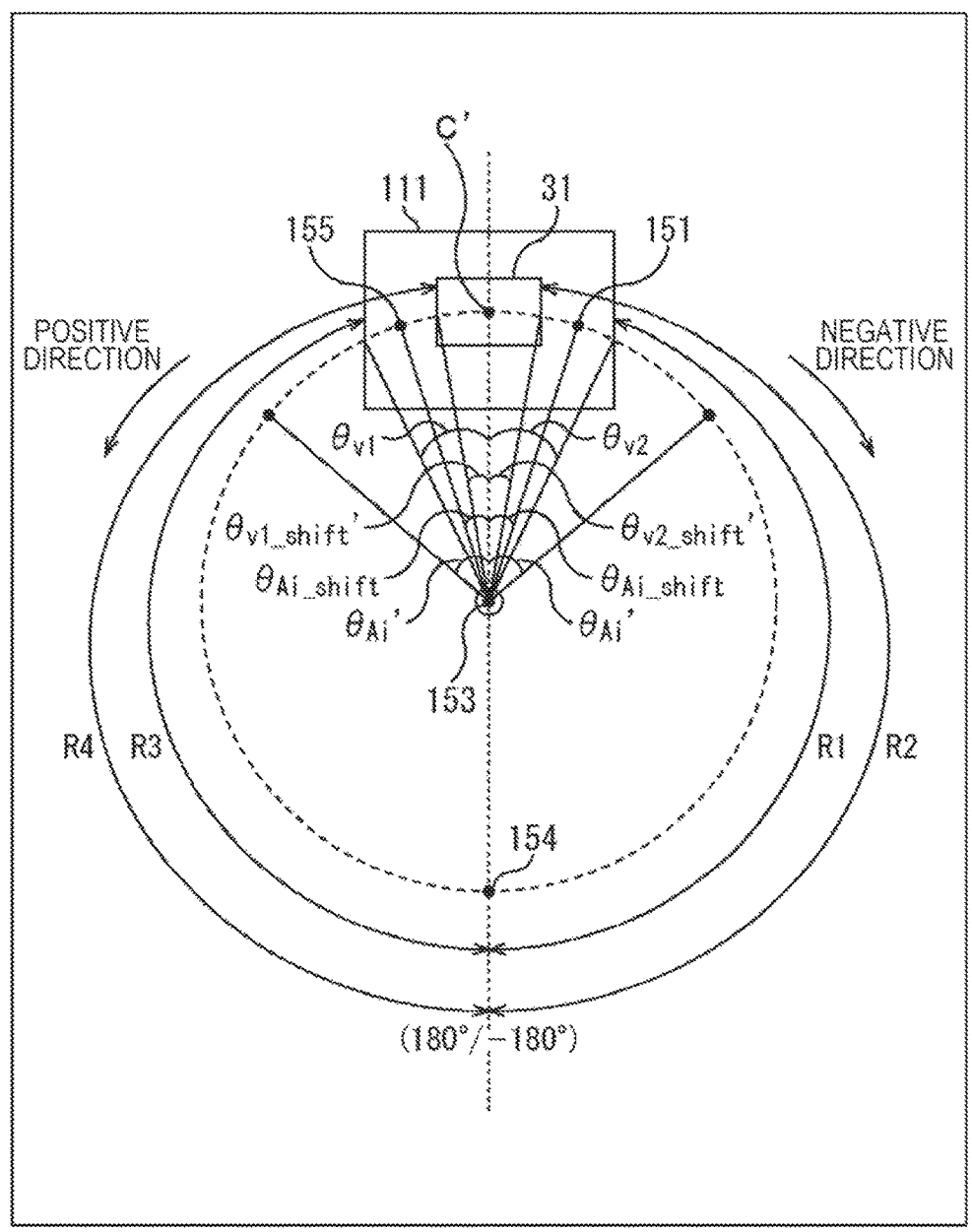
FIG. 26 is a diagram illustrating a method of determining a position of an object.

FIGS. 24 to 26 are diagrams each illustrating the object position determination method by the position determination unit 122 shown in FIG. 23.

The display area 31 is extracted from the video content and the size of the display area 31 is converted to the size of the video content, so that the display image 111 is generated. Thus, the display image 111 has a size equivalent to the size obtained by shifting the center C of the display area 31 to the center C' of the display image 111 as shown in FIG. 24 and by converting the size of the display area 31 to the size of the video content as shown in FIG. 25.

Thus, the position determination unit 122 calculates, by the following Formula (1), a shift amount $\theta_{shift}$ in horizontal direction when the center O of the display area 31 is shifted to the center O' of the display image 111.

[Mathematical Formula 1]

$$\theta_{shift} = \frac{\theta'_{v1} + \theta'_{v2} - \theta_{v1} - \theta_{v2}}{2} \quad (1)$$

In Formula (1), $\theta_{v1}'$ represents a horizontal angle at a left end of the display area 31 included in the display area image frame size information, and $\theta_{v2}'$ represents a horizontal angle at a right end of the display area 31 included in the display area image frame size information. Further, $\theta_{v1}$ represents a horizontal angle at a left end in the content image frame size information, and $\theta_{v2}$ represents a horizontal angle at a right end in the content image frame size information.

Next, the position determination unit 122 calculates, by the following Formula (2), a horizontal angle $\theta_{v1\_shift}'$ at the left end of the display area 31 and a horizontal angle $\theta_{v2\_shift}'$ at the right end thereof after the center O of the display area 31 is shifted to the center O' of the display image 111 by using the shift mount $\theta_{shift}$.

[Mathematical Formula 2]

$$\theta_{v1\_shift}' = \mathrm{mod}(\theta_{v1}' + \theta_{shift} + 180°, 360°) - 180°$$

$$\theta_{v2\_shift}' = \mathrm{mod}(\theta_{v2}' + \theta_{shift} + 180°, 360°) - 180° \quad (2)$$

According to Formula (2), the horizontal angle $\theta_{v1\_shift}'$ and the horizontal angle $\theta_{v2\_shift}'$ are calculated so as not to exceed the range of $-180°$ to $180°$.

Note that, as described above, the display image 111 has a size equivalent to the size obtained by shifting the center O of the display area 31 to the center O' of the display image 111 and by converting the size of the display area 31 to the size of the video content. Thus, the following Formula (3) is satisfied for the horizontal angles $\theta_{v1}$ and $\theta_{v2}$.

[Mathematical Formula 3]

$$\theta_{v1} = \frac{\theta_{v1} - \theta_{v2}}{\theta'_{v1\_shift} - \theta'_{v2\_shift}} * \theta'_{v1\_shift} \quad (3)$$

$$\theta_{v2} = \frac{\theta_{v1} - \theta_{v2}}{\theta'_{v1\_shift} - \theta'_{v2\_shift}} * \theta'_{v2\_shift}$$

The position determination unit 122 calculates the shift amount $\theta_{shift}$, the horizontal angle $\theta_{v1\_shift}'$, and the horizontal angles $\theta_{v2\_shift}'$, in the manner as described above, and then calculates a horizontal angle of each object in the display image 111. Specifically, the position determination unit 122 calculates, by the following Formula (4), a horizontal angle $\theta_{Ai\_shift}$ of the object #i after the center C of the display area 31 is shifted to the center C' of the display image 111 by using the shift mount $\theta_{shift}$.

[Mathematical Formula 4]

$$\theta_{Ai\_shift} = \mathrm{mod}(\theta_{Ai} + \theta_{shift} + 180°, 360°) - 180° \quad (4)$$

In Formula (4), $\theta_{Ai}$ represents the horizontal angle of the object #i included in the object position information. Further, according to Formula (4), the horizontal angle $\theta_{Ai\_shift}$ is calculated so as not to exceed the range of $-180°$ to $180°$.

Next, when the object #i is present in the display area 31, that is, when the condition of $\theta_{v2\_shift}' < \theta_{Ai\_shift} < \theta_{v1\_shift}'$ is satisfied, the position determination unit 122 calculates a horizontal angle $\theta_{A1}'$ of the object #i in the display image 111 by the following Formula (5).

[Mathematical Formula 5]

$$\theta'_{Ai} = \frac{\theta_{v1} - \theta_{v2}}{\theta'_{v1\_shift} - \theta'_{v2\_shift}} \cdot \left(\theta_{Ai\_shift} - \frac{\theta_{v1} + \theta_{v2}}{2}\right) \quad (5)$$

According to Formula (5), the horizontal angle $\theta_{Ai}'$ is calculated by extending the distance between the position of the object #i in the display image 111 and the center C' of the display image 111 according to the ratio between the size of the display area 31 and the size of the display image 111.

On the other hand, when no object #i is present in the display area 31, that is, when the condition of $-180° \leq \theta_{Ai\_shift} \leq \theta_{v2\_shift}'$ or $\theta_{v1\_shift}' \leq \theta_{Ai\_shift} \leq 180°$ is satisfied, the position determination unit 122 calculates the horizontal angle $\theta_{Ai}'$ of the object #i in the display image 111 by the following Formula (6).

[Mathematical Formula 6]

$$\theta_{Ai}' = \frac{\theta_{v2} + 180°}{\theta_{v2\_shift}' + 180°} \cdot (\theta_{Ai\_shift} + 180°) - 180° \quad (6)$$

(when $-180° \leq \theta_{Ai\_shift} \leq \theta_{v2\_shift}'$)

$$\theta_{Ai}' = \frac{180° - \theta_{v1}}{180° - \theta_{v1\_shift}'} \cdot (\theta_{Ai\_shift} + 180°) + 180°$$

(when $\theta_{v1\_shift}' \leq \theta_{Ai\_shift} \leq 180°$)

According to Formula (6), when the object #i is present at a position 151 on the right side of the display area 31 ($-180° \leq \theta_{Ai\_shift} \leq \theta_{v2\_shift}'$) as shown in FIG. 26, the horizontal angle $\theta_{Ai}'$ is calculated by extending the horizontal angle $\theta_{Ai\_shift}$ according to the ratio between an angle R1 and an angle R2. Note that the angle R1 is the angle measured from the right end of the display image 111 to a position 154 just behind a viewer 153, and the angle R2 is the angle measured from the right end of the display area 31 whose center is shifted to the position 154.

Further, according to Formula (6), when the object #i is present at a position 155 on the left side of the display area 31 ($\theta_{v1\_shift}' \leq \theta_{Ai\_shift} \leq 180°$), the horizontal angle $\theta_{Ai}'$ is calculated by extending the horizontal angle $\theta_{Ai\_shift}$ according to the ratio between an angle R3 and an angle R4. Note that the angle R3 is the angle measured from the left end of the display image 111 to the position 154, and the angle R4 is the angle measured from the left end of the display area 31 whose center is shifted to the position 154.

Further, the position determination unit 122 calculates a vertical angle $\gamma_{Ai}'$ in a similar manner to the horizontal angle $\theta_{Ai}'$. Specifically, the position determination unit 122 calculates, by the following Formula (7), a movement amount $\gamma_{shift}$ in the vertical direction when the center C of the display area 31 is shifted to the center C' of the display image 111.

[Mathematical Formula 7]

$$\gamma_{shift} = \frac{\gamma_{v1}' + \gamma_{v2}' - \gamma_{v1} - \gamma_{v2}}{2} \quad (7)$$

In Formula (7), $\gamma_{v1}'$ represents the vertical angle at an upper end of the display area 31 included in the display area image frame size information, and $\gamma_{v2}'$ represents the vertical angle at a lower end thereof. Further, $\gamma_{v1}$ represents the vertical angle at an upper end in the content image frame size information, and $\gamma_{v2}$ represents the vertical angle at a lower end in the content image frame size information.

Next, the position determination unit 122 calculates, by the following Formula (8), a vertical angle $\gamma_{v1\_shift}'$ at an upper end of the display area 31 and a vertical angle $\gamma_{v2\_shift}'$ at a lower end thereof after the center C of the display area 31 is shifted to the center C' of the display image 111 by using the movement amount $\gamma_{shift}$.

[Mathematical Formula 8]

$$\gamma_{v1\_shift}' = \mod(\gamma_{v1}' + \gamma_{shift}90°, 180°) - 90°$$

$$\gamma_{v2\_shift}' = \mod(\gamma_{v2}' + \gamma_{shift}90°, 180°) - 90° \quad (8)$$

According to Formula (8), the vertical angle $\gamma_{v1\_shift}'$ and the vertical angle $\gamma_{v2\_shift}'$ are calculated so as not to exceed the range of $-90°$ to $90°$.

The position determination unit 122 calculates the movement amount $\gamma_{shift}$, the vertical angle $\gamma_{v1\_shift}'$, and the vertical angle $\gamma_{v2\_shift}'$ in the manner as described above, and then calculates the position of each object in the display image 111. Specifically, the position determination unit 122 calculates, by the following Formula (9), a vertical angle $\gamma_{Ai\_shift}$ of the object #i after the center C of the display area 31 is shifted to the center C' of the display image 111 by using the movement amount $\gamma_{shift}$.

[Mathematical Formula 9]

$$\gamma_{Ai\_shift} = \mod(\gamma_{Ai} + \gamma_{shift} + 90°, 180°) - 90° \quad (9)$$

In Formula (9), $\gamma_{Ai}$ represents the vertical angle of the object #i included in the object position information. Further, according to Formula (9), the vertical angle $\beta_{Ai\_shift}$ is calculated so as not to exceed the range of $-90°$ to $90°$.

Next, the position determination unit 122 calculates a vertical angle $\gamma_{A1}'$ of the object #i in the display image 111 by the following Formula (10).

[Mathematical Formula 10]

$$\gamma_{Ai}' = \begin{cases} \frac{\gamma_{v2} + 90°}{\gamma_{v2\_shift}' + 90°} \cdot (\gamma_{Ai\_shift} + 90°) - 90° \\ \quad (\text{when } -90° \leq \gamma_{Ai\_shift} \leq \gamma_{v2\_shift}') \\ \frac{\gamma_{v1} - \gamma_{v2}}{\gamma_{v1\_shift}' - \gamma_{v2\_shift}'} \cdot \left(\gamma_{Ai\_shift} - \frac{\gamma_{v1} + \gamma_{v2}}{2}\right) \\ \quad (\text{when } \gamma_{v2\_shift}' < \gamma_{Ai\_shift} < \gamma_{v1\_shift}') \\ \frac{90° - \gamma_{v1}}{90° - \gamma_{v1\_shift}'} \cdot (\gamma_{Ai\_shift} - 90°) + 90° \\ \quad (\text{when } \gamma_{v1\_shift}' \leq \gamma_{Ai\_shift} \leq 90°) \end{cases} \quad (10)$$

Further, the position determination unit 122 determines a distance $r_{A1}'$ of the object #i in the display image 111 to be a distance $r_{A1}$ of the object #i included in the object position information. The position determination unit 122 supplies the audio synthesis processing unit 123 with the horizontal angle $\theta_{Ai}'$ the vertical angle $\gamma_{A1}'$, and the distance $r_{A1}$ of the object #i, which are obtained as described above, as the position of the object #i.

Figure 27:
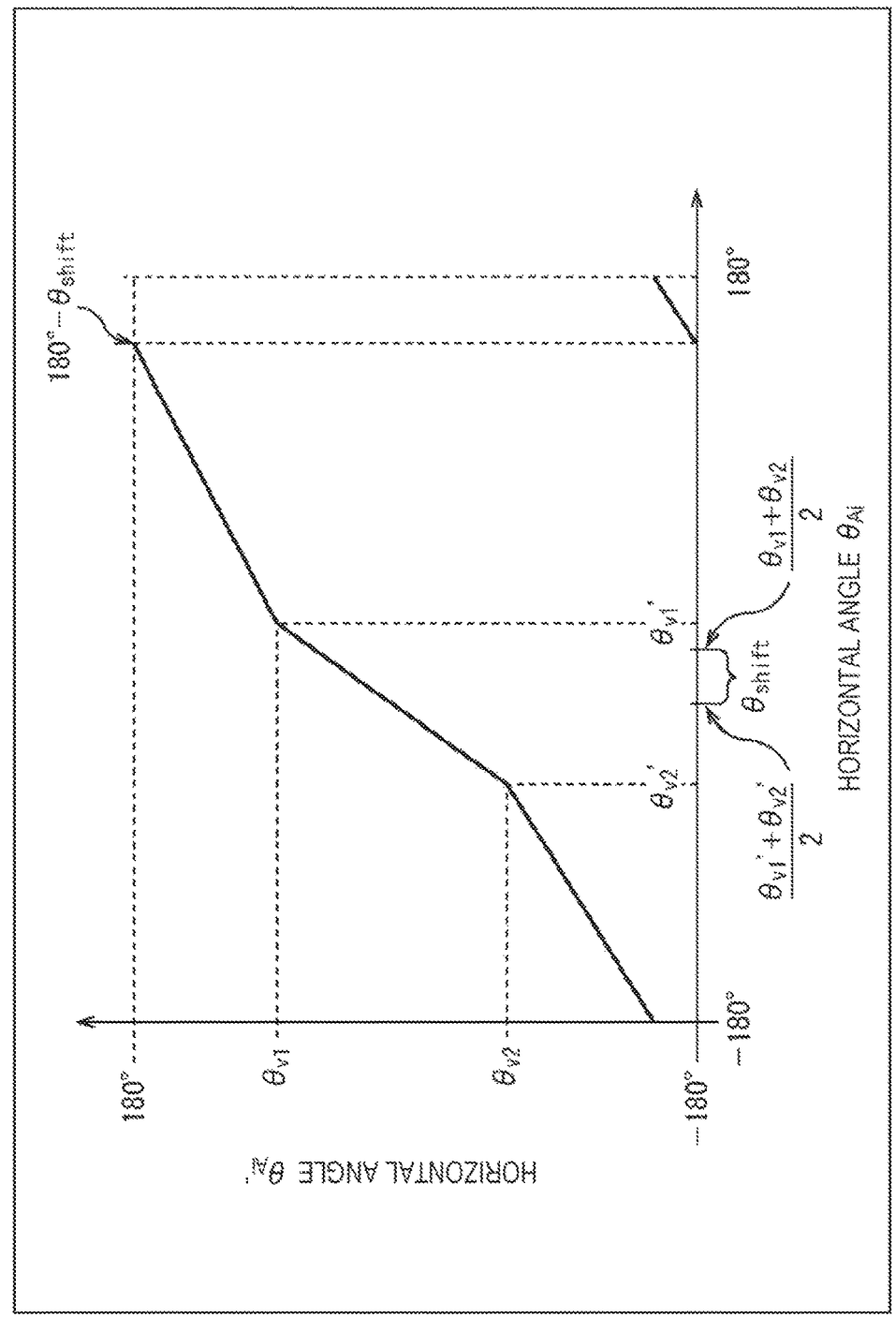
FIG. 27 is a diagram showing a relationship between a horizontal angle $\theta_{Ai}$ and a horizontal angle $\theta_{Ai}'$.

FIG. 27 is a diagram showing the relationship between the horizontal angle $\theta_{Ai}$ and the horizontal angle $\theta_{Ai}'$.

In the graph of FIG. 27, the horizontal axis represents the horizontal angle $\theta_{Ai}$, and the vertical axis represents the horizontal angle $\theta_{Ai}'$.

As shown in FIG. 27, when the condition of $\theta_{v2}' < \theta_{Ai} < \theta_{v1}'$ is satisfied, the horizontal angle $\theta_{Ai}$ is shifted by the movement amount $\theta_{shift}$ and is extend, and then the horizontal angle $\theta_{Ai}$ becomes equal to the horizontal angle $\theta_{Ai}'$. Further, when the condition of $-180° \leq \theta_{Ai} \leq \theta_{v2}'$ or $\theta_{v1}' \leq \theta_{Ai} \leq 180°$ is satisfied, the horizontal angle $\theta_{Ai}$ is shifted by the movement amount $\theta_{shift}$ and is reduced, and then the horizontal angle $\theta_{Ai}$ becomes equal to the horizontal angle $\theta_{Ai}'$.

(Explanation of Process of Streaming Playback Unit)

Figure 28:
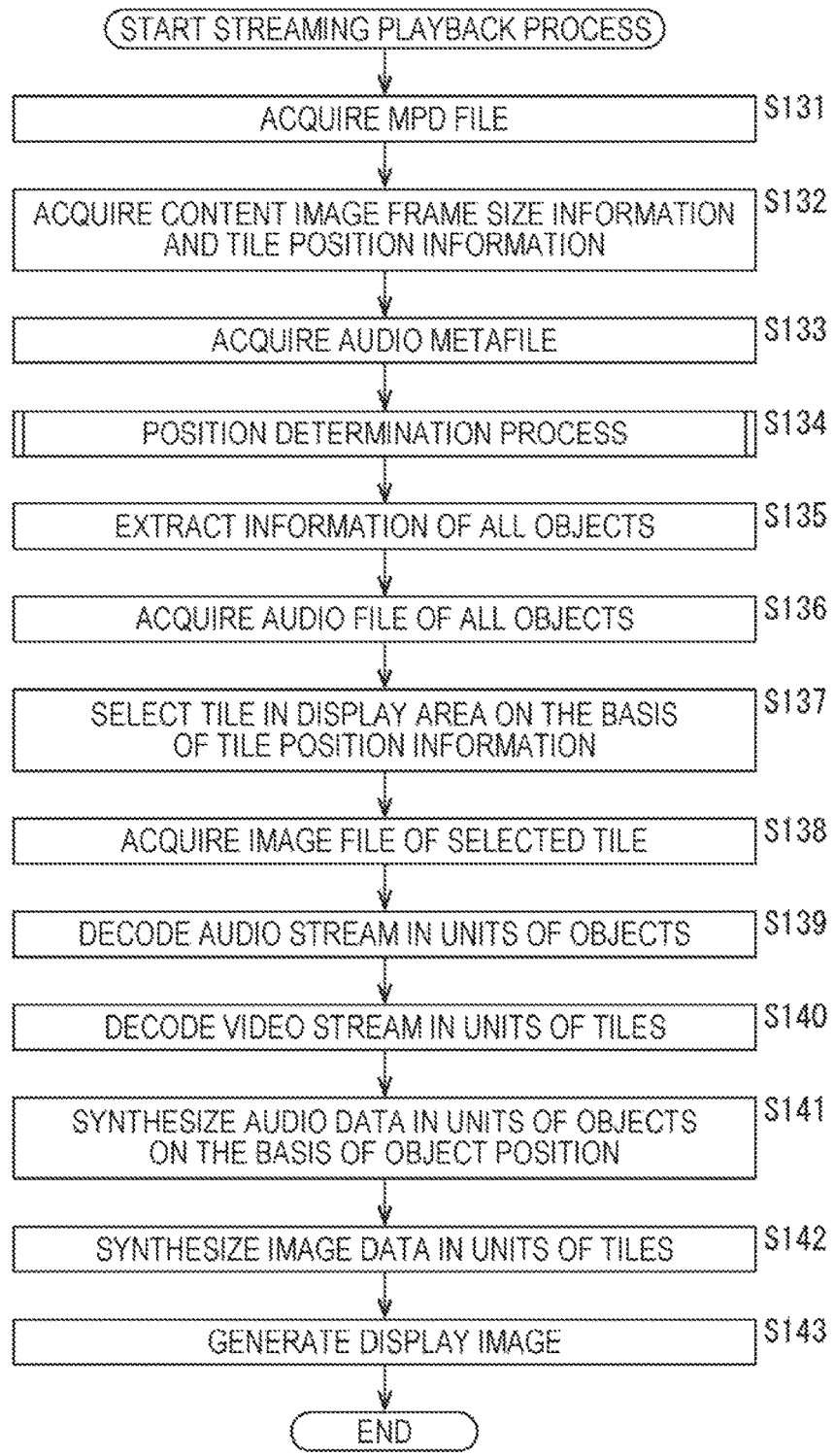
FIG. 28 is a flowchart illustrating the streaming playback process of the streaming playback unit shown in FIG. 23.

FIG. 28 is a flowchart illustrating a streaming playback process of the streaming playback unit 120 shown in FIG. 23.

In step S131 of FIG. 28, the MPD acquisition unit 91 of the streaming playback unit 120 acquires the MPD file from the Web server 12 and supplies the MPD processing unit 121 with the MPD file.

In step S132, the MPD processing unit 121 acquires the content image frame size information and the tile position information, which are described in "AdaptationSet" for image, from the MPD file supplied from the MPD acquisition unit 91. The MPD processing unit 121 supplies the position determination unit 122 with the image frame size information, and supplies the image selection unit 98 with the tile position information. Further, the MPD processing unit 121 extracts information such as a URL described in "Segment" for audio metafile, and supplies the extracted information to the metafile acquisition unit 93.

In step S133, the metafile acquisition unit 93 requests the Web server 12 to send the audio metafile specified by the URL on the basis of the information such as the URL supplied from the MPD processing unit 121, and acquires the audio metafile. The metafile acquisition unit 93 supplies the position determination unit 122 with the object position information included in the audio metafile.

In step S134, the position determination unit 122 performs a position determination process for determining the position of each object in the display image on the basis of the object position information, the content image frame size information, and the display area image frame size information. The position determination process will be described in detail with reference to FIG. 29 which is described later.

In step S135, the MPD processing unit 121 extracts information such as a URL described in "Segment" for audio file of all objects from the MPD file, and supplies the audio file acquisition unit 95 with the extracted information.

In step S136, the audio file acquisition unit 95 requests the Web server 12 to send an audio file of all objects specified by the URL on the basis of the information such as the URL supplied from the MPD processing unit 121, and acquires the audio file. The audio file acquisition unit 95 supplies the audio decoding processing unit 96 with the acquired audio file in units of objects.

The process of steps S137 to S140 is similar to the process of steps S36 to S39 shown in FIG. 14, and thus the descriptions thereof will be omitted.

In step S141, the audio synthesis processing unit 123 synthesizes and outputs the audio data in units of objects supplied from the audio decoding processing unit 96 on the basis of the position of each object supplied from the position determination unit 122.

In step S142, the image synthesis processing unit 124 synthesizes the image data in units of tiles supplied from the image decoding processing unit 100.

In step S143, the image synthesis processing unit 124 converts the size of the image corresponding to the synthesized image data into the size of the video content, and generates the display image.

Then, the image synthesis processing unit 124 outputs the display image, and the process is terminated.

Figure 29:
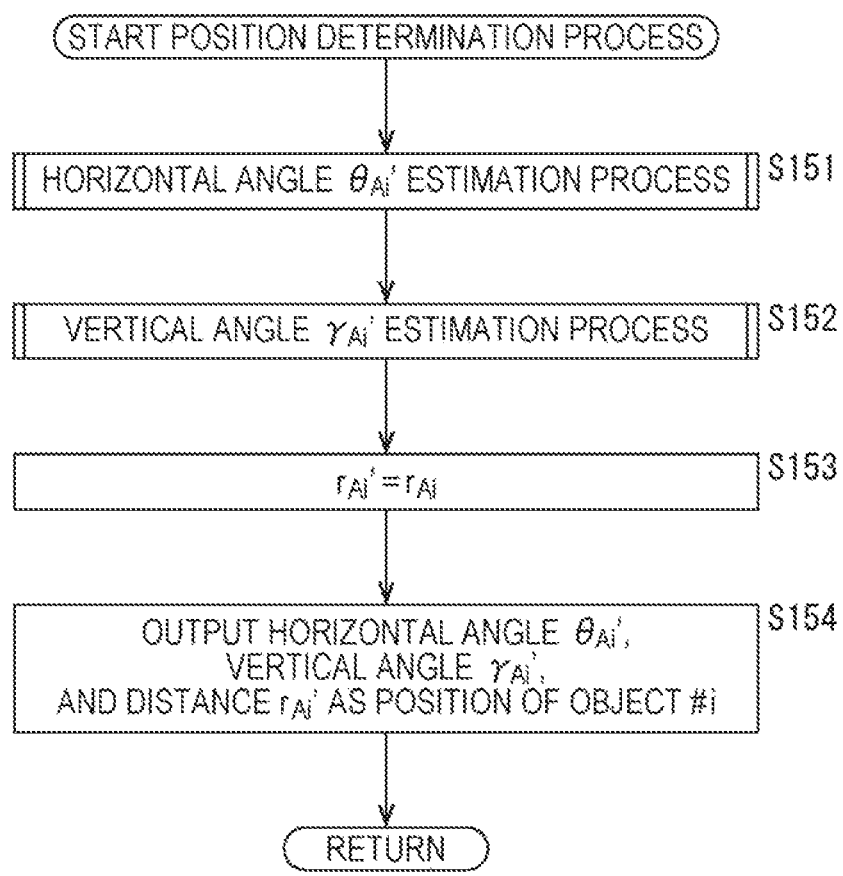
FIG. 29 is a flowchart illustrating details of a position determination process shown in FIG. 28.

FIG. 29 is a flowchart illustrating details of the position determination process in step S134 of FIG. 28. This position determination process is carried out, for example, for each object.

In step S151 of FIG. 29, the position determination unit 122 performs a horizontal angle $\theta_{Ai}'$ estimation process for estimating the horizontal angle $\theta_{Ai}'$ in the display image. Details of the horizontal angle $\theta_{Ai}'$ estimation process will be described with reference to FIG. 30 which is described later.

In step S152, the position determination unit 122 performs a vertical angle $\gamma_{Ai}'$ estimation process for estimating the vertical angle $\gamma_{Ai}'$ in the display image. Details of the vertical angle $\gamma_{Ai}'$ estimation process are similar to those of the horizontal angle $\theta_{Ai}'$ estimation process in step S151, except that the vertical direction is used in place of the horizontal direction, and thus a detailed description thereof will be omitted.

In step S153, the position determination unit 122 determines a distance $r_{Ai}'$ in the display image to be a distance $r_{Ai}$ included in the object position information supplied from the metafile acquisition unit 93.

In step S154, the position determination unit 122 outputs, to the audio synthesis processing unit 123, the horizontal angle $\theta_{Ai}'$, the vertical angle $\gamma_{Ai}'$, and the distance $r_{Ai}$, as the position of the object #i. Then, the process returns to step S134 of FIG. 28 and proceeds to step S135.

Figure 30:
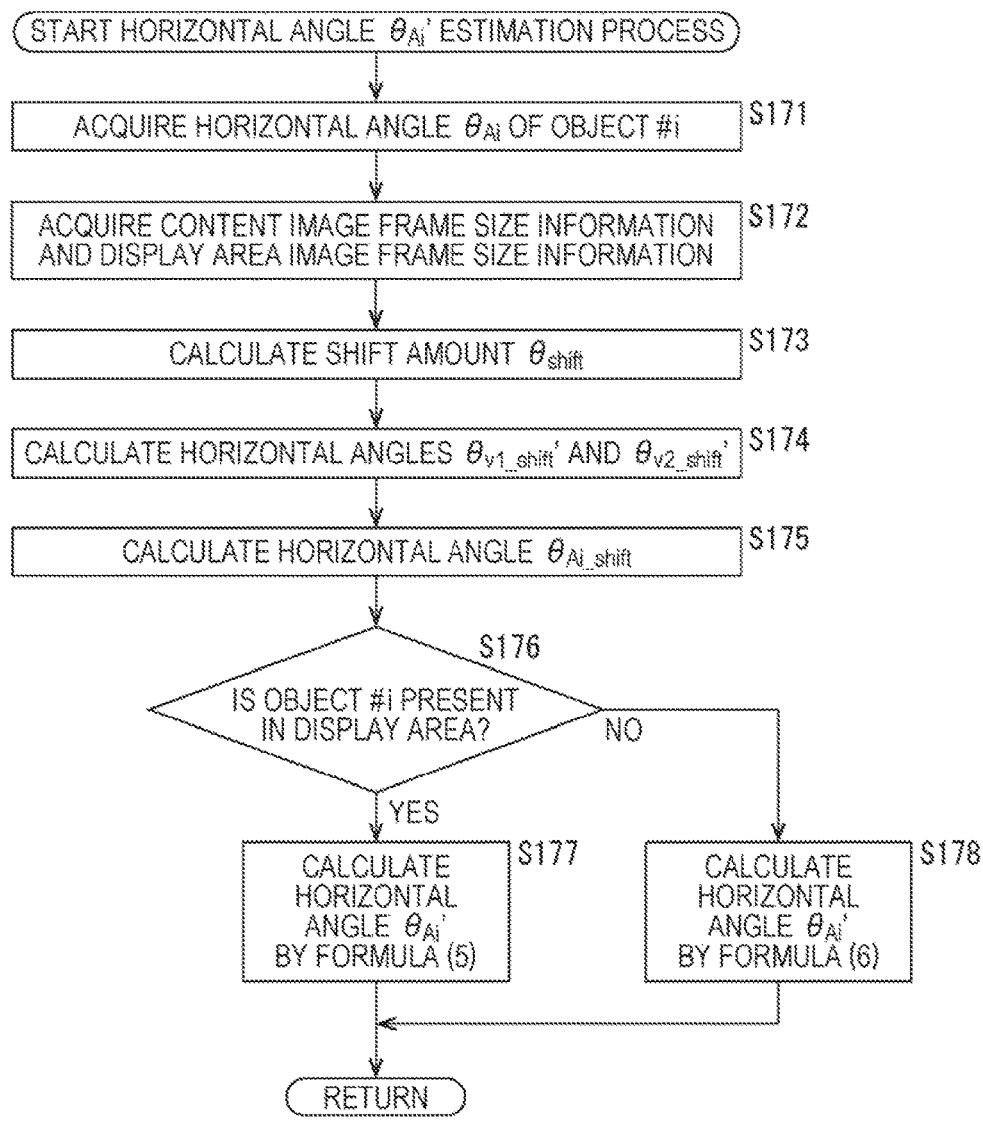
FIG. 30 is a flowchart illustrating details of a horizontal angle $\theta_{Ai}'$ estimation process shown in FIG. 29.

FIG. 30 is a flowchart illustrating details of the horizontal angle $\theta_{Ai}'$ estimation process in step S151 of FIG. 29.

In step S171 shown in FIG. 30, the position determination unit 122 acquires the horizontal angle $\theta_{Ai}$ included in the object position information supplied from the metafile acquisition unit 93.

In step S172, the position determination unit 122 acquires the content image frame size information supplied from the MPD processing unit 121 and the display area image frame size information specified by the user.

In step S173, the position determination unit 122 calculates the movement amount $\theta_{shift}$ by the above-mentioned Formula (1) on the basis of the content image frame size information and the display area image frame size information.

In step S174, the position determination unit 122 calculates horizontal angles $\theta_{v1\_shift}'$ and $\theta_{v2\_shift}'$ by the above-mentioned Formula (2) using the movement amount $\theta_{shift}$ and the display area image frame size.

In step S175, the position determination unit 122 calculates the horizontal angle $\theta_{Ai\_shift}$ by the above-mentioned Formula (4) using the horizontal angle $\theta_{Ai}$ and the movement amount $\theta_{shift}$.

In step S176, the position determination unit 122 determines whether the object #i is present in the display area 31 (the horizontal angle of the object #i is between the horizontal angles at both ends of the display area 31), i.e., whether the condition of $\theta_{v2\_shift}' < \theta_{Ai\_shift} < \theta_{v1\_shift}$ is satisfied or not.

When it is determined in step S176 that the object #i is present in the display area 31, that is, when the condition of $\theta_{v2\_shift}' < \theta_{Ai\_shift} < \theta_{v1\_shift}'$ is satisfied, the process proceeds to step S177. In step S177, the position determination unit 122 calculates the horizontal angle $\theta_{A1}'$ by the above-mentioned Formula (5) on the basis of the content image frame size information, the horizontal angles $\theta_{v1\_shift}'$ and $\theta_{v2\_shift}'$, and the horizontal angle $\theta_{Ai\_shift}$.

On the other hand, when it is determined in step S176 that the object #i is not present in the display area 31, that is, when the condition of $-180° \leq \theta_{Ai\_shift} \leq \theta_{v2 \leq shift}'$ or $\theta_{v1\_shift}' \leq \theta_{Ai\_shift} \leq 180°$ is satisfied, the process proceeds to step S178. In step S178, the position determination unit 122 calculates the horizontal angle $\theta_{Ai}'$ by the above-mentioned Formula (6) on the basis of the content image frame size information, the horizontal angle $\theta_{v1\_shift}'$ or $\theta_{v2\_shift}'$, and the horizontal angle $\theta_{Ai\_shift}$.

After the process of step S177 or step S178, the process returns to step S151 of FIG. 29 and proceeds to step S152.

Note that in the second example, the size of the display image is the same as the size of the video content, but instead the size of the display image may be different from the size of the video content.

Further, in the second example, the audio data of all objects is not synthesized and output, but instead only the audio data of some objects (for example, an object in the display area, an object in a predetermined range from the display area, etc.). The method for selecting an object of audio data to be output may be determined in advance, or may be specified by the user.

Further, in the above description, only the audio data in units objects is used, but the audio data may include audio data of channel audio, audio data of higher-order ambisonics (HOA) audio, audio data of spatial audio object coding (SAOC), and metadata (scene information, dynamic or static metadata) of audio data. In this case, for example, not only the coded data of each object, but also the coded data of these pieces of data are arranged as sub-samples.

First Embodiment (Outline of 3D Audio File Format)

Figure 31:
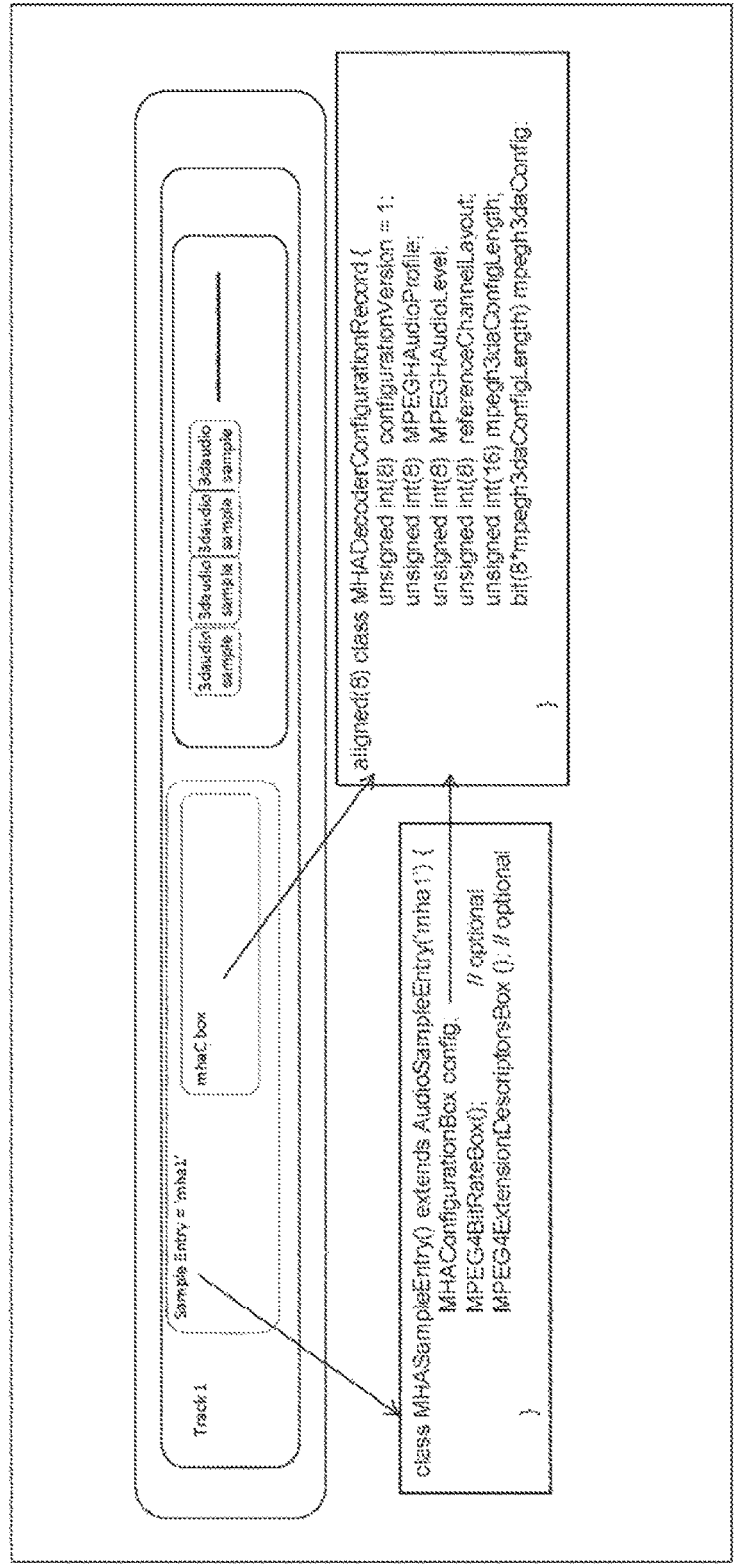
FIG. 31 is a diagram illustrating an outline of tracks of a 3D audio file format of MP4.

Prior to the description of the first embodiment to which the present disclosure is applied, the outline of tracks of the 3D audio file format of MP4 will be described with reference to FIG. 31.

In the MP4 file, the codec information of the video content and the position information indicating the position in the file can be managed for each track. In the 3D audio file format of MP4, all audio streams (elementary stream (ES)) of 3D audio (Channel audio/Object audio/HOA audio/metadata) are recorded as one track in units of samples (frames). Further, the codec information (Profile/level/audio configuration) of 3D audio is stored as a sample entry.

Channel audio constituting the 3D audio is audio data in units of channels; Object audio is audio data in units of objects; HOA audio is spherical audio data; and metadata is metadata of Channel audio/Object audio/HOA audio. In this case, audio data in units of objects is used as Object audio, but instead audio data of SAOC may be used.

(Structure of moov Box)

Figure 32:
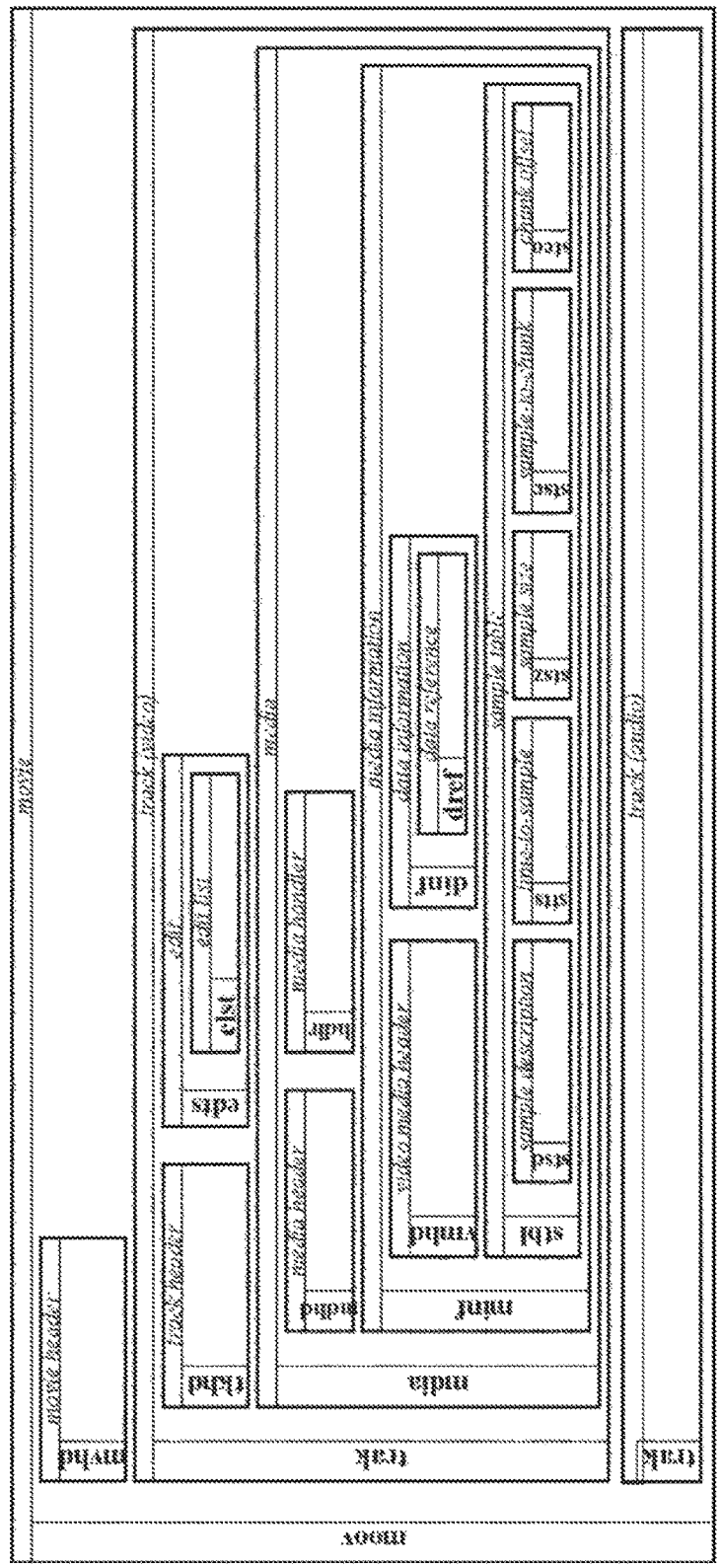
FIG. 32 is a diagram showing a structure of a moov box.

FIG. 32 shows a structure of a moov box of an MP4 file.

As shown in FIG. 32, in the MP4 file, the image data and the audio data are recorded in different tracks. FIG. 32 does not illustrate the details of the track of the audio data, but the track of the audio data is similar to the track of the image data. The sample entry is included in the sample description arranged in an stsd box within the moov box.

Incidentally, in broadcasting or local storage playback, the Web server delivers all audio streams, and the video playback terminal (client) decodes audio streams of necessary 3D audio, while parsing all audio streams, and outputs (rendering) the audio streams. When the bit rate (Bitrate) is high, or when there is a limitation on the rate of reading of a local storage, there is a demand for reducing the load on the decode process by acquiring only the audio stream of necessary 3D audio.

Further, in stream playback, there is a demand for the video playback terminal (client) to acquire only the coded data of necessary 3D audio to thereby acquire an audio stream of a coding rate optimum for the playback environment.

Accordingly, in the present disclosure, the coded data of 3D audio is divided into tracks for each type of the data and the tracks are arranged in the audio file, which makes it possible to efficiently acquire only a predetermined type of coded data. Thus, the load on the system can be reduced in broadcasting and local storage playback. Further, in stream playback, the highest-quality coded data of necessary 3D audio can be played back according to the frequency band. Further, since it is only necessary to record the position information of the audio stream of 3D audio within the audio file in units of tracks of subsegments, the amount of position information can be reduced as compared with the case where the coded data in units of objects are arranged in the sub-sample.

(Outline of Tracks)

Figure 33:
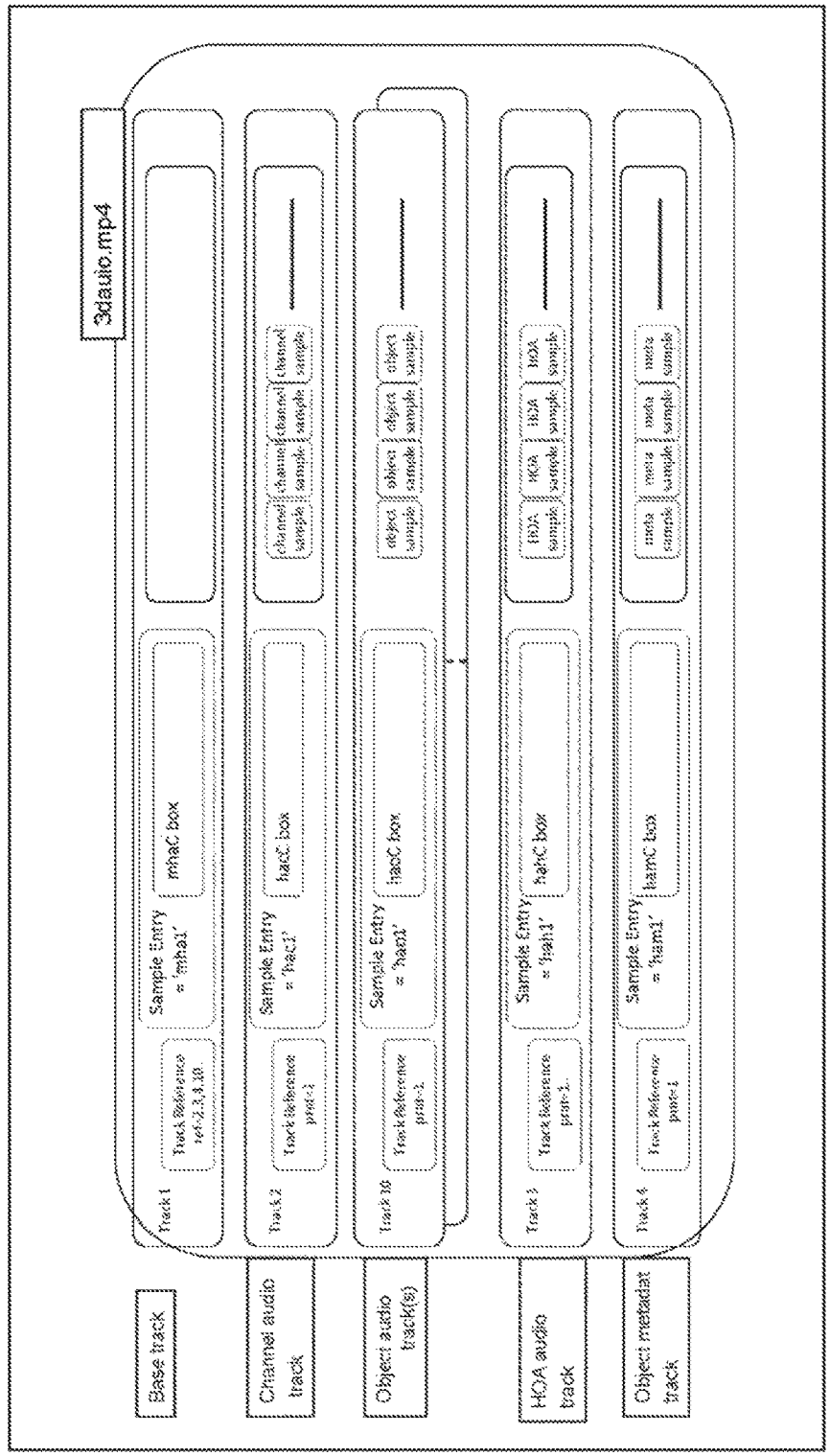
FIG. 33 is a diagram illustrating an outline of tracks according to a first embodiment to which the present disclosure is applied.

FIG. 33 is a diagram illustrating the outline of tracks in the first embodiment to which the present disclosure is applied.

As shown in FIG. 33, in the first embodiment, the Channel audio/Object audio/HOA audio/metadata constituting the 3D audio are respectively set as audio streams of different tracks (Channel audio track/Object audio track(s)/HOA audio track/Object metadata track). The audio stream of audio metadata is arranged in the object metadata track.

Further, as a track for arranging information about the entire 3D audio, a base track (Base Track) is provided. In the base track shown in FIG. 33, the information about the entire 3D audio is arranged in the sample entry, while no sample is arranged in the sample entry. Further, the Base track, Channel audio track, Object audio track(s), HOA audio track, and Object metadata track are recorded as the same audio file (3dauio.mp4).

Track Reference is arranged in, for example, a track box, and represents a reference relationship between a corresponding track and another track. Specifically, Track Reference represents an ID unique to a track in other referred tracks (hereinafter referred to as a track ID). In the example shown in FIG. 33, the track IDs of Base track, Channel audio track, HOA audio track, Object metadata track, and Object audio track(s) are 1, 2, 3, 4, 10 . . . , respectively. Track References of Base track are 2, 3, 4, 10 . . . , and Track References of Channel audio track/HOA audio track/Object metadata track/Object audio track(s) are 1 which corresponds to the track ID of Base track.

Accordingly, Base track and Channel audio track/HOA audio track/Object metadata track/Object audio track(s) have a reference relationship. Specifically, Base track is referred to during playback of Channel audio track/HOA audio track/Object metadata track/Object audio track(s).

(Exemplary Syntax of Sample Entry of Base Track)

FIG. 34 is a diagram showing an exemplary syntax of a sample entry of the base track shown in FIG. 33.

As information about the entire 3D audio, configurationVersion, MPEGHAudioProfile, and MPEGHAudioLevel shown in FIG. 34 represent config information, profile information, and level information, respectively, of the entire audio stream of 3D audio (audio stream of normal 3D audio). Further, as information about the entire 3D audio, the width and the height shown in FIG. 34 represent the number of pixels in the horizontal direction of the video content and the number of pixels in the vertical direction of the video content, respectively. As information about the entire 3D audio, theta1, theta2, gamma1, and gamma2 represent the horizontal angle $\theta_{v1}$ at the left end of the image frame, the horizontal angle $\theta_{v2}$ at the right end of the image frame, the vertical angle $\gamma_{v1}$ at the upper end of the image frame, and the vertical angle $\gamma_{v2}$ at the lower end of the image frame, respectively, in the image frame size information of the video content.
(Exemplary Syntax of Sample Entry of Channel Audio Track)

FIG. 35 is a diagram showing an exemplary syntax of a sample entry of the channel audio track (Channel audio track) shown in FIG. 33.

FIG. 35 shows configurationVersion, MPEGHAudioProfile, and MPEGHAudioLevel represent config information, profile information, and level information, respectively, of Channel Audio.
(Exemplary Syntax of Sample Entry of Object Audio Track)

Figure 36:
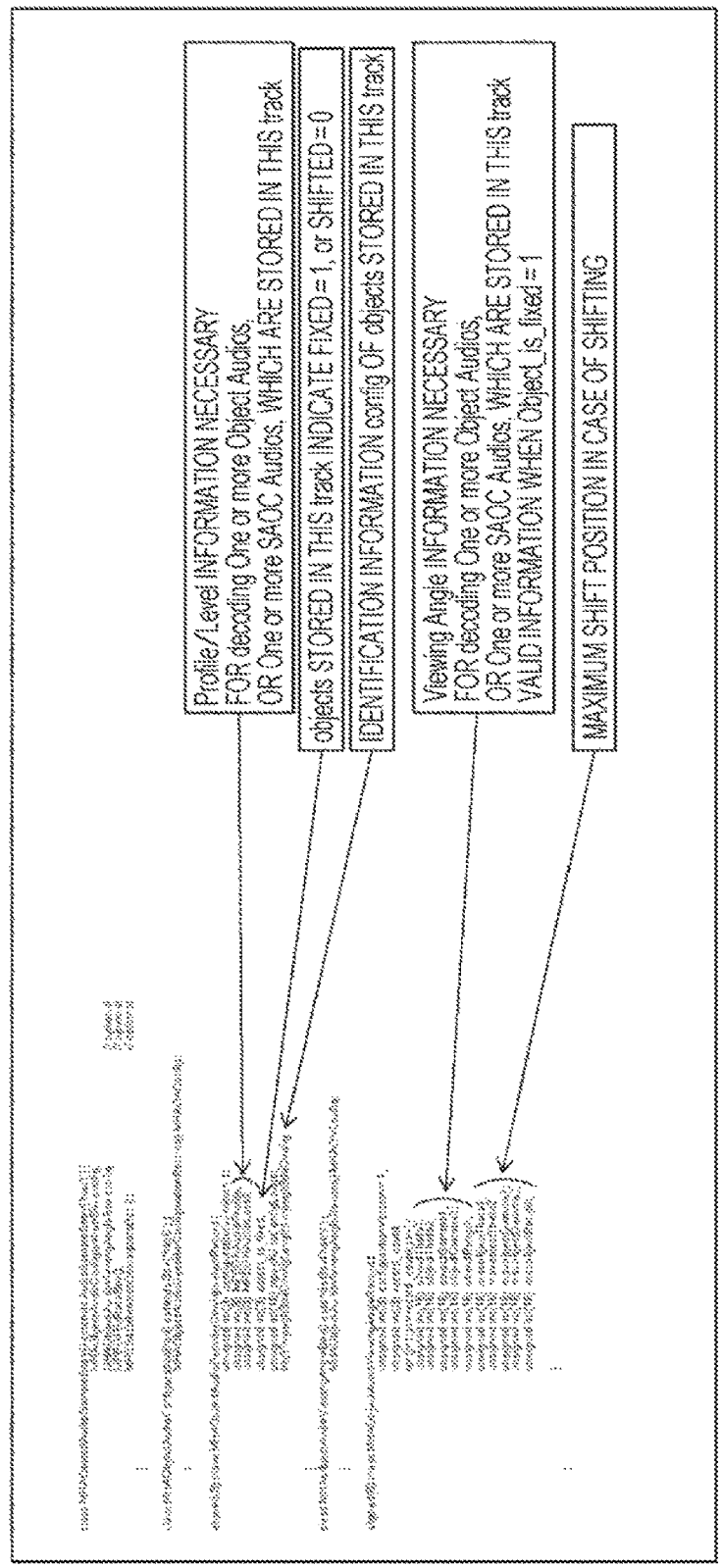
FIG. 36 is a diagram showing an exemplary syntax of a sample entry of an object audio track shown in FIG. 33.

FIG. 36 is a diagram showing an exemplary syntax of a sample entry of the object audio track (Object audio track) shown in FIG. 33.

ConfigurationVersion, MPEGHAudioProfile, and MPEGHAudioLevel shown in FIG. 36 represent config information, profile information, and level information, respectively, in one or more Object audios included in the object audio track. object_is_fixed indicates whether one or more Object audio objects included in the object audio track are fixed or not. When object_is_fixed indicates 1, it indicates that the object is fixed, and when object_is_fixed indicates 0, it indicates that the object is shifted. mpegh3daConfig represents config of identification information of one or more Object audio objects included in the object audio track.

Further, objectTheta1/objectTheta2/objectGamma1/objectGamma2/objectRength represents object information of one or more Object audios included in the object audio track. This object information is information which is valid when Object_is_fixed=1 holds.

maxobjectTheta1, maxobjectTheta2, maxobjectGamma1, maxobjectGamma2/, and maxobjectRength represent maximum values of object information when one or more Object audio objects included in the object audio track are shifted.
(Exemplary Syntax of Sample Entry of HOA Audio Track)

FIG. 37 is a diagram showing an exemplary syntax of a sample entry of the HOA audio track shown in FIG. 33.

ConfigurationVersion, MPEGHAudioProfile, and MPEGHAudioLevel shown in FIG. 37 represent config information, profile information, and level information, respectively, of HOA audio.
(Exemplary Syntax of Sample Entry of Object Metadata Track)

FIG. 38 is a diagram showing an exemplary syntax of a sample entry of the object metadata track (Object metadata track) shown in FIG. 33.

ConfigurationVersion shown in FIG. 38 represents config information of metadata.
(First Example of Segment Structure of Audio File of 3D Audio)

Figure 39:
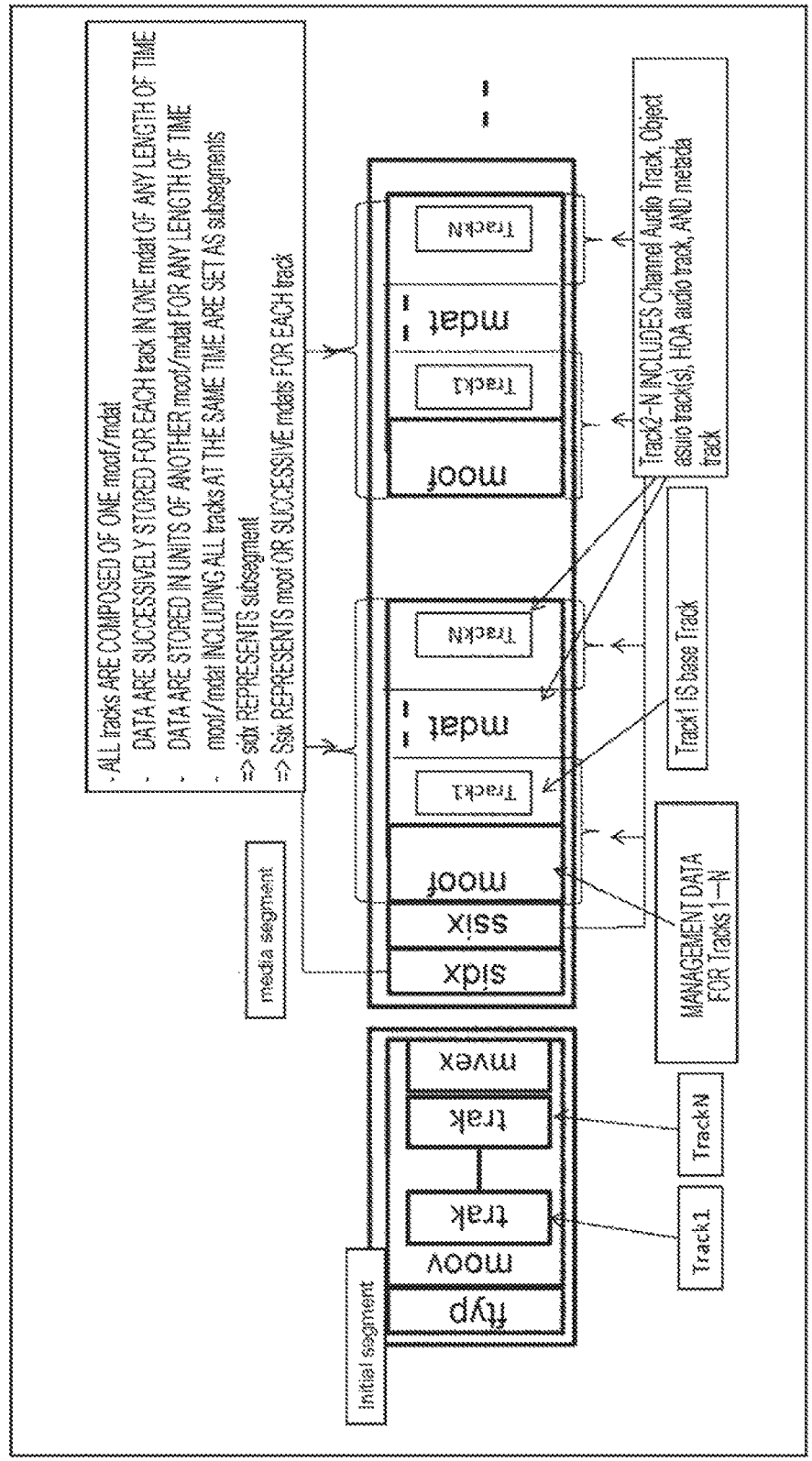
FIG. 39 is a diagram showing a first example of a segment structure.

FIG. 39 is a diagram showing a first example of a segment structure of an audio file of 3D audio in the first embodiment to which the present disclosure is applied.

In the segment structure shown in FIG. 39, Initial segment is composed of an ftyp box and a moov box. trak boxes for each track included in the audio file are arranged in the moov box. An mvex box including information indicating the correspondence relation between the track ID of each track and the level used in an ssix box within the media segment is arranged in the moov box.

Further, the media segment is composed of the sidx box, the ssix box, and one or more subsegments. Position information indicating a position in the audio file of each subsegment is arranged in the sidx box. The ssix box includes position information of an audio stream at each level arranged in the mdat box. Note that each level corresponds to each track. Further, the position information of a first track is the position information of data composed of audio streams of the moof box and the first track.

The subsegment is provided for any length of time. A pair of a moof box and an mdat box which are common to all tracks is provided in the subsegment. In the mdat box, audio streams of all tracks are collectively arranged for any length of time. In the moof box, management information of the audio streams is arranged. The audio streams of each track arranged in the mdat box are continuous for each track.

In the example of FIG. 39, Track1 having the track ID of 1 is a base Track, and Track2 to trackN having track IDs of 2 to N are Channel Audio Track, Object audio track(s), HOA audio track, and object metadata track, respectively. The same holds true for FIG. 40 to be described later.
(Second Example of Segment Structure of Audio File of 3D Audio)

Figure 40:
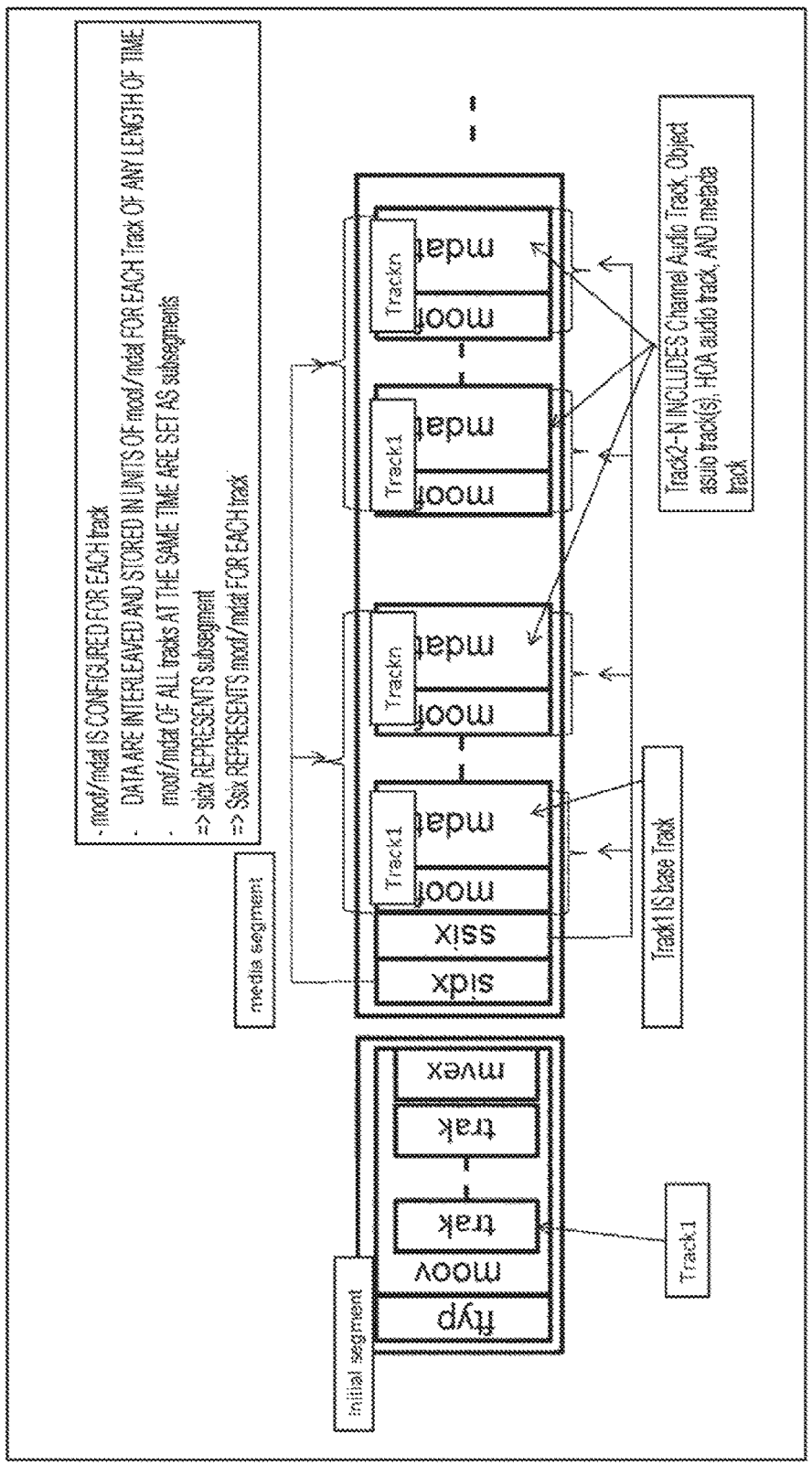
FIG. 40 is a diagram showing a second example of the segment structure.

FIG. 40 is a diagram showing a second example of the segment structure of the audio file of 3D audio in the first embodiment to which the present disclosure is applied.

The segment structure shown in FIG. 40 is different from the segment structure shown in FIG. 39 in that a moof box and an mdat box are provided for each track.

Specifically, Initial segment shown in FIG. 40 is similar to Initial segment shown in FIG. 39. Like the media segment shown in FIG. 39, the media segment shown in FIG. 40 is composed of the sidx box, the ssix box, and one or more subsegments. Further, like the sidx box shown in FIG. 39, the position information of each subsegment is arranged in the sidx box. The ssix box includes the position information of data of each level that is composed of the moof box and the mdat box.

The subsegment is provided for any length of time. A pair of a moof box and an mdat box is provided for each track in the subsegment. Specifically, audio streams of each track are collectively arranged (interleaved and stored) for any length of time in the mdat box of each track, and management information of the audio streams is arranged in the moof box.

As shown in FIGS. 39 and 40, the audio streams for each track are collectively arranged for any length of time, so that the efficiency of acquiring audio streams via HTTP or the like is improved as compared with the case where audio streams are collectively arranged in units of samples.
(Exemplary Description of mvex Box)

Figure 41:
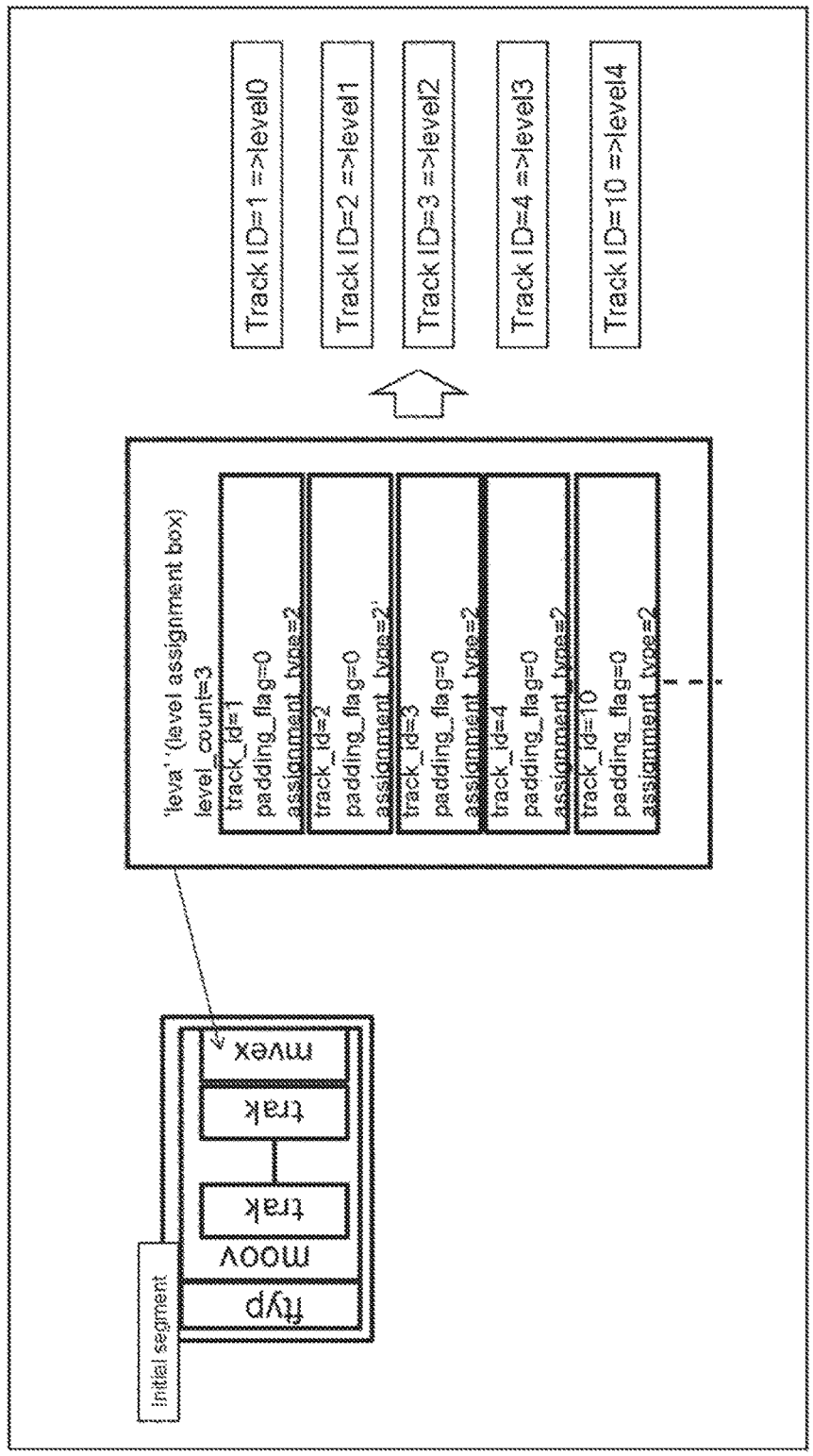
FIG. 41 is a diagram showing an exemplary description of a level assignment box.

FIG. 41 is a diagram showing an exemplary description of a level assignment box arranged in the mvex box shown in FIGS. 39 and 40.

The level assignment box is a box for associating the track ID of each track with the level used in the ssix box. In the example of FIG. 41, the base track having the track ID of 1 is associated with the level 0, and the channel audio track having the track ID of 2 is associated with the level 1. Further, the HOA audio track having the track ID of 3 is associated with the level 2, and the object metadata track having the track ID of 4 is associated with the level 3. Furthermore, the object audio track having the track ID of 10 is associated with the level 4.
(Exemplary Description of MPD File)

Figure 42:
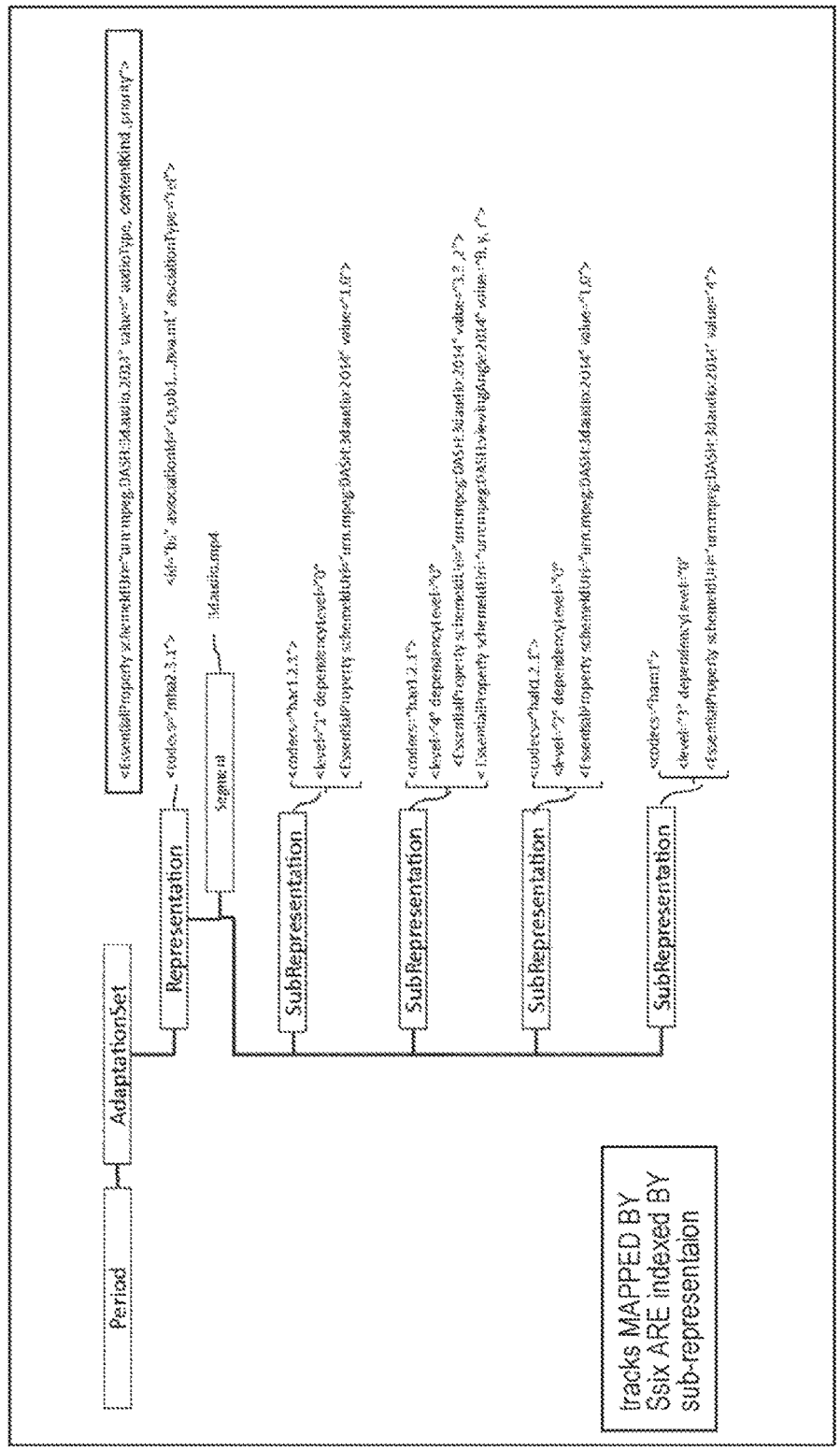
FIG. 42 is a diagram showing an exemplary description of the MPD file in the first embodiment to which the present disclosure is applied.

FIG. 42 is a diagram showing an exemplary description of an MPD file in the first embodiment to which the present disclosure is applied.

As shown in FIG. 42, "Representation" for managing the segment of the audio file (3daudio.mp4) of 3D audio, "SubRepresentation" for managing the tracks included in the segment, and the like are described in the MPD file.

In "Representation" and "SubRepresentation", "codecs" representing a type of codec of a corresponding segment or track in a code defined in a 3D audio file format is included. Further, "id", "associationId", and "assciationType" are included in "Representation".

"id" represents the ID of "Representation" in which "id" is included. "associationId" represents information indicating a reference relationship between a corresponding track and another track, and represents "id" of the reference track. "assciationType" represents a code indicating the meaning of a reference relationship (dependent relationship) with respect to the reference track. For example, the same value as the value of the track reference of MP4 is used.

Further, in "SubRepresentation", "level" which is a value set in the level assignment box as the value representing the corresponding track and the corresponding level is included. In "SubRepresentation", "dependencyLevel" which is a value representing a level corresponding to another track having a reference relationship (dependency) (hereinafter referred to as a reference track) is included.

Further, "SubRepresentation" includes <EssentialProperty schemeIdUri="urn:mpeg:DASH:3daudio:2014" value="audioType, contentkind, priority"> as information necessary for selection of 3D audio.

Further, "SubRepresentation" in the Object audio track includes <EssentialProperty schemeIdUri="urn:mpeg:DASH:viewingAngle:2014" value="θ, γ, r">. When the object corresponding to "SubRepresentation" is fixed, θ, γ, and r represent a horizontal angle, a vertical angle, and a distance, respectively, in the object position information. On the other hand, when the object is shifted, the values θ, γ, and r represent the maximum value of the horizontal angle, the maximum value of the vertical angle, and the maximum value of the distance, respectively, among the maximum values of the object position information.

FIG. 43 is a diagram showing a definition of Essential Property shown in FIG. 42.

On the upper left side of FIG. 43, AudioType of <EssentialProperty schemeIdUri="urn:mpeg:DASH:3daudio:2014" value="audioType, contentkind, priority"> is defined. AudioType represents the type of 3D audio of the corresponding track.

In the example of FIG. 43, when AudioType indicates 1, it indicates that the audio data of the corresponding track is Channel audio of 3D audio, and when AudioType indicates 2, it indicates that the audio data of the corresponding track is HOA audio. Further, when AudioType indicates 3, it indicates that the audio data of the corresponding track is Object audio, and when AudioType is 4, it indicates that the audio data of the corresponding track is metadata.

Further, on the right side of FIG. 43, contentkind of <EssentialProperty schemeIdUri="urn:mpeg:DASH:3daudio:2014" value="audioType, contentkind, priority"> is defined. The contentkind represents the content of the corresponding audio. In the example of FIG. 43, for example, when the contentkind indicates 3, the corresponding audio is music.

As shown in the lower left of FIG. 43, Priority is defined by 23008-3 and represents the processing priority of the corresponding Object. A value representing the processing priority of Object is described as Priority only when the value is not changed during the audio stream, while when the value is changed during the audio stream, a value "0" is described.

(Outline of Information Processing System)

Figure 44:
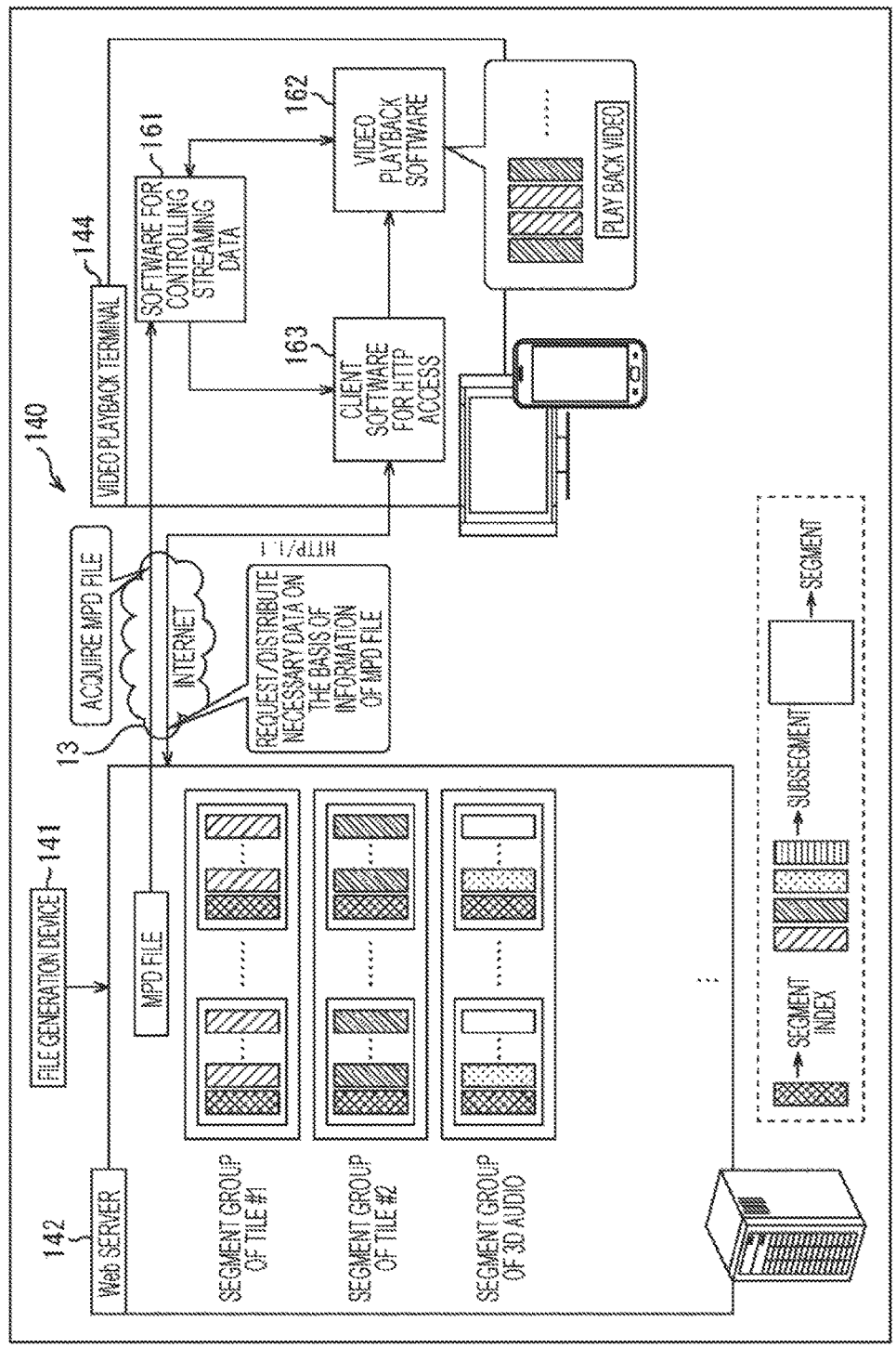
FIG. 44 is a diagram illustrating an outline of an information processing system in the first embodiment to which the present disclosure is applied.

FIG. 44 is a diagram illustrating an outline of an information processing system according to the first embodiment to which the present disclosure is applied.

The components shown in FIG. 44 that are the same as the components shown in FIG. 1 are denoted by the same reference numerals. Repeated explanation is omitted as appropriate.

An information processing system 140 shown in FIG. 44 has a configuration in which a Web server 142, which is connected to a file generation device 141 is connected to a video playback terminal 144 via the Internet 13.

In the information processing system 140, the Web server 142 delivers (tiled streaming) a video stream of video content to the video playback terminal 144 in units of tiles by a method in conformity with MPEG-DASH. Further, in the information processing system 140, the Web server 142 delivers an audio stream of Object audio, Channel audio, or HOA audio corresponding to the tile to be played back to the video playback terminal 144.

The file generation device 141 of the information processing system 140 is similar to the file generation device 11 shown in FIG. 11, except that, for example, the audio file generation unit 56 generates an audio file in the first embodiment and the MPD generation unit 57 generates the MPD file in the first embodiment.

Specifically, the file generation device 141 acquires the image data of video content and encodes the image data in units of tiles to generate a video stream. The file generation device 141 processes the video stream of each tile into a file format. The file generation device 141 uploads the image file of each tile obtained as a result of the process to the Web server 142.

Further, the file generation device 141 acquires 3D audio of video content and encodes the 3D audio for each type (Channel audio/Object audio/HOA audio/metadata) of 3D audio to generate an audio stream. The file generation device 141 allocates tracks to the audio stream for each type of 3D audio. The file generation device 141 generates the audio file of the segment structure shown in FIG. 39 or 40 in which the audio stream of each track is arranged in units of subsegments, and uploads the audio file to the Web server 142.

The file generation device 141 generates an MPD file including image frame size information, tile position information, and object position information. The file generation device 141 uploads the MPD file to the Web server 142.

The Web server 142 stores the image file, the audio file, and the MPD file which are uploaded from the file generation device 141.

In the example of FIG. 44, the Web server 142 stores a segment group formed of image files of a plurality of segments of the tile #1 and a segment group formed of image files of a plurality of segments of the tile #2. The Web server 142 also stores a segment group formed of audio files of 3D audio.

The Web server 142 transmits, to the video playback terminal 144, the image file, the audio file, the MPD file, and the like stored in the Web server, in response to a request from the video playback terminal 144.

The video playback terminal 144 executes control software 161, video playback software 162, access software 163, and the like.

The control software 161 is software for controlling data to be streamed from the Web server 142. Specifically, the control software 161 causes the video playback terminal 144 to acquire the MPD file from the Web server 142.

Further, the control software 161 specifies a tile in the display area on the basis of the display area instructed from the video playback software 162 and the tile position information included in the MPD file. Then, the control software 161 instructs the access software 163 to transmit a request for the image file of the tile.

When Object audio is to be played back, the control software 161 instructs the access software 163 to transmit a request for the image frame size information in the audio file. Further, the control software 161 instructs the access software 163 to transmit a request for the audio stream of metadata. The control software 161 specifies the object corresponding to the image in the display area on the basis of the image frame size information and the object position information included in the audio stream of metadata, which are transmitted from the Web server 142 according to the instruction, and the display area. Then, the control software 161 instructs the access software 163 to transmit a request for the audio stream of the object.

Further, when Channel audio or HOA audio is to be played back, the control software 161 instructs the access software 163 to transmit a request for the audio stream of Channel audio or HOA audio.

The video playback software 162 is software for playing back the image file and the audio file which are acquired from the Web server 142. Specifically, when the display area is specified by the user, the video playback software 162 instructs the control software 161 to transmit the display area. Further, the video playback software 162 decodes the image file and the audio file which are acquired from the Web server 142 according to the instruction. The video playback software 162 synthesizes and outputs the image data in units of tiles obtained as a result of decoding. Further, the video playback software 162 synthesizes and outputs, as needed, the Object audio, Channel audio, or HOA audio, which are obtained as a result of decoding.

The access software 163 is software for controlling the communication with the Web server 142 via the Internet 13 using HTTP. Specifically, the access software 163 causes the video playback terminal 144 to transmit a request for the image frame size information or predetermined audio stream in the image file and audio file in response to the instruction from the control software 161. Further, the access software 163 causes the video playback terminal 144 to receive the image frame size information or predetermined audio stream in the image file and audio file, which are transmitted from the Web server 142, in response to the transmission request.

(Configuration Example of File Generation Device)

Figure 45:
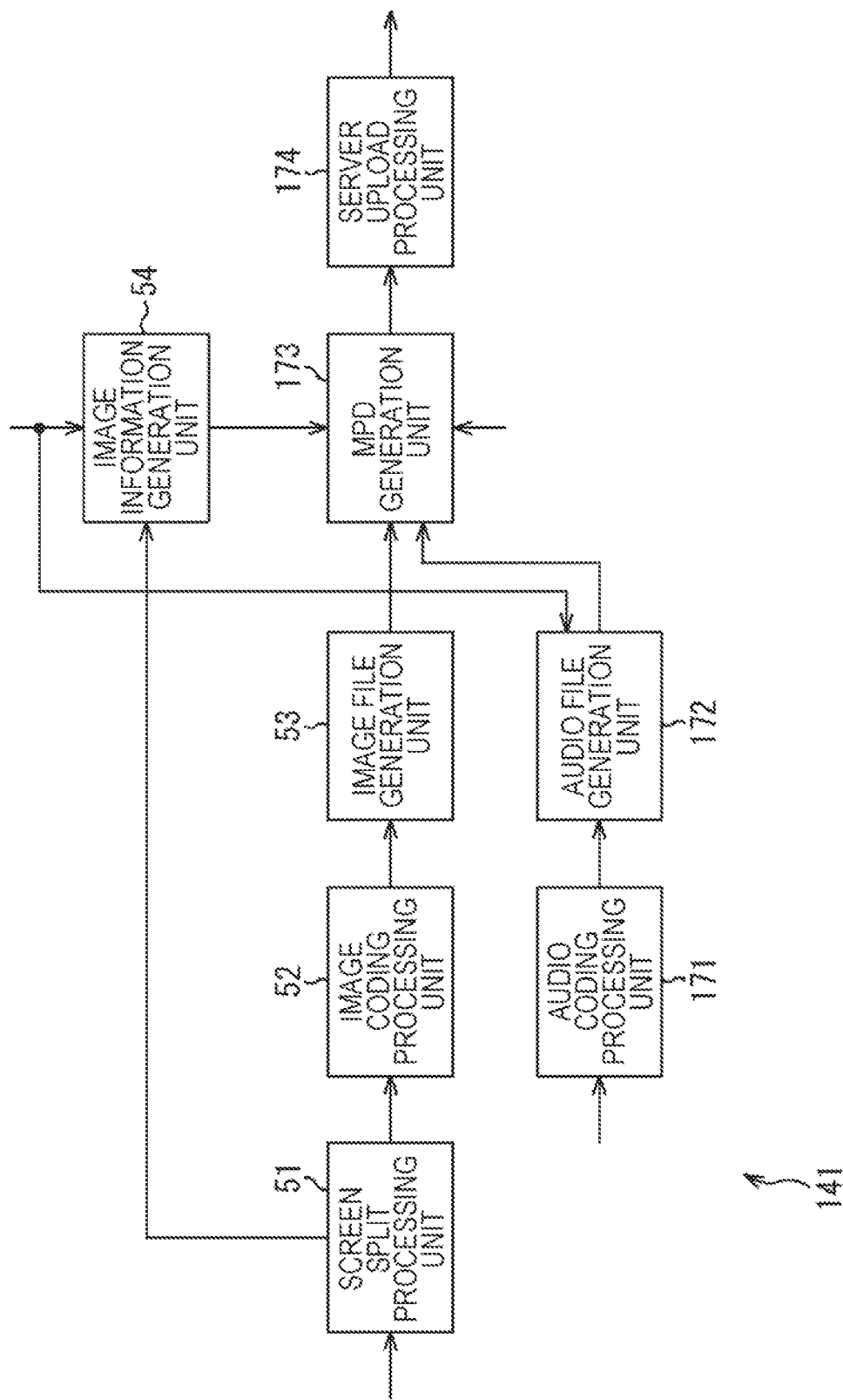
FIG. 45 is a block diagram showing a configuration example of a file generation device shown in FIG. 44.

FIG. 45 is a block diagram showing a configuration example of the file generation device 141 shown in FIG. 44.

The components shown in FIG. 45 that are the same as the components shown in FIG. 11 are denoted by the same reference numerals. Repeated explanation is omitted as appropriate.

The configuration of the file generation device 141 shown in FIG. 45 is different from the configuration of the file generation device 11 shown in FIG. 11 in that an audio coding processing unit 171, an audio file generation unit 172, an MPD generation unit 173, and a server upload processing unit 174 are provided instead of the audio coding processing unit 55, the audio file generation unit 56, the MPD generation unit 57, and the server upload processing unit 58.

Specifically, the audio coding processing unit 171 of the file generation device 141 encodes the 3D audio of video content input from the outside for each type (Channel audio/Object audio/HOA audio/metadata) to generate an audio stream. The audio coding processing unit 171 supplies the audio file generation unit 172 with the audio stream for each type of the 3D audio.

The audio file generation unit 172 allocates tracks to the audio stream, which is supplied from the audio coding processing unit 171, for each type of the 3D audio. The audio file generation unit 172 generates the audio file of the segment structure shown in FIG. 39 or 40 in which the audio stream of each track is arranged in units of subsegments. At this time, the audio file generation unit 172 stores the image frame size information input from the outside in the sample entry. The audio file generation unit 172 supplies the MPD generation unit 173 with the generated audio file.

The MPD generation unit 173 determines the URL or the like of the Web server 142 that stores the image file of each tile supplied from the image file generation unit 53. Further, the MPD generation unit 173 determines the URL or the like of the Web server 142 that stores the audio file supplied from the audio file generation unit 172.

The MPD generation unit 173 arranges the image information supplied from the image information generation unit 54 in "AdaptationSet" for image of the MPD file. Further, the MPD generation unit 173 arranges the URL or the like of the image file of each tile in "Segment" of "Representation" for the image file of the tile.

The MPD generation unit 173 arranges the URL or the like of the audio file in "Segment" of "Representation" for the audio file. Further, the MPD generation unit 173 arranges the object position information or the like of each object input from the outside in "Sub Representation" for the Object metadata track of the object. The MPD generation unit 173 supplies the server upload processing unit 174 with the MPD file, in which various pieces of information arranged as described above, and the image file and audio file.

The server upload processing unit 174 uploads the image file, the audio file, and the MPD file of each tile supplied from the MPD generation unit 173 to the Web server 142.

(Explanation of Process of File Generation Device)

Figure 46:
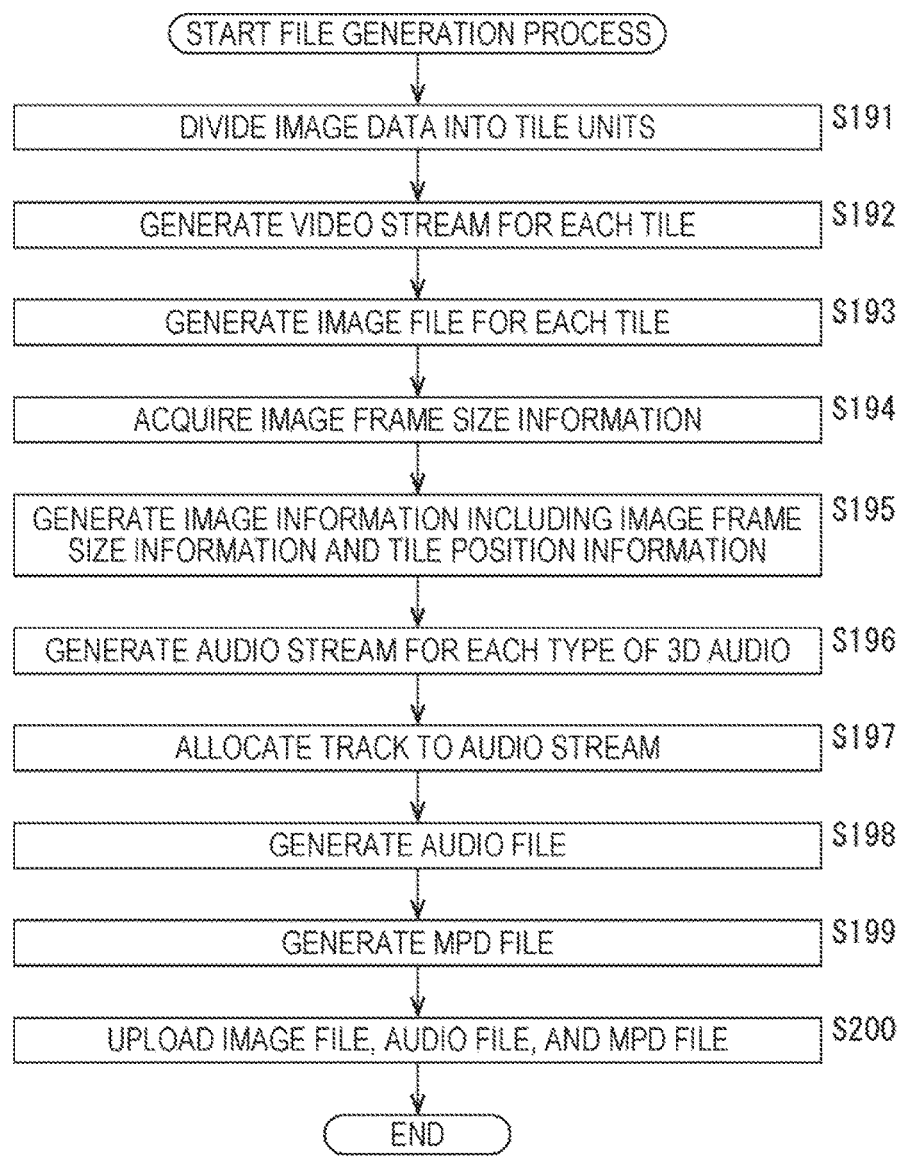
FIG. 46 is a flowchart illustrating a file generation process of the file generation device shown in FIG. 45.

FIG. 46 is a flowchart illustrating a file generation process of the file generation device 141 shown in FIG. 45.

The process of steps S191 to S195 shown in FIG. 46 is similar to the process of steps S11 to S15 shown in FIG. 12, and thus the description thereof is omitted.

In step S196, the audio coding processing unit 171 encodes the 3D audio of video content input from the outside for each type (Channel audio/Object audio/HOA audio/metadata) to generate an audio stream. The audio coding processing unit 171 supplies the audio file generation unit 172 with the audio stream for each type of the 3D audio.

In step S197, the audio file generation unit 172 allocates tracks to the audio stream, which is supplied from the audio coding processing unit 171, for each type of the 3D audio.

In step S198, the audio file generation unit 172 generates the audio file of the segment structure shown in FIG. 39 or 40 in which the audio stream of each track is arranged in units of subsegments. At this time, the audio file generation unit 172 stores the image frame size information input from the outside in the sample entry. The audio file generation unit 172 supplies the MPD generation unit 173 with the generated audio file.

In step S199, the MPD generation unit 173 generates the MPD file including the image information supplied from the image information generation unit 54, the URL of each file, and the object position information. The MPD generation unit 173 supplies the server upload processing unit 174 with the image file, the audio file, and the MPD file.

In step S200, the server upload processing unit 174 uploads the image file, the audio file, and the MPD file, which are supplied from the MPD generation unit 173, to the Web server 142. Then, the process is terminated.

(Functional Configuration Example of Video Playback Terminal)

Figure 47:
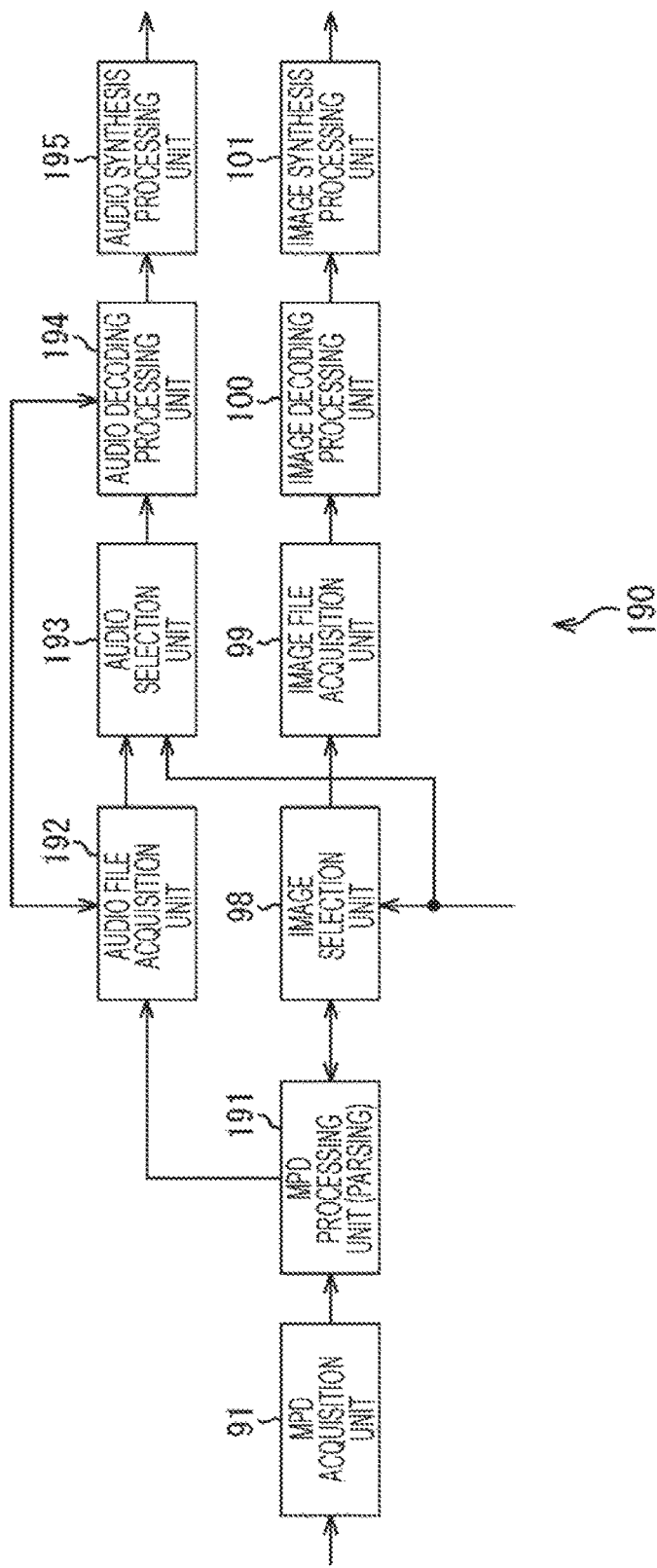
FIG. 47 is a block diagram showing a configuration example of a streaming playback unit implemented by a video playback terminal shown in FIG. 44.

FIG. 47 is a block diagram showing a configuration example of the streaming playback unit which is implemented in such a manner that the video playback terminal 144 shown in FIG. 44 executes the control software 161, the video playback software 162, and the access software 163.

The components shown in FIG. 47 that are the same as the components shown in FIG. 13 are denoted by the same reference numerals. Repeated explanation is omitted as appropriate.

The configuration of the streaming playback unit 190 shown in FIG. 47 is different from the configuration of the streaming playback unit 90 shown in FIG. 13 in that an MPD processing unit 191, an audio selection unit 193, an audio file acquisition unit 192, an audio decoding processing unit 194, and an audio synthesis processing unit 195 are provided instead of the MPD processing unit 92, the audio selection unit 94, the audio file acquisition unit 95, the audio decoding processing unit 96, and the audio synthesis processing unit 97 and the metafile acquisition unit 93 is not provided.

The streaming playback unit 190 is similar to the streaming playback unit 90 shown in FIG. 13, except for, for example, the method of acquiring the audio data to be played back of the selected object.

Specifically, the MPD processing unit 191 of the streaming playback unit 190 extracts information, such as the URL of the audio file of the segment to be played back that is described in "Segment" for audio file, from the MPD file supplied from the MPD acquisition unit 91, and supplies the audio file acquisition unit 192 with the extracted information.

The MPD processing unit 191 extracts the tile position information described in "AdaptationSet" for image from the MPD file, and supplies the image selection unit 98 with the extracted information. The MPD processing unit 191 extracts information, such as the URL described in "Segment" for the image file of the tile requested from the image selection unit 98, from the MPD file, and supplies the image selection unit 98 with the extracted information.

When Object audio is to be played back, the audio file acquisition unit 192 requests the Web server 142 to transmit Initial Segment of Base track in the audio file specified by the URL on the basis of the information such as the URL supplied from the MPD processing unit 191, and acquires the Initial Segment of Base track.

Further, on the basis of the information such as the URL of the audio file, the audio file acquisition unit 192 requests the Web server 142 to transmit the audio stream of the object metadata track in the audio file specified by the URL, and acquires the audio stream of the object metadata track. The audio file acquisition unit 192 supplies the audio selection unit 193 with the object position information included in the audio stream of the object metadata track, the image frame size information included in Initial Segment of Base track, and the information such as the URL of the audio file.

Further, when Channel audio is to be played back, the audio file acquisition unit 192 requests the Web server 142 to transmit the audio stream of Channel audio track in the audio file specified by the URL on the basis of the information such as the URL of the audio file, and acquires the audio stream of Channel audio track. The audio file acquisition unit 192 supplies the audio decoding processing unit 194 with the acquired audio stream of Channel audio track.

When HOP, audio is to be played back, the audio file acquisition unit 192 performs a process similar to that performed when Channel audio is to be played back. As a result, the audio stream of the HOA audio track is supplied to the audio decoding processing unit 194.

Note that it is determined which one of Object audio, Channel audio, and HOA audio is to be played back, for example, according to an instruction from a user.

The audio selection unit 193 calculates the position of each object on the image on the basis of the image frame size information and object position information supplied from the audio file acquisition unit 192. The audio selection unit 193 selects an object in the display area designated by the user on the basis of the position of each object on the image. On the basis of the information such as the URL of the audio file supplied from the audio file acquisition unit 192, the audio selection unit 193 requests the Web server 142 to transmit the audio stream of the Object audio track of the selected object in the audio file specified by the URL, and acquires the audio stream of the Object audio track. The audio selection unit 193 supplies the audio decoding processing unit 194 with the acquired audio stream of the Object audio track.

The audio decoding processing unit 194 decodes the audio stream of the Channel audio track or HOA audio track supplied from the audio file acquisition unit 192, or decodes the audio stream of the Object audio track supplied from the audio selection unit 193. The audio decoding processing unit 194 supplies the audio synthesis processing unit 195 with one of the Channel audio, the HOA audio, and the Object audio which are obtained as a result of decoding.

The audio synthesis processing unit 195 synthesizes and outputs the Object audio, the Channel audio, or the HOA audio supplied from the audio decoding processing unit 194, as needed.

(Explanation of Process of Video Playback Terminal)

Figure 48:
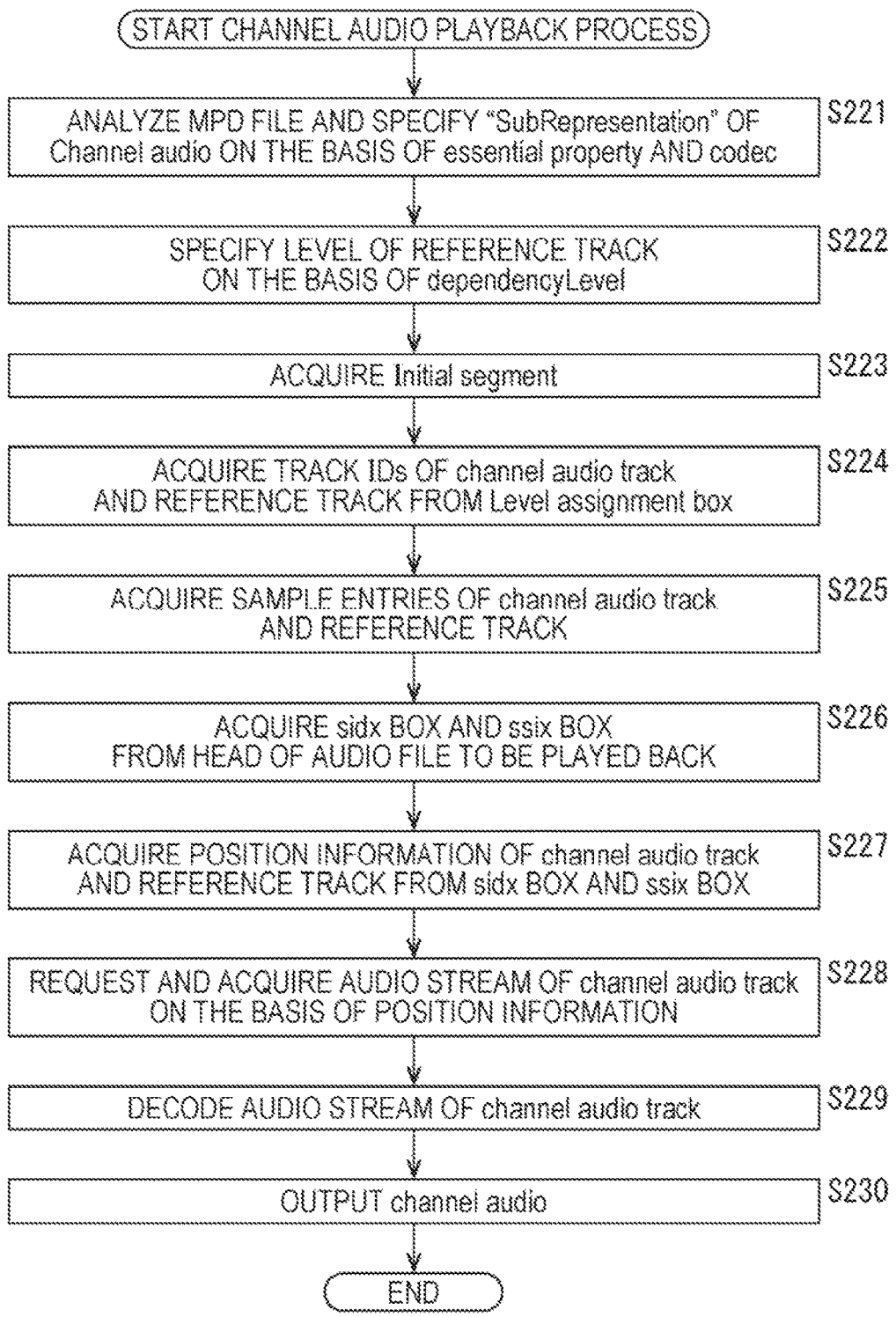
FIG. 48 is a flowchart illustrating a channel audio playback process of the streaming playback unit shown in FIG. 47.

FIG. 48 is a flowchart illustrating the channel audio playback process of the streaming playback unit 190 shown in FIG. 47. This channel audio playback process is performed, for example, when the user selects the Channel audio as an object to be played back.

In step S221 of FIG. 48, the MPD processing unit 191 analyzes the MPD file supplied from the MPD acquisition unit 91, and specifies "SubRepresentation" of Channel audio of the segment to be played back on the basis of the essential property and codec described in "SubRepresentation". Further, the MPD processing unit 191 extracts, from the MPD file, information such as the URL described in "Segment" for the audio file of the segment to be played back, and supplies the audio file acquisition unit 192 with the extracted information.

In step S222, the MPD processing unit 191 specifies the level of the Base track, which is a reference track, on the basis of the dependencyLevel of "SubRepresentation" specified in step S221, and supplies the audio file acquisition unit 192 with the specified level of the Base track.

In step S223, the audio file acquisition unit 192 requests the Web server 142 to transmit Initial Segment of the segment to be played back on the basis of the information such as the URL supplied from the MPD processing unit 191, and acquires the Initial Segment.

In step S224, the audio file acquisition unit 192 acquires, from the Level assignment box in the Initial Segment, the track IDs corresponding to the levels of the channel audio track and the Base track which is a reference track.

In step S225, the audio file acquisition unit 192 acquires the sample entry of the Initial Segment in the trak box corresponding to the track ID of Initial Segment, on the basis of the track IDs of the channel audio track and the Base track which is a reference track. The audio file acquisition unit 192 supplies the audio decoding processing unit 194 with the codec information included in the acquired sample entry.

In step S226, on the basis of the information such as the URL supplied from the MPD processing unit 191, the audio file acquisition unit 192 sends a request to the Web server 142 and acquires the sidx box and the ssix box from the head of the audio file of the segment to be played back.

In step S227, the audio file acquisition unit 192 acquires the position information of the reference track and the channel audio track of the segment to be played back, from the sidx box and the ssix box which are acquired in step S223. In this case, since the Base track which is a reference track does not include any audio stream, there is no position information of the reference track.

In step S228, the audio file acquisition unit 192 requests the Web server 142 to transmit the audio stream of the channel audio track arranged in the mdat box, on the basis of the position information of the channel audio track and the information such as the URL of the audio file of the segment to be played back, and acquires the audio stream of the channel audio track. The audio file acquisition unit 192 supplies the audio decoding processing unit 194 with the acquired audio stream of the channel audio track.

In step S229, the audio decoding processing unit 194 decodes the audio stream of the channel audio track on the basis of the codec information supplied from the audio file acquisition unit 192. The audio file acquisition unit 192 supplies the audio synthesis processing unit 195 with the channel audio obtained as a result of decoding.

In step S230, the audio synthesis processing unit 195 outputs the channel audio. Then, the process is terminated.

Note that, although not shown, an HOA audio playback process for playing back the HOA audio by the streaming playback unit 190 is performed in a manner similar to the channel audio playback process shown in FIG. 48.

Figure 49:
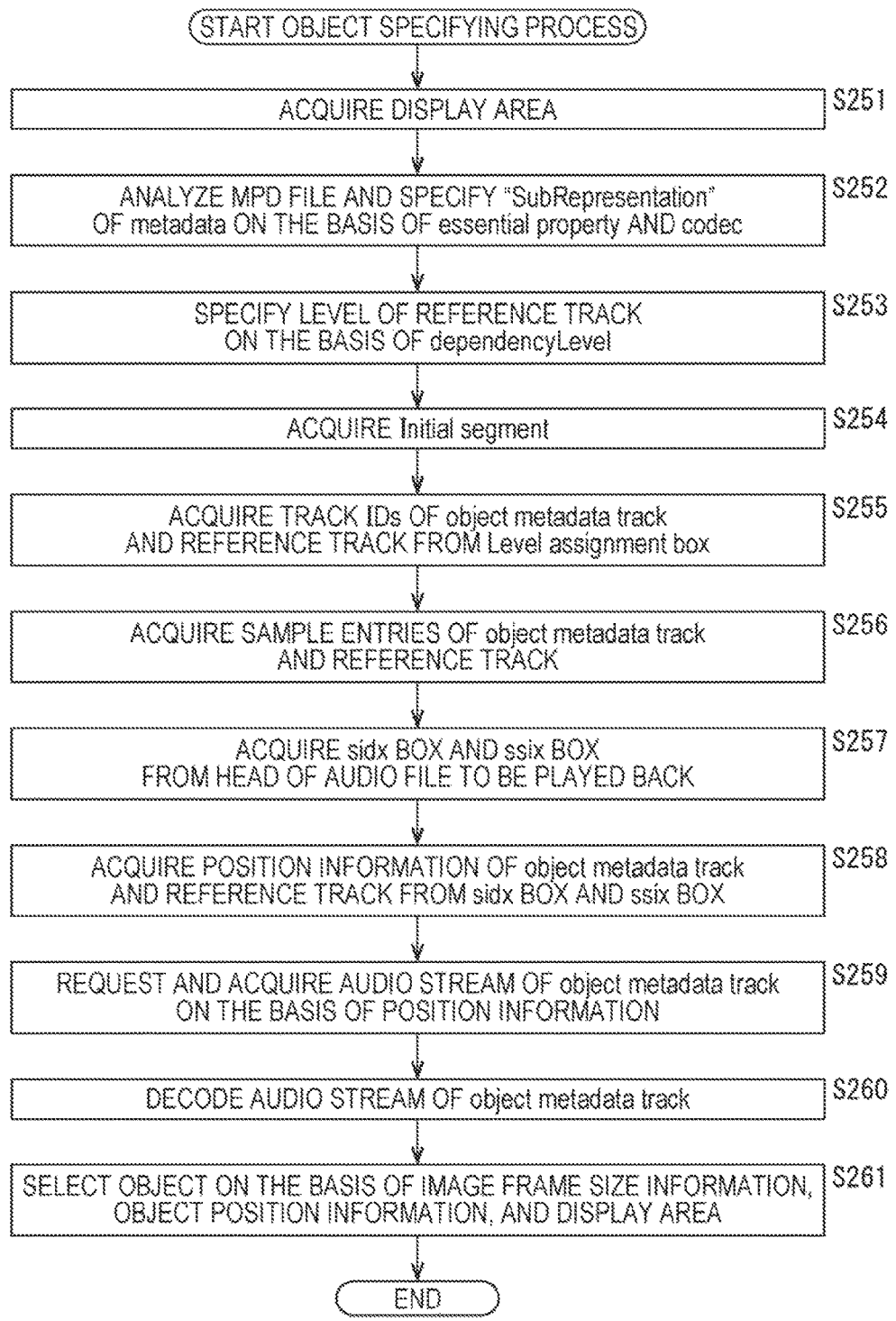
FIG. 49 is a flowchart illustrating an object specifying process of the streaming playback unit shown in FIG. 47.

FIG. 49 is a flowchart illustrating the object specifying process of the streaming playback unit 190 shown in FIG. 47. This object specifying process is performed, for example, when the user selects the Object audio as an object to be played back and the playback area is changed.

In step S251 of FIG. 49, the audio selection unit 193 acquires the display area designated by the user through the user's operation or the like.

In step S252, the MPD processing unit 191 analyzes the MPD file supplied from the MPD acquisition unit 91, and specifies "SubRepresentation" of metadata of the segment to be played back, on the basis of the essential property and codec described in "SubRepresentation". Further, the MPD processing unit 191 extracts, from the MPD file, information such as the URL of the audio file of the segment to be played back that is described in "Segment" for audio file, and supplies the audio file acquisition unit 192 with the extracted information.

In step S253, the MPD processing unit 191 specify the level of the Base track, which is a reference track, on the basis of the dependencyLevel of "SubRepresentation" specified in step S252, and supplies the audio file acquisition unit 192 with the specified level of the Base track.

In step S254, the audio file acquisition unit 192 requests the Web server 142 to transmit Initial Segment of the segment to be played back, on the basis of the information such as the URL supplied from the MPD processing unit 191, and acquires the Initial Segment.

In step S255, the audio file acquisition unit 192 acquires, from the Level assignment box in the Initial Segment, the track IDs corresponding to the levels of the object metadata track and the Base track which is a reference track.

In step S256, the audio file acquisition unit 192 acquires the sample entry of Initial Segment in the trak box corresponding to the track ID of the Initial Segment on the basis of the track IDs of the object metadata track and the Base track which is a reference track. The audio file acquisition unit 192 supplies the audio selection unit 193 with the image frame size information included in the sample entry of the Base track which is a reference track. Further, the audio file acquisition unit 192 supplies the audio selection unit 193 with the Initial Segment.

In step S257, on the basis of the information such as the URL supplied from the MPD processing unit 191, the audio file acquisition unit 192 sends a request to the Web server 142 and acquires the sidx box and the ssix box from the head of the audio file of the segment to be played back.

In step S258, the audio file acquisition unit 192 acquires, from the sidx box and ssix box acquired in step S257, the position information of the reference track and the object metadata track of the subsegment to be played back. In this case, since the Base track which is a reference track does not include any audio stream, there is no position information of the reference track. The audio file acquisition unit 192 supplies the audio selection unit 193 with the sidx box and the ssix box.

In step S259, the audio file acquisition unit 192 requests the Web server 142 to transmit the audio stream of the object metadata track arranged in the mdat box, on the basis of the position information of the object metadata track and the information such as the URL of the audio file of the segment to be played back, and acquires the audio stream of the object metadata track.

In step S260, the audio file acquisition unit 192 decodes the audio stream of the object metadata track acquired in step S259, on the basis of the codec information included in the sample entry acquired in step S256. The audio file acquisition unit 192 supplies the audio selection unit 193 with the object position information included in the metadata obtained as a result of decoding. Further, the audio file acquisition unit 192 supplies the audio selection unit 193 with the information such as the URL of the audio file supplied from the MPD processing unit 191.

In step S261, the audio selection unit 193 selects an object in the display area on the basis of the image frame size information and object position information supplied from the audio file acquisition unit 192 and on the basis of the display area designated by the user. Then, the process is terminated.

Figure 50:
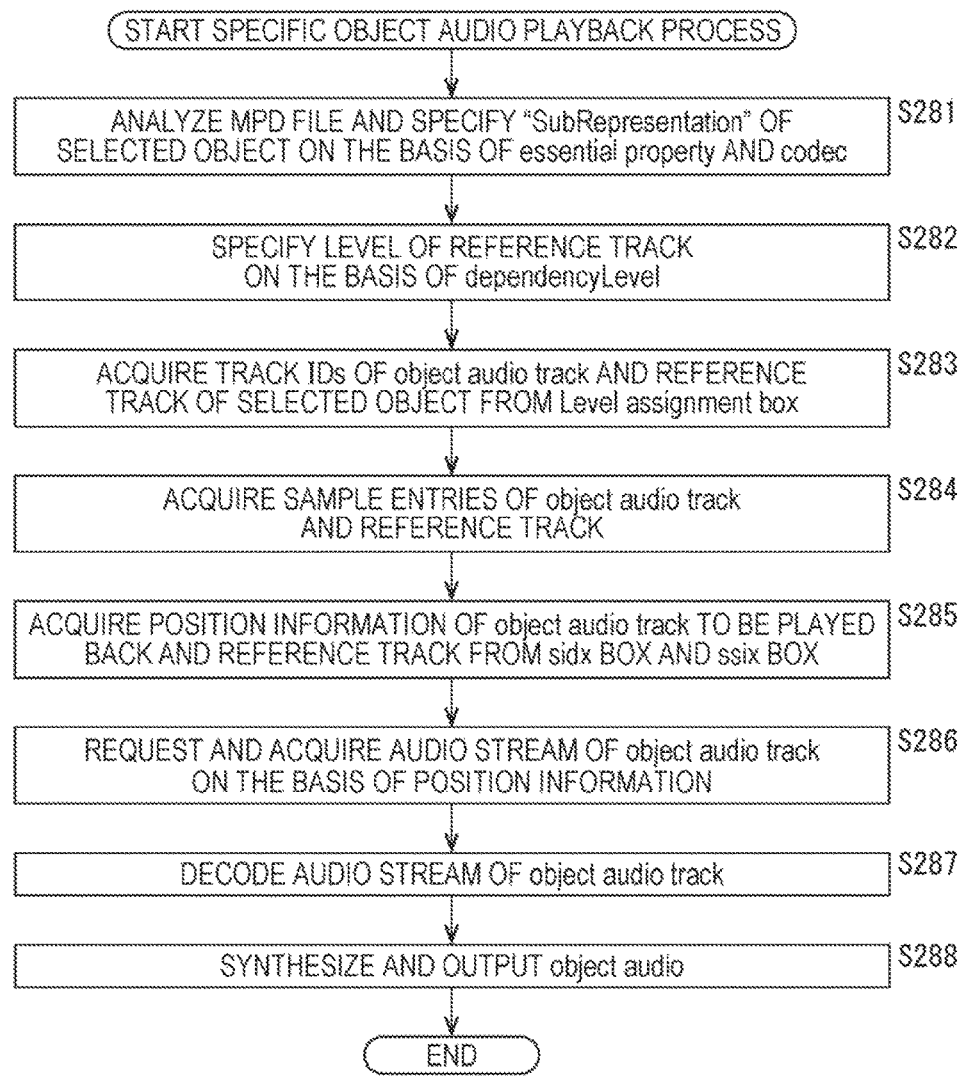
FIG. 50 is a flowchart illustrating a specific object audio playback process of the streaming playback unit shown in FIG. 47.

FIG. 50 is a flowchart illustrating a specific object audio playback process performed by the streaming playback unit 190 after the object specifying process shown in FIG. 49.

In step S281 of FIG. 50, the MPD processing unit 191 analyzes the MPD file supplied from the MPD acquisition unit 91, and specifies "SubRepresentation" of the object audio of the selected object on the basis of the essential property and codec described in "SubRepresentation".

In step S282, the MPD processing unit 191 specifies the level of the Base track, which is a reference track, on the basis of the dependencyLevel of "SubRepresentation" specified in step S281, and supplies the audio file acquisition unit 192 with the specified level of the Base track.

In step S283, the audio file acquisition unit 192 acquires, from the Level assignment box in the Initial Segment, the track IDs corresponding to the levels of the object audio track and the Base track which is a reference track, and supplies the audio selection unit 193 with the track IDs.

In step S284, the audio selection unit 193 acquires the sample entry of Initial Segment in the trak box corresponding to the track ID of the Initial Segment, on the basis of the track IDs of the object audio track and the Base track which is a reference track. This Initial Segment is supplied from the audio file acquisition unit 192 in step S256 shown in FIG. 49. The audio selection unit 193 supplies the audio decoding processing unit 194 with the codec information included in the acquired sample entry.

In step S285, the audio selection unit 193 acquires, from the sidx box and ssix box supplied from the audio file acquisition unit 192 in step S258, the position information of the reference track and the object audio track of the selected object of the subsegment to be played back. In this case, since the Base track which is a reference track does not include any audio stream, there is no position information of the reference track.

In step S286, the audio selection unit 193 requests the Web server 142 to transmit the audio stream of the object audio track of the selected object, which is arranged in the mdat box, on the basis of the position information of the object audio track and the information such as the URL of the audio file of the segment to be played back, and acquires the audio stream of the object audio track. The audio selection unit 193 supplies the audio decoding processing unit 194 with the acquired audio stream of the object audio track.

In step S287, the audio decoding processing unit 194 decodes the audio stream of the object audio track on the basis of the codec information supplied from the audio selection unit 193. The audio selection unit 193 supplies the audio synthesis processing unit 195 with the object audio obtained as a result of decoding.

In step S288, the audio synthesis processing unit 195 synthesizes and outputs the object audio supplied from the audio decoding processing unit 194. Then, the process is terminated.

As described above, in the information processing system 140, the file generation device 141 generates an audio file in which 3D audio is divided into a plurality of tracks depending on the types of the 3D audio and the tracks are arranged. The video playback terminal 144 acquires the audio stream of a predetermined type of 3D audio in the audio file. Accordingly, the video playback terminal 144 can efficiently acquire the audio stream of the predetermined types of 3D audio. Therefore, it can be said that the file generation device 141 generates the audio file capable of improving the efficiency of acquiring the audio stream of the predetermined type of 3D audio.

Second Embodiment (Outline of Tracks)

Figure 51:
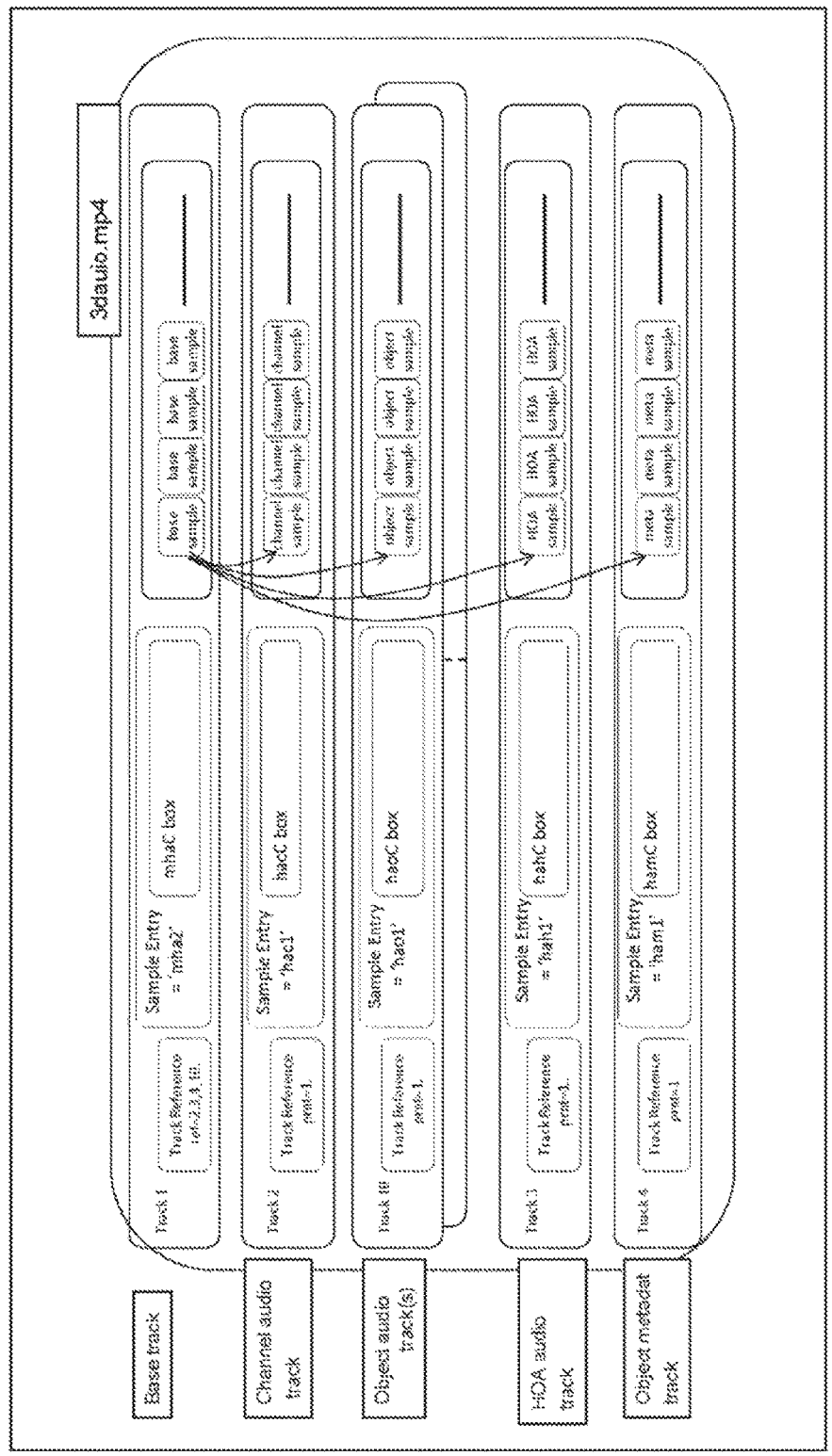
FIG. 51 is a diagram illustrating an outline of tracks in a second embodiment to which the present disclosure is applied.

FIG. 51 is a diagram illustrating the outline of tracks in a second embodiment to which the present disclosure is applied.

As shown in FIG. 51, the second embodiment differs from the first embodiment in that the base sample is recorded as a sample of Base track. The base sample is formed of information to be referred to for the sample of Channel audio/Object audio/HOA audio/metadata.

(Exemplary Syntax of Sample Entry of Base Track)

FIG. 52 is a diagram showing an exemplary syntax of the sample entry of the base track shown in FIG. 51.

The syntax shown in FIG. 52 is the same as the syntax shown in FIG. 34, except that "mha2" representing that the sample entry is the sample entry of the Base track shown in FIG. 51 is described instead of "mha1" representing that the sample entry is the sample entry of the Base track shown in FIG. 33.

(Exemplary Structure of Base Sample)

Figure 53:
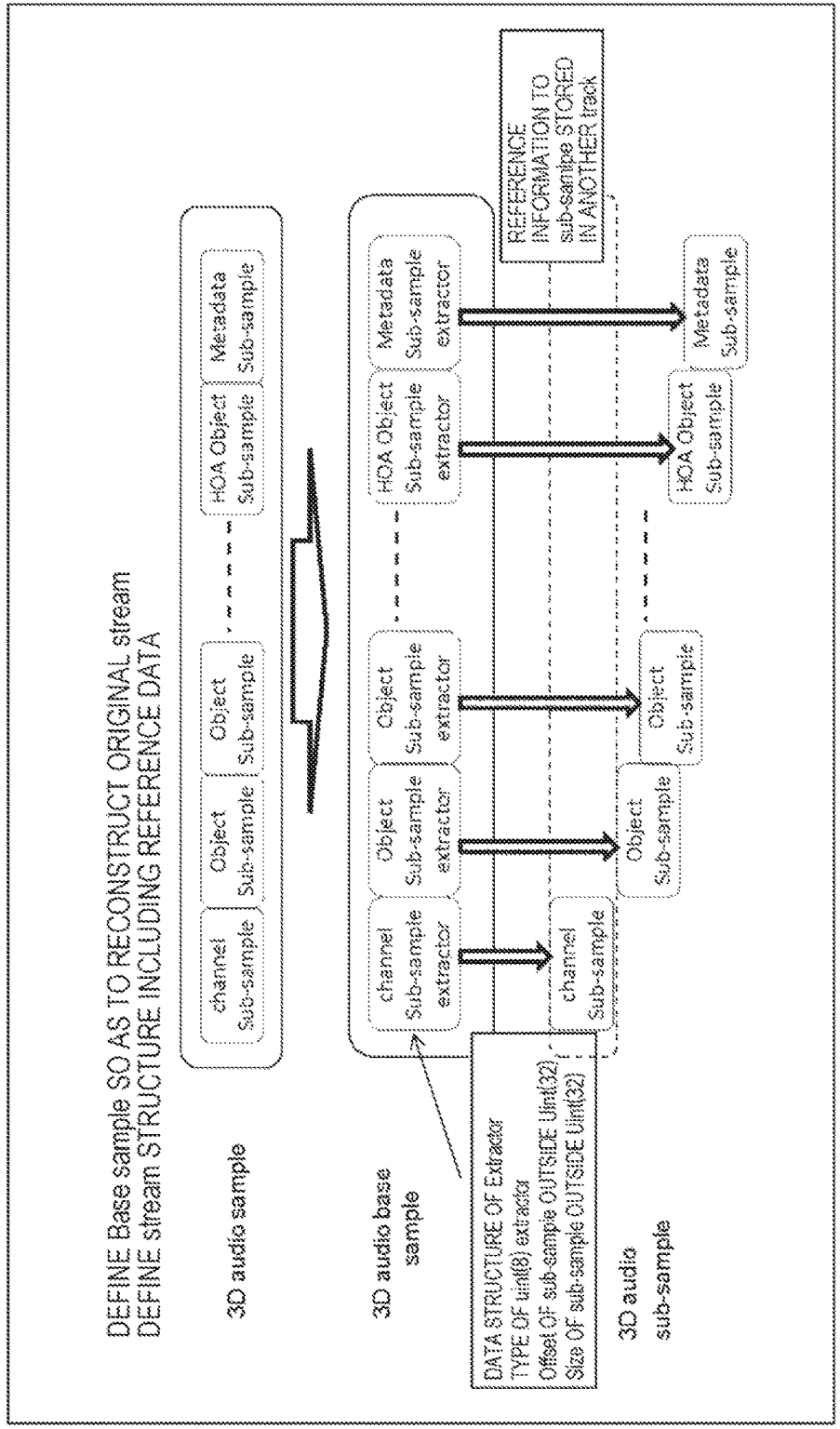
FIG. 53 is a diagram showing a structure of a base sample.

FIG. 53 is a diagram showing an exemplary structure of the base sample.

As shown in FIG. 53, the base sample is configured using the extractor of Channel audio/Object audio/HOA audio/metadata in units of sub-samples as a sub-sample. The extractor of Channel audio/Object audio/HOA audio/metadata is composed of the type of the extractor, and the offset and size of the sub-sample of the corresponding Channel audio track/Object audio track(s)/HOA audio track/Object metadata track. This offset is a difference between the position of the base sample in the file of sub-sample of the base sample and the position of Channel audio track/Object audio track(s)/HOA audio track/Object metadata track in the file of the sub-sample. In other words, the offset is information indicating the position within the file of a sub-sample of another track corresponding to the sub-sample of the base sample including the offset.

FIG. 54 is a diagram showing an exemplary syntax of the base sample.

As shown in FIG. 54, in the base sample, SCE element for storing the object audio in the sample of the Object audio track is replaced by EXT element for storing the extractor.

FIG. 55 is a diagram showing an example of extractor data.

As shown in FIG. 55, the type of the extractor and the offset and size of the sub-sample of the corresponding Channel audio track/Object audio track(s)/HOA audio track/Object metadata track are described in the extractor.

Note that the extractor may be extended by utilizing Network Abstraction Layer (NAL) structure, which is defined in Advanced Video Coding (AVC)/High Efficiency Video Coding (HEVC), so that audio elementary and config information can be stored.

The information processing system and the process performed by the information processing system in the second embodiment are similar to those of the first embodiment, and thus the descriptions thereof are omitted.

Third Embodiment (Outline of Tracks)

Figure 56:
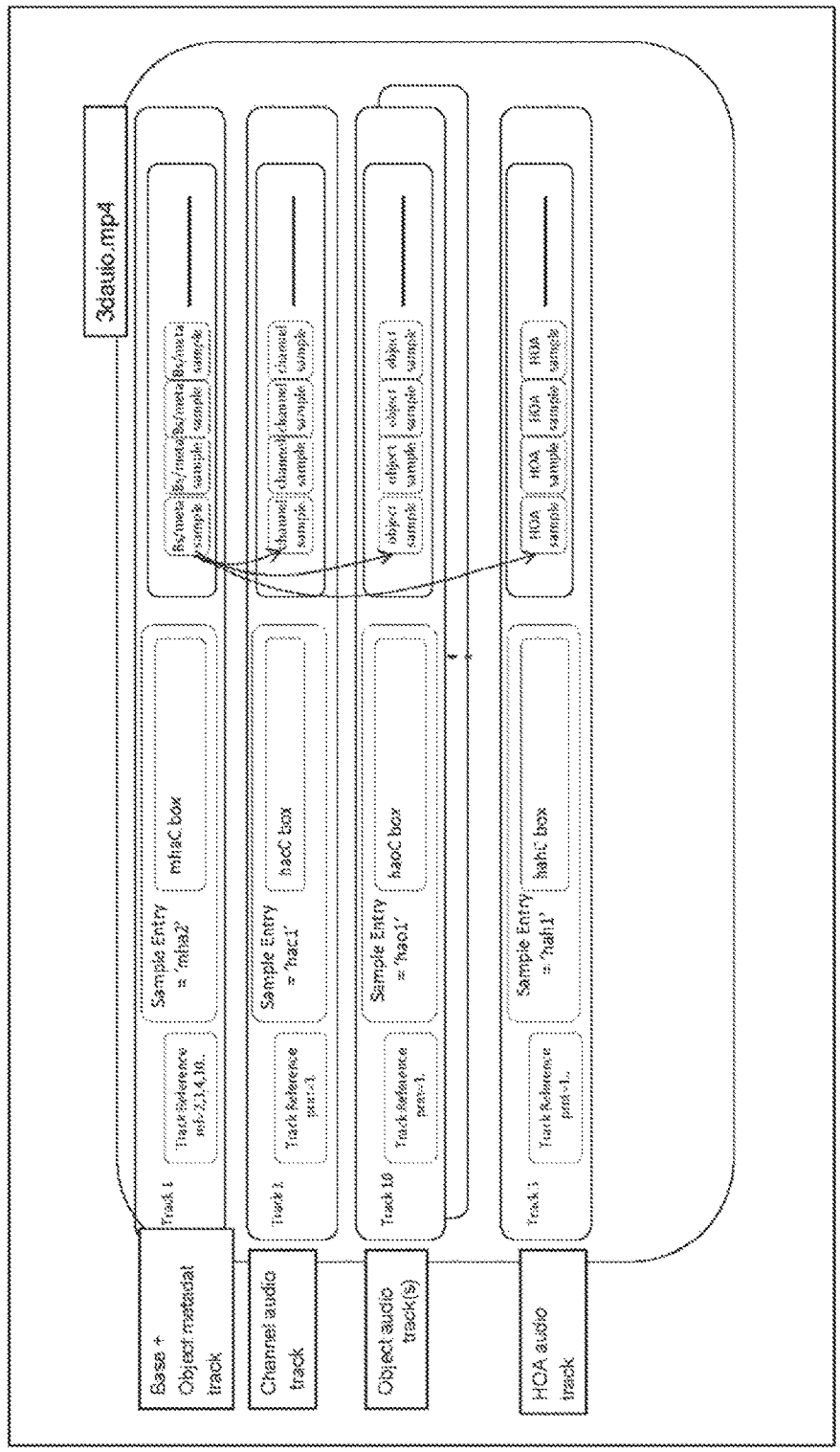
FIG. 56 is a diagram illustrating an outline of tracks in a third embodiment to which the present disclosure is applied.

FIG. 56 is a diagram illustrating the outline of tracks in a third embodiment to which the present disclosure is applied.

As shown in FIG. 56, the third embodiment differs from the first embodiment in that the base sample and the sample of metadata are recorded as the sample of the Base track and the Object metadata track is not provided.

The information processing system and the process performed by the information processing system in the third embodiment are similar to those of the first embodiment, except that the audio stream of the Base track is acquired instead of the Object metadata track so as to acquire the object position information. Accordingly, the descriptions thereof are omitted.

Fourth Embodiment (Outline of Tracks)

Figure 57:
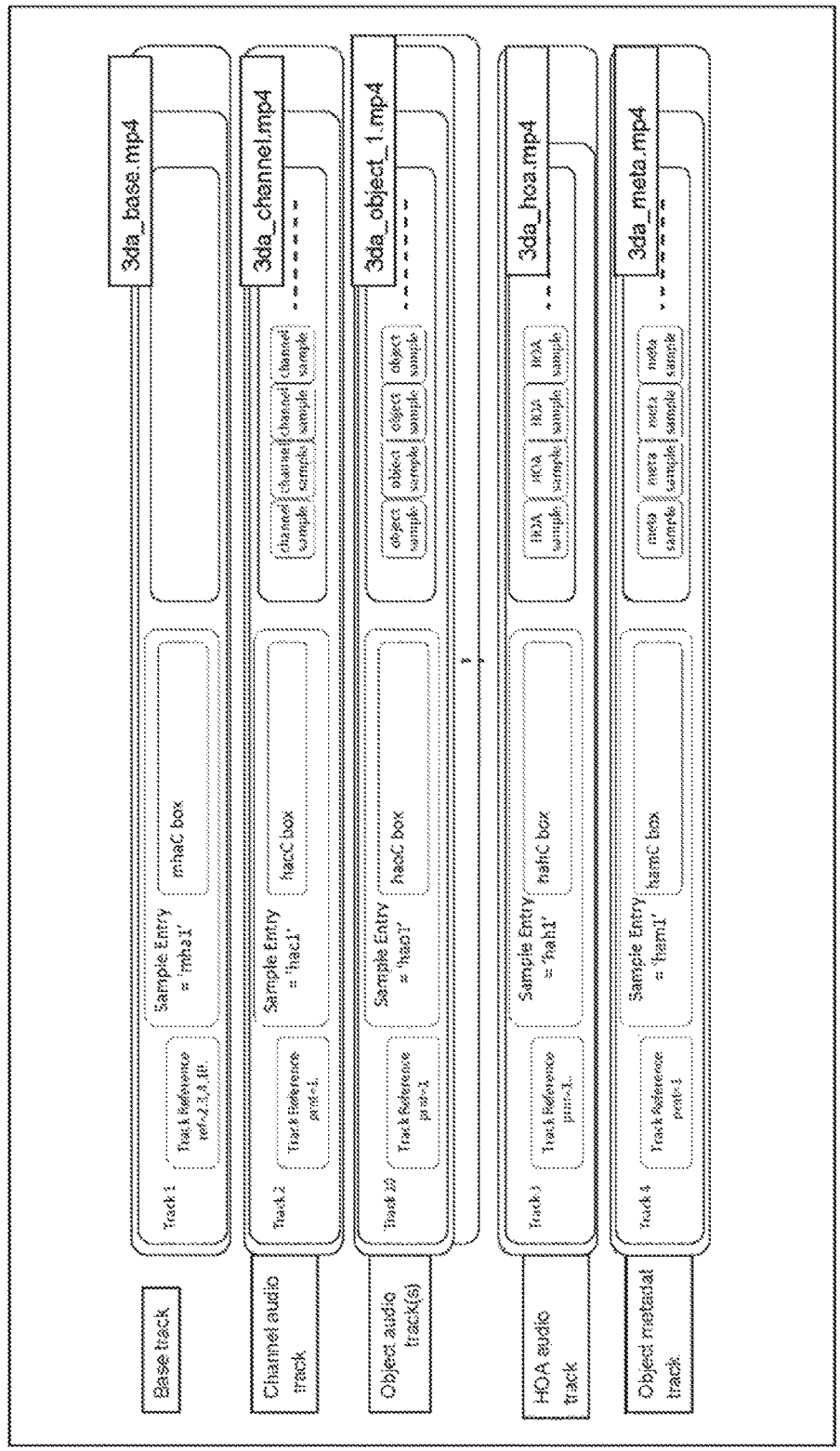
FIG. 57 is a diagram illustrating an outline of tracks in a fourth embodiment to which the present disclosure is applied.

FIG. 57 is a diagram illustrating the outline of tracks in a fourth embodiment to which the present disclosure is applied.

As shown in FIG. 57, the fourth embodiment differs from the first embodiment in that the tracks are recoded as different files (3da_base.mp4/3da_channel.mp4/3da_object_1.mp4/3da_hoa.mp4/3da_meta.mp4). In this case, only the audio data of a desired track can be acquired by acquiring a file of a desired track via HTTP. Accordingly, the audio data of a desired track can be efficiently acquired via HTTP.

(Exemplary Description of MPD File)

Figure 58:
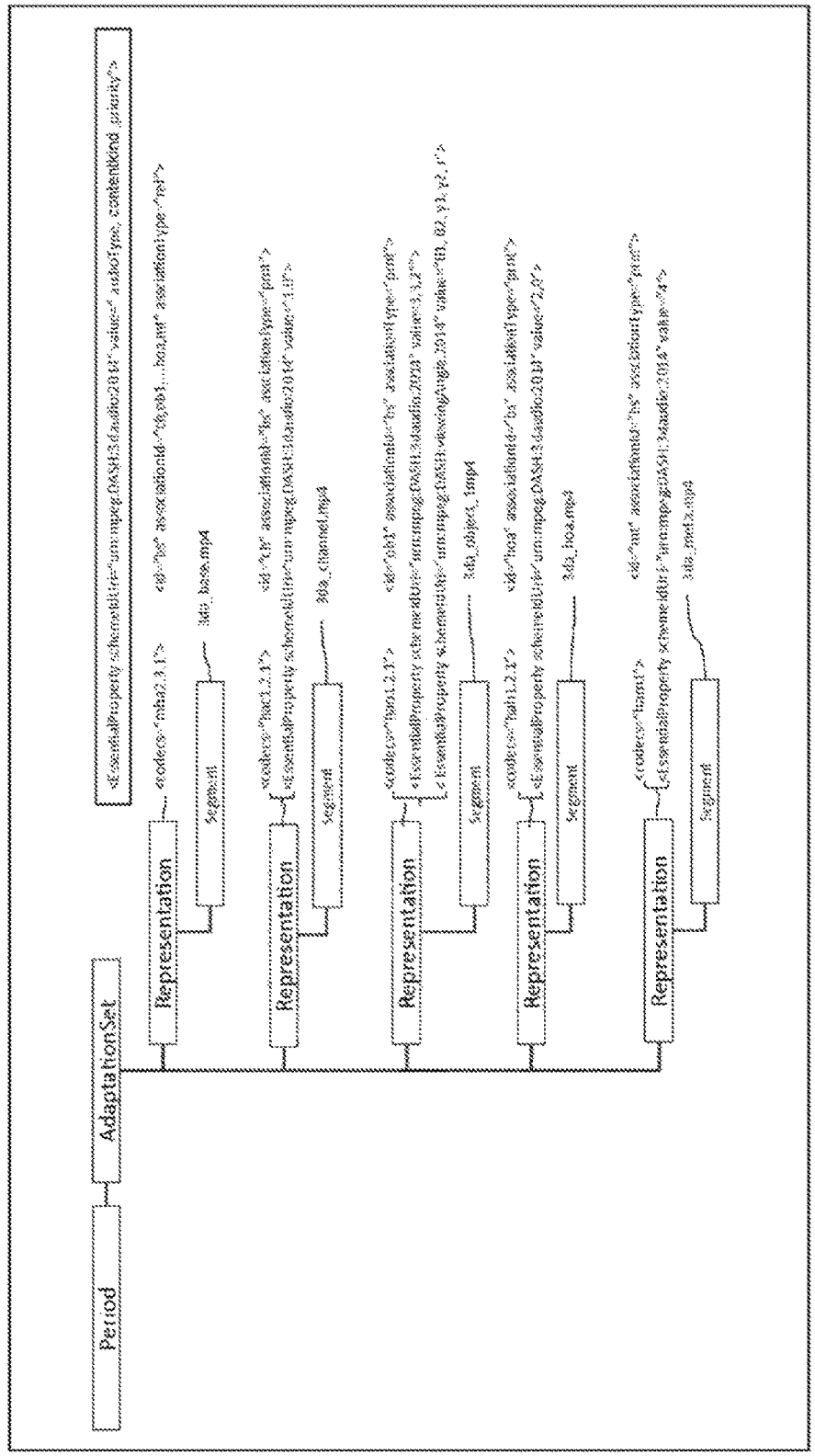
FIG. 58 is a diagram showing an exemplary description of an MPD file in the fourth embodiment to which the present disclosure is applied.

FIG. 58 is a diagram showing an exemplary description of the MPD file according to the fourth embodiment to which the present disclosure is applied.

As shown in FIG. 58, "Representation" or the like that manages the segment of each audio file (3da_base.mp4/3da_channel.mp4/3da_object_1.mp4/3da_hoa.mp4/3da_meta.mp4) of 3D audio is described in the MPD file.

The "Representation" includes "codecs", "id", "asscociationId", and "assciationType". Further, the "Representation" of Channel audio track/Object audio track(s)/HOA audio track/Object metadata track also includes "<EssentialProperty schemeIdUri="urn:mpeg:DASH:3daudio:2014" value=" audioType, contentkind, priority">". Further, the "Representation" of Object audio track(s) includes <EssentialProperty schemeIdUri="urn:mpeg:DASH:viewingAngle:2014" value="6, γ, r">.

(Outline of Information Processing System)

Figure 59:
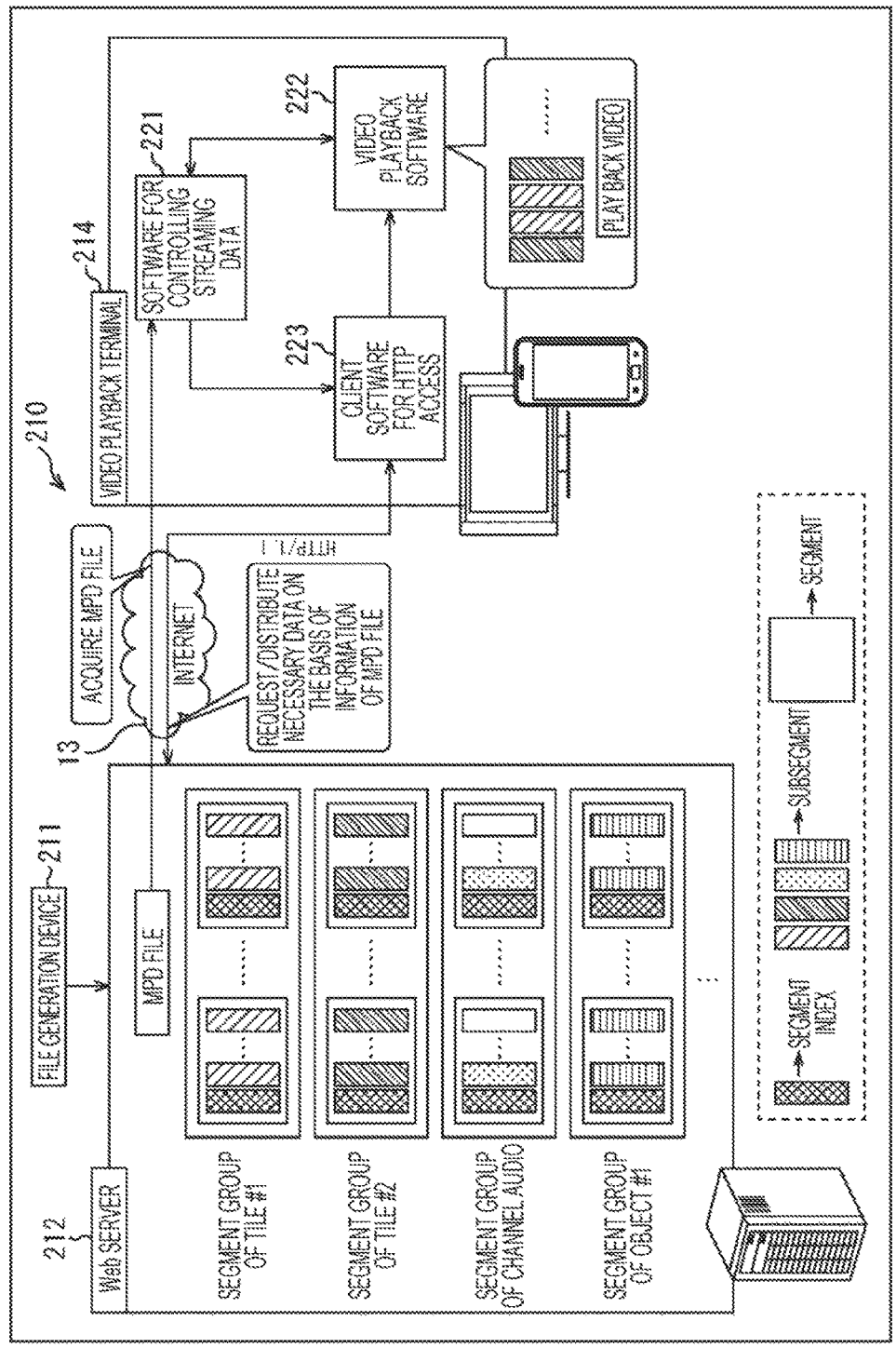
FIG. 59 is a diagram illustrating an outline of an information processing system in the fourth embodiment to which the present disclosure is applied.

FIG. 59 is a diagram illustrating the outline of the information processing system in the fourth embodiment to which the present disclosure is applied.

The components shown in FIG. 59 that are the same as the components shown in FIG. 1 are denoted by the same reference numerals. Repeated explanation is omitted as appropriate.

The information processing system 210 shown in FIG. 59 has a configuration in which a Web server 212, which is connected to a file generation device 211, and a video playback terminal 214 are connected via the Internet 13.

In the information processing system 210, the Web server 212 delivers (tiled streaming) a video stream of video content to the video playback terminal 214 in units of tiles by a method in conformity with MPEG-DASH. Further, in the information processing system 210, the Web server 212 delivers the audio file of Object audio, Channel audio, or HOA audio corresponding to the file to be played back to the video playback terminal 214.

Specifically, the file generation device 211 acquires the image data of video content and encodes the image data in units of tiles to generate a video stream. The file generation device 211 processes the video stream of each tile into a file format for each segment. The file generation device 211 uploads the image file of each file obtained as a result of the above process to the Web server 212.

Further, the file generation device 211 acquires the 3D audio of video content, and encodes the 3D audio for each type (Channel audio/Object audio/HOA audio/metadata) of the 3D audio to generate an audio stream. The file generation device 211 allocates the tracks to the audio stream for each type of the 3D audio. The file generation device 211 generates an audio file in which the audio stream is arranged for each track, and uploads the generated audio file to the Web server 212.

The file generation device 211 generates the MPD file including the image frame size information, the tile position information, and the object position information. The file generation device 211 uploads the MPD file to the Web server 212.

The Web server 212 stores the image file uploaded from the file generation device 211, the audio file for each type of 3D audio, and the MPD file.

In the example of FIG. 59, the Web server 212 stores a segment group formed of image files of a plurality of segments of the tile #1, and a segment group formed of image files of a plurality of segments of the tile #2. The Web server 212 also stores a segment group formed of the audio file of Channel audio and a segment group of the audio file of the object #1.

The Web server 212 transmits, to the video playback terminal 214, the image file, the predetermined type of audio file of 3D audio, the MPD file, and the like, which are stored in the Web server, in response to a request from the video playback terminal 214.

The video playback terminal 214 executes control software 221, video playback software 222, access software 223, and the like.

The control software 221 is software for controlling data to be streamed from the Web server 212. Specifically, the control software 221 causes the video playback terminal 214 to acquire the MPD file from the Web server 212.

Further, the control software 221 specifies a tile in the MPD file on the basis of the display area instructed from the video playback software 222 and the tile position information included in the MPD file. Then, the control software 221 instructs the access software 223 to send a request for transmitting the image file of the tile.

When Object audio is to be played back, the control software 221 instructs the access software 223 to send a request for transmitting the audio file of the Base track. Further, the control software 221 instructs the access software 223 to send a request for transmitting the audio file of the Objectmetadata track. The control software 221 acquires the image frame size information in the audio file of the Base track, which is transmitted from the Web server 142 according to the instruction, and the object position information included in the audio file of metadata. The control software 221 specifies the object corresponding to the image in the display area on the basis of the image frame size information, the object position information, and the display area. Further, the control software 221 instructs the access software 223 to send a request for transmitting the audio file of the object.

Further, when Channel audio or HOA audio is to be played back, the control software 221 instructs the access software 223 to send a request for transmitting the audio file of the Channel audio or HOA audio.

The video playback software 222 is software for playing back the image file and audio file acquired from the Web server 212. Specifically, when the display area is specified by the user, the video playback software 222 gives an instruction on the display area to the control software 221. Further, the video playback software 222 decodes the image file and audio file acquired from the Web server 212 according to the instruction. The video playback software 222 synthesizes and outputs the image data in units of tiles obtained as a result of decoding. Further, the video playback software 222 synthesizes and outputs, as needed, the Object audio, Channel audio, or HOA audio obtained as a result of decoding.

The access software 223 is software for controlling the communication with the Web server 212 via the Internet 13 using HTTP. Specifically, the access software 223 causes the video playback terminal 214 to transmit a request for transmitting the image file and the predetermined audio file in response to an instruction from the control software 221.

Further, the access software 223 causes the video playback terminal 214 to receive the image file and the predetermined audio file, which are transmitted from the Web server 212, according to the transmission request.

(Configuration Example of File Generation Device)

Figure 60:
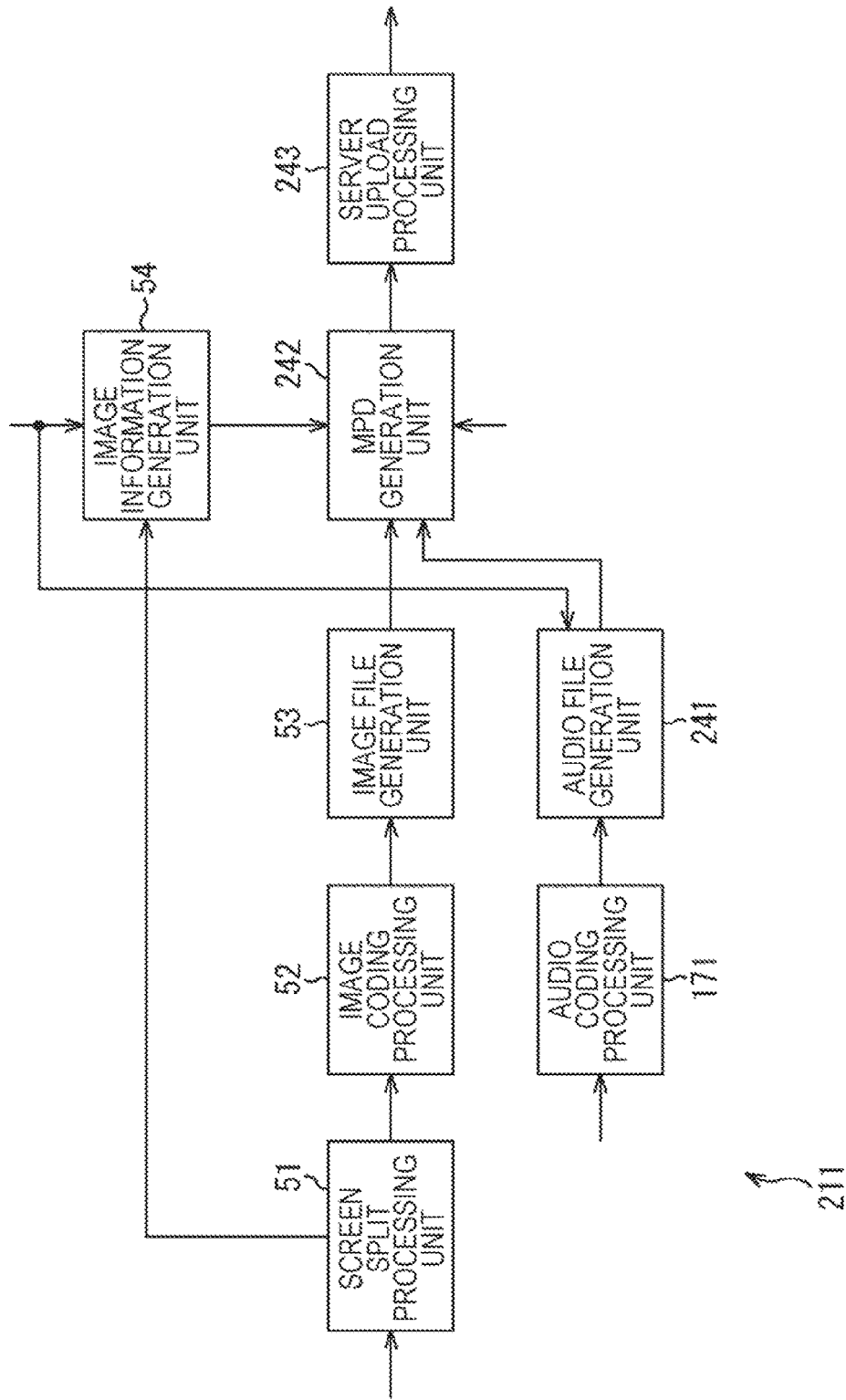
FIG. 60 is a block diagram showing a configuration example of the file generation device shown in FIG. 59.

FIG. 60 is a block diagram of the file generation device 211 shown in FIG. 59.

The components shown in FIG. 60 that are the same as the components shown in FIG. 45 are denoted by the same reference numerals. Repeated explanation is omitted as appropriate.

The configuration of the file generation device 211 shown in FIG. 60 is different from the configuration of the file generation device 141 shown in FIG. 45 in that an audio file generation unit 241, an MPD generation unit 242, and a server upload processing unit 243 are provided instead of the audio file generation unit 172, the MPD generation unit 173, and the server upload processing unit 174, respectively.

Specifically, the audio file generation unit 241 of the file generation device 211 allocates the tracks to the audio stream, which is supplied from the audio coding processing unit 171, for each type of the 3D audio. The audio file generation unit 241 generates an audio file in which the audio stream is arranged for each track. At this time, the audio file generation unit 241 stores the image frame size information input from the outside in the sample entry of the Base track. The audio file generation unit 241 supplies the MPD generation unit 242 with the audio file for each type of the 3D audio.

The MPD generation unit 242 determines the URL or the like of the Web server 212 that stores the image file of each tile supplied from the image file generation unit 53. Further, the MPD generation unit 242 determines, for each type of the 3D audio, the URL or the like of the Web server 212 that stores the audio file supplied from the audio file generation unit 241.

The MPD generation unit 242 arranges, in "Adaptation-Set" for the image of the MPD file, the image information supplied from the image information generation unit 54. Further, the MPD generation unit 242 arranges the URL or the like of the image file of each tile in "Segment" of "Representation" for the image file of the tile.

The MPD generation unit 242 arranges, for each type of the 3D audio, the URL or the like of the audio file in "Segment" of "Representation" for the audio file. Further, the MPD generation unit 242 arranges the object position information or the like of each object input from the outside in "Representation" for the Object metadata track of the object. The MPD generation unit 242 supplies the server upload processing unit 243 with the MPD file, in which various pieces of information are arranged as described above, the image file, and the audio file for each type of the 3D audio.

The server upload processing unit 243 uploads the image file of each tile supplied from the MPD generation unit 242, the audio file for each type of the 3D audio, and the MPD file to the Web server 212.

(Explanation of Process of File Generation Device)

Figure 61:
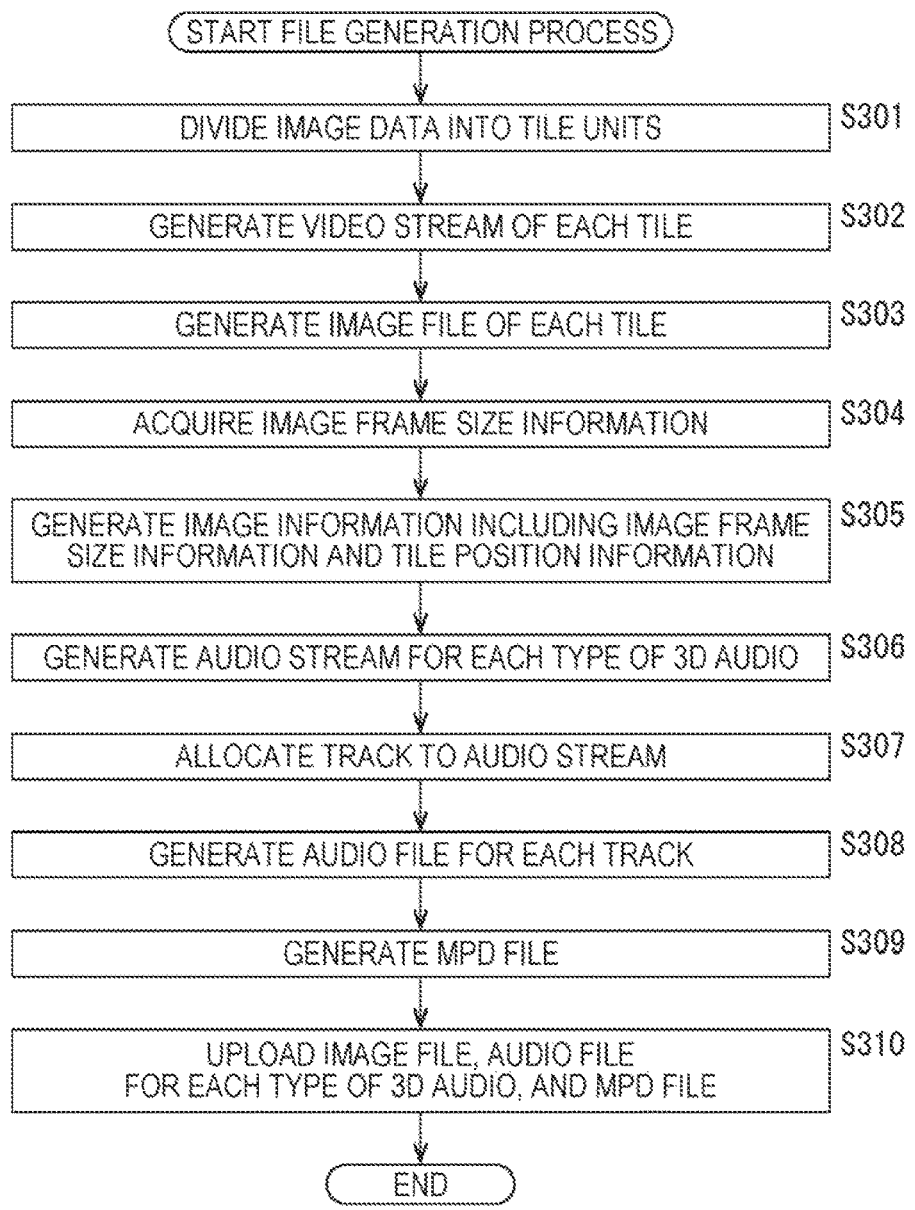
FIG. 61 is a flowchart illustrating a file generation process of the file generation device shown in FIG. 60.

FIG. 61 is a flowchart illustrating a file generation process of the file generation device 211 shown in FIG. 60.

The process of steps S301 to S307 shown in FIG. 61 is similar to the process of steps S191 to S197 shown in FIG. 46, and thus the description thereof is omitted.

In step S308, the audio file generation unit 241 generates an audio file in which an audio stream is arranged for each track. At this time, the audio file generation unit 241 stores the image frame size information input from the outside in the sample entry in the audio file of the Base track. The audio file generation unit 241 supplies the MPD generation unit 242 with the generated audio file for each type of the 3D audio.

In step S309, the MPD generation unit 242 generates an MPD file including the image information supplied from the image information generation unit 54, the URL of each file, and the object position information. The MPD generation unit 242 supplies the server upload processing unit 243 with the image file, the audio file for each type of the 3D audio, and the MPD file.

In step S310, the server upload processing unit 243 uploads the image file supplied from the MPD generation unit 242, the audio file for each type of the 3D audio, and the MPD file to the Web server 212. Then, the process is terminated.

(Functional Configuration Example of Video Playback Terminal)

Figure 62:
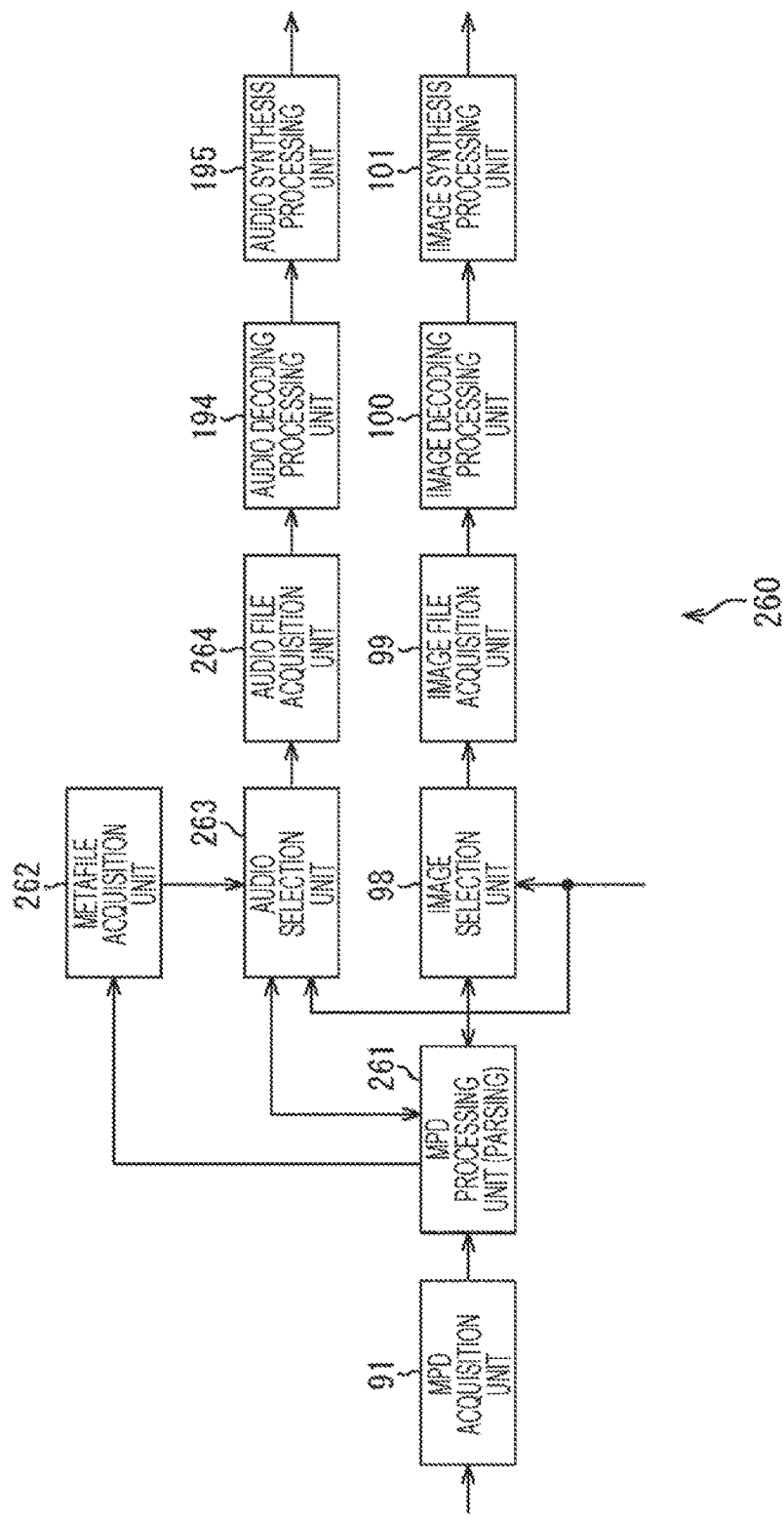
FIG. 62 is a block diagram showing a configuration example of a streaming playback unit implemented by a video playback terminal shown in FIG. 59.

FIG. 62 is a block diagram showing a configuration example of a streaming playback unit which is implemented in such a manner that the video playback terminal 214 shown in FIG. 59 executes the control software 221, the video playback software 222, and the access software 223.

The components shown in FIG. 62 that are the same as the components shown in FIGS. 13 and 47 are denoted by the same reference numerals. Repeated explanation is omitted as appropriate.

The configuration of the streaming playback unit 260 shown in FIG. 62 is different from the configuration of the streaming playback unit 90 shown in FIG. 13 in that an MPD processing unit 261, a metafile acquisition unit 262, an audio selection unit 263, an audio file acquisition unit 264, an audio decoding processing unit 194, and an audio synthesis processing unit 195 are provided instead of the MPD processing unit 92, the metafile acquisition unit 93, the audio selection unit 94, the audio file acquisition unit 95, the audio decoding processing unit 96, and the audio synthesis processing unit 97, respectively.

Specifically, when Object audio is to be played back, the MPD processing unit 261 of the streaming playback unit 260 extracts, from the MPD file supplied from the MPD acquisition unit 91, information such as the URL described in "Segment" of the audio file of the object metadata track of the segment to be played back, and supplies the metafile acquisition unit 262 with the extracted information. Further, the MPD processing unit 261 extracts, from the MPD file, information such as the URL described in "Segment" of the audio file of the object audio track of the object requested from the audio selection unit 263, and supplies the audio selection unit 263 with the extracted information. Furthermore, the MPD processing unit 261 extracts, from the MPD file, information such as the URL described in "Segment" of the audio file of the Base track of the segment to be played back, and supplies the metafile acquisition unit 262 with the extracted information.

Further, when Channel audio or HOA audio is to be played back, the MPD processing unit 261 extracts, from the MPD file, information such as the URL described in "Segment" of the audio file of the Channel audio track or HOA audio track of the segment to be played back. The MPD processing unit 261 supplies the audio file acquisition unit 264 with the information such as the URL via the audio selection unit 263.

Note that it is determined which one of Object audio, Channel audio, and HOA audio is to be played back, for example, according to an instruction from a user.

The MPD processing unit 261 extracts, from the MPD file, the tile position information described in "Adaptation-Set" for image, and supplies the image selection unit 98 with the extracted tile position information. The MPD processing unit 261 extracts, from the MPD file, information such as the URL described in "Segment" for the image file of the tile requested from the image selection unit 98, and supplies the image selection unit 98 with the extracted information.

On the basis of the information such as the URL supplied from the MPD processing unit 261, the metafile acquisition unit 262 requests the Web server 212 to transmit the audio file of the object metadata track specified by the URL, and acquires the audio file of the object metadata track. The metafile acquisition unit 93 supplies the audio selection unit 263 with the object position information included in the audio file of the object metadata track.

Further, on the basis of the information such as the URL of the audio file, the metafile acquisition unit 262 requests the Web server 142 to transmit the Initial Segment of the audio file of the Base track specified by the URL, and acquires the Initial Segment. The metafile acquisition unit 262 supplies the audio selection unit 263 with the image frame size information included in the sample entry of the Initial Segment.

The audio selection unit 263 calculates the position of each object on the image on the basis of the image frame size information and the object position information supplied from the metafile acquisition unit 262. The audio selection unit 263 selects an object in the display area designated by the user, on the basis of the position of each object on the image. The audio selection unit 263 requests the MPD processing unit 261 to transmit the information such as the URL of the audio file of the object audio track of the selected object. The audio selection unit 263 supplies the audio file acquisition unit 264 with the information such as the URL supplied from the MPD processing unit 261 according to the request.

On the basis of the information, such as the URL of the audio file of the object audio track, Channel audio track, or HOA audio track supplied from the audio selection unit 263, the audio file acquisition unit 264 requests the Web server 12 to transmit the audio file specified by the URL, and acquires the audio file. The audio file acquisition unit 95 supplies the audio decoding processing unit 194 with the acquired audio file in units of objects.

The audio file acquisition unit 264 calculates the position of each object on the image on the basis of the image frame size information and the object position information supplied from the audio selection unit 263. The audio file acquisition unit 264 selects an object in the display area designated by the user, on the basis of the position of each object on the image. On the basis of the information such as the URL of the audio file supplied from the audio selection unit 263, the audio file acquisition unit 264 requests the Web server 142 to transmit the audio stream of the Object audio track of the selected object in the audio file specified by the URL, and acquires the audio stream. The audio file acquisition unit 264 supplies the audio decoding processing unit 194 with the acquired audio stream of the Object audio track.

(Explanation of Process of Video Playback Terminal)

Figure 63:
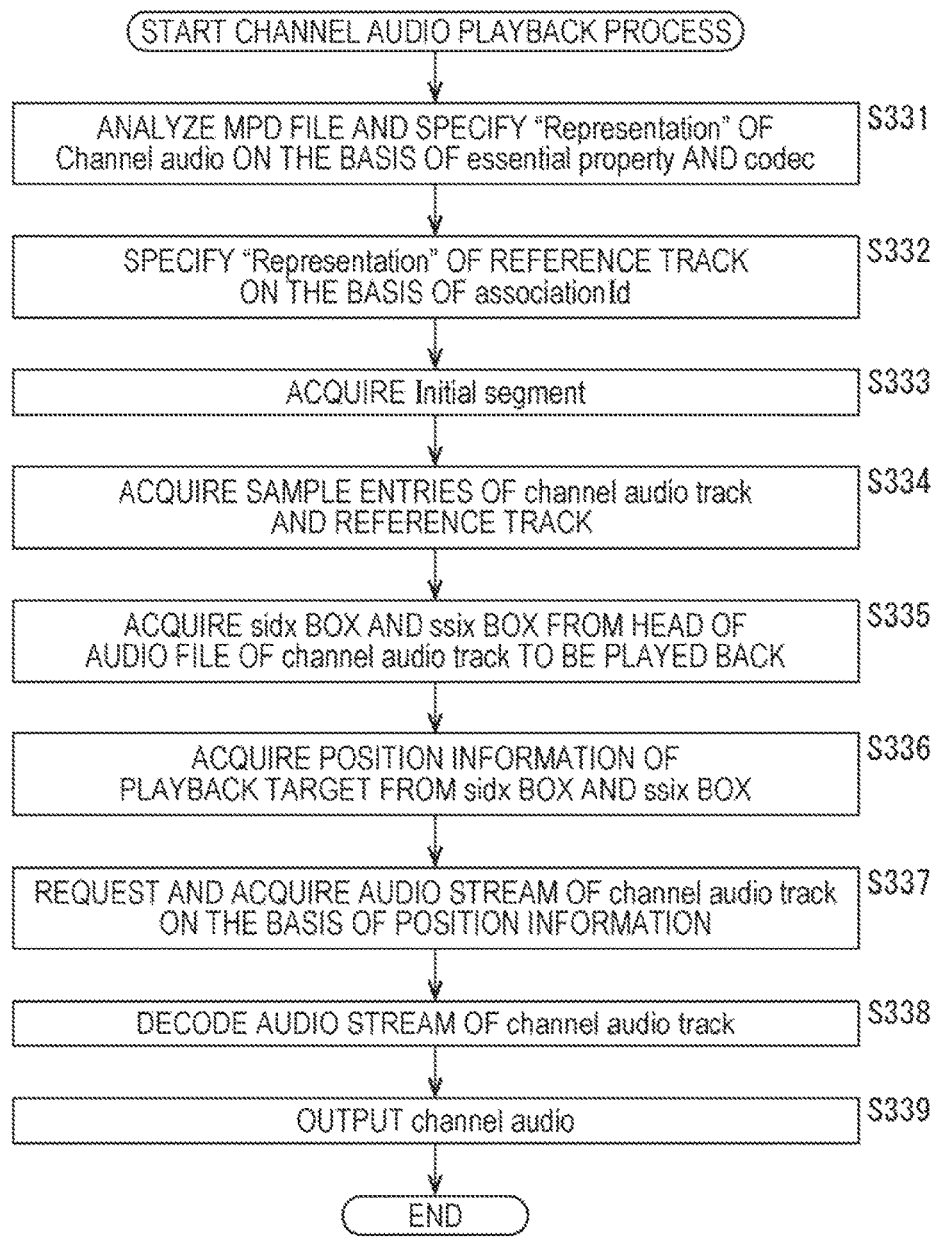
FIG. 63 is a flowchart illustrating an example of a channel audio playback process of the streaming playback unit shown in FIG. 62.

FIG. 63 is a flowchart illustrating a channel audio playback process of the streaming playback unit 260 shown in FIG. 62. This channel audio playback process is performed, for example, when Channel audio is selected by the user as an object to be played back.

In step S331 of FIG. 63, the MPD processing unit 261 analyzes the MPD file supplied from the MPD acquisition unit 91, and specifies "Representation" of the Channel audio of the segment to be played back on the basis of the essential property and codec described in "Representation". Further, the MPD processing unit 261 extracts information such as the URL of the audio file of the Channel audio track of the segment to be played back that is described in "Segment" included in the "Representation", and supplies the audio file acquisition unit 264 with the extracted information via the audio selection unit 263.

In step S332, the MPD processing unit 261 specifies "Representation" of the Base track, which is a reference track, on the basis of the associationId of "Representation" specified in step S331. The MPD processing unit 261 extracts information such as the URL of the audio file of the reference track described in "Segment" included in the "Representation", and supplies the audio file acquisition unit 264 with the extracted file via the audio selection unit 263.

In step S333, the audio file acquisition unit 264 requests the Web server 212 to transmit the Initial Segment of the audio files of the Channel audio track of the segment to be played back and the reference track on the basis of the information such as the URL supplied from the audio selection unit 263, and acquires the Initial Segment.

In step S334, the audio file acquisition unit 264 acquires the sample entry in the trak box of the acquired Initial Segment. The audio file acquisition unit 264 supplies the audio decoding processing unit 194 with the codec information included in the acquired sample entry.

In step S335, the audio file acquisition unit 264 sends a request to the Web server 142 on the basis of the information such as the URL supplied from the audio selection unit 263, and acquires the sidx box and the ssix box from the head of the audio file of the Channel audio track of the segment to be played back.

In step S336, the audio file acquisition unit 264 acquires the position information of the subsegment to be played back from the sidx box and ssix box acquired in step S333.

In step S337, the audio selection unit 263 requests the Web server 142 to transmit the audio stream of the channel audio track arranged in the mdat box in the audio file, on the basis of the position information acquired in step S337 and the information such as the URL of the audio file of the channel audio track of the segment to be played back, and acquires the audio stream of the channel audio track. The audio selection unit 263 supplies the audio decoding processing unit 194 with the acquired audio stream of the channel audio track.

In step S338, the audio decoding processing unit 194 decodes the audio stream of the channel audio track supplied from the audio selection unit 263 on the basis of the codec information supplied from the audio file acquisition unit 264. The audio selection unit 263 supplies the audio synthesis processing unit 195 with the channel audio obtained as a result of decoding.

In step S339, the audio synthesis processing unit 195 outputs the channel audio. Then, the process is terminated.

Although not shown, the HOA audio playback process for playing back HOA audio by the streaming playback unit 260 is performed in a manner similar to the channel audio playback process shown in FIG. 63.

Figure 64:
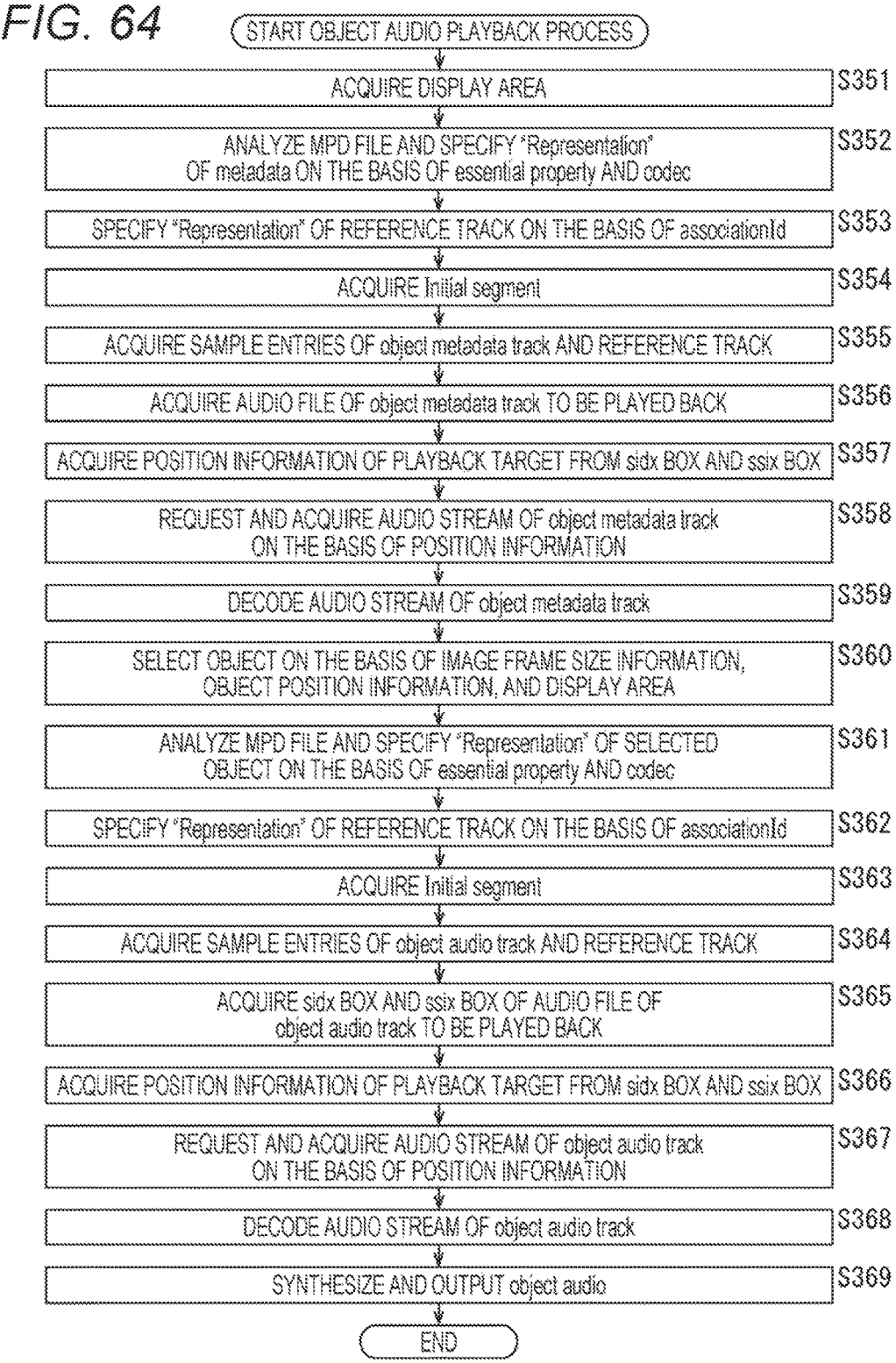
FIG. 64 is a flowchart illustrating a first example of an object audio playback process of the streaming playback unit shown in FIG. 62.

FIG. 64 is a flowchart illustrating an object audio playback process of the streaming playback unit 260 shown in FIG. 62. This object audio playback process is performed, for example, when the user selects Object audio as an object to be played back and the playback area is changed.

In step S351 of FIG. 64, the audio selection unit 263 acquires the display area designated by the user through the user's operation or the like.

In step S352, the MPD processing unit 261 analyzes the MPD file supplied from the MPD acquisition unit 91, and specifies "Representation" of the metadata of the segment to be played back, on the basis of the essential property and codec described in "Representation". Further, the MPD processing unit 261 extracts information such as the URL of the audio file of the object metadata track of the segment to be played back that is described in "Segment" included in the "Representation", and supplies the metafile acquisition unit 262 with the extracted information.

In step S353, the MPD processing unit 261 specifies "Representation" of the Base track, which is a reference track, on the basis of the associationId of "Representation" specified in step S352. The MPD processing unit 261 extracts information such as the URL of the audio file of the reference track described in "Segment" included in the "Representation", and supplies the metafile acquisition unit 262 with the extracted information.

In step S354, the metafile acquisition unit 262 requests the Web server 212 to transmit the Initial Segment of the audio files of the object metadata track of the segment to be played back and the reference track, on the basis of the information such as the URL supplied from the MPD processing unit 261, and acquires the Initial Segment.

In step S355, the metafile acquisition unit 262 acquires the sample entry in the trak box of the acquired Initial Segment. The metafile acquisition unit 262 supplies the audio file acquisition unit 264 with the image frame size information included in the sample entry of the Base track which is a reference track.

In step S356, the metafile acquisition unit 262 sends a request to the Web server 142 on the basis of the information such as the URL supplied from the MPD processing unit 261, and acquires the sidx box and the ssix box from the head of the audio file of the object metadata track of the segment to be played back.

In step S357, the metafile acquisition unit 262 acquires the position information of the subsegment to be played back from the sidx box and ssix box acquired in step S356.

In step S358, the metafile acquisition unit 262 requests the Web server 142 to transmit the audio stream of the object metadata track arranged in the mdat box in the audio file, on the basis of the position information acquired in step S357 and the information such as the URL of the audio file of the object metadata track of the segment to be played back, acquires the audio stream of the object metadata track.

In step S359, the metafile acquisition unit 262 decodes the audio stream of the object metadata track acquired in step S358, on the basis of the codec information included in the sample entry acquired in step S355. The metafile acquisition unit 262 supplies the audio selection unit 263 with the object position information included in the metadata obtained as a result of decoding.

In step S360, the audio selection unit 263 selects an object in the display area on the basis of the image frame size information and object position information supplied from the metafile acquisition unit 262 and on the basis of the display area designated by the user. The audio selection unit 263 requests the MPD processing unit 261 to transmit the information such as the URL of the audio file of the object audio track of the selected object.

In step S361, the MPD processing unit 261 analyzes the MPD file supplied from the MPD acquisition unit 91, and specifies "Representation" of the object audio of the selected object on the basis of the essential property and codec described in "Representation". Further, the MPD processing unit 261 extracts information such as the URL of the audio file of the object audio track of the selected object of the segment to be played back that is described in "Segment" included in the "Representation", and supplies the audio file acquisition unit 264 with the extracted information via the audio selection unit 263.

In step S362, the MPD processing unit 261 specifies "Representation" of the Base track, which is a reference track, on the basis of the associationId of "Representation" specified in step S361. The MPD processing unit 261 extracts information such as the URL of the audio file of the reference track described in "Segment" included in the "Representation", and supplies the audio file acquisition unit 264 with the extracted information via the audio selection unit 263.

In step S363, the audio file acquisition unit 264 requests the Web server 212 to transmit the Initial Segment of the audio files of the object audio track of the segment to be played back and the reference track, on the basis of the information such as the URL supplied from the audio selection unit 263, and acquires the Initial Segment.

In step S364, the audio file acquisition unit 264 acquires the sample entry in the trak box of the acquired Initial Segment. The audio file acquisition unit 264 supplies the audio decoding processing unit 194 with the codec information included in the sample entry.

In step S365, the audio file acquisition unit 264 sends a request to the Web server 142 on the basis of the information such as the URL supplied from the audio selection unit 263, and acquires the sidx box and the ssix box from the head of the audio file of the object audio track of the segment to be played back.

In step S366, the audio file acquisition unit 264 acquires the position information of the subsegment to be played back from the sidx box and ssix box acquired in step S365.

In step S367, the audio file acquisition unit 264 requests the Web server 142 to transmit the audio stream of the object audio track arranged in the mdat box within the audio file, on the basis of the position information acquired in step S366 and the information such as the URL of the audio file of the object audio track of the segment to be played back, and acquires the audio stream of the object audio track. The audio file acquisition unit 264 supplies the audio decoding processing unit 194 with the acquired audio stream of the object audio track.

The process of steps S368 and S369 is similar to the process of steps S287 and S288 shown in FIG. 50, and thus the description thereof is omitted.

Note that in the above description, the audio selection unit 263 selects all objects in the display area. However, the audio selection unit 263 may select only objects with a high processing priority in the display area, or may select only an audio object of a predetermined content.

Figure 65:
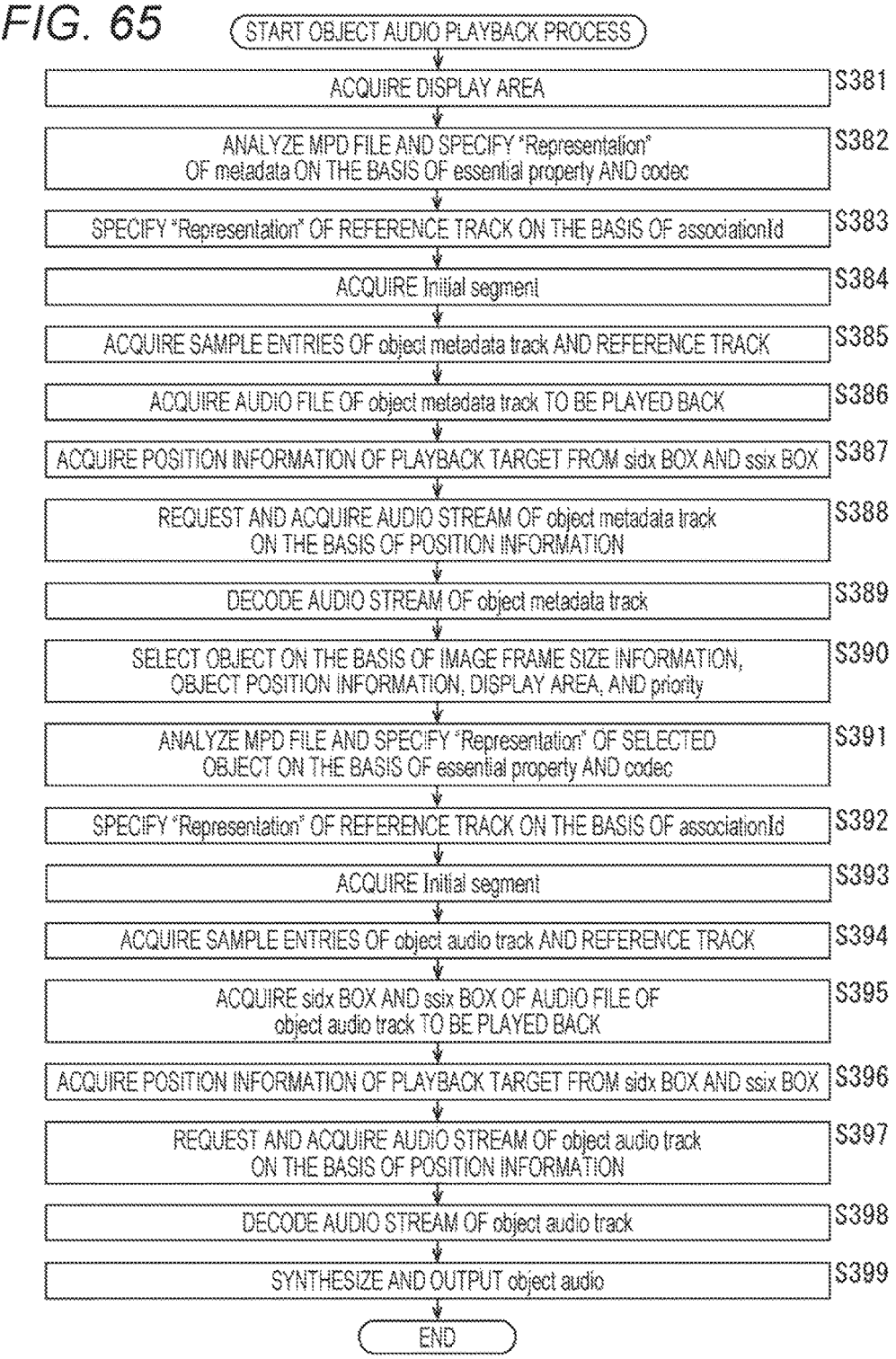
FIG. 65 is a flowchart illustrating a second example of the object audio playback process of the streaming playback unit shown in FIG. 62.

FIG. 65 is a flowchart illustrating an object audio playback process when the audio selection unit 263 selects only objects with a high processing priority among the objects in the display area.

The object audio playback process shown in FIG. 65 is similar to the object audio playback process shown in FIG. 64, except that the process of step S390 shown in FIG. 65 is performed instead of step S360 shown in FIG. 64. Specifically, the process of steps S381 to S389 and steps S391 to S399 shown in FIG. 65 is similar to the process of steps S351 to S359 and steps S361 to S369 shown in FIG. 64. Accordingly, only the process of step S390 will be described below.

In step S390 shown in FIG. 65, the audio file acquisition unit 264 selects an object with a high processing priority in the display area on the basis of the image frame size information, the object position information, the display area, and the priority of each object. Specifically, the audio file acquisition unit 264 specifies each object with the display area on the basis of the image frame size information, the object position information, and the display area. The audio file acquisition unit 264 selects, from among the specified objects, an object having a priority equal to or higher than a predetermined value. Note that, for example, the MPD processing unit 261 analyzes the MPD file, thereby acquiring the priority from "Representation" of the object audio of the specified object. The audio selection unit 263 requests the MPD processing unit 261 to transmit information such as the URL of the audio file of the object audio track of the selected object.

Figure 66:
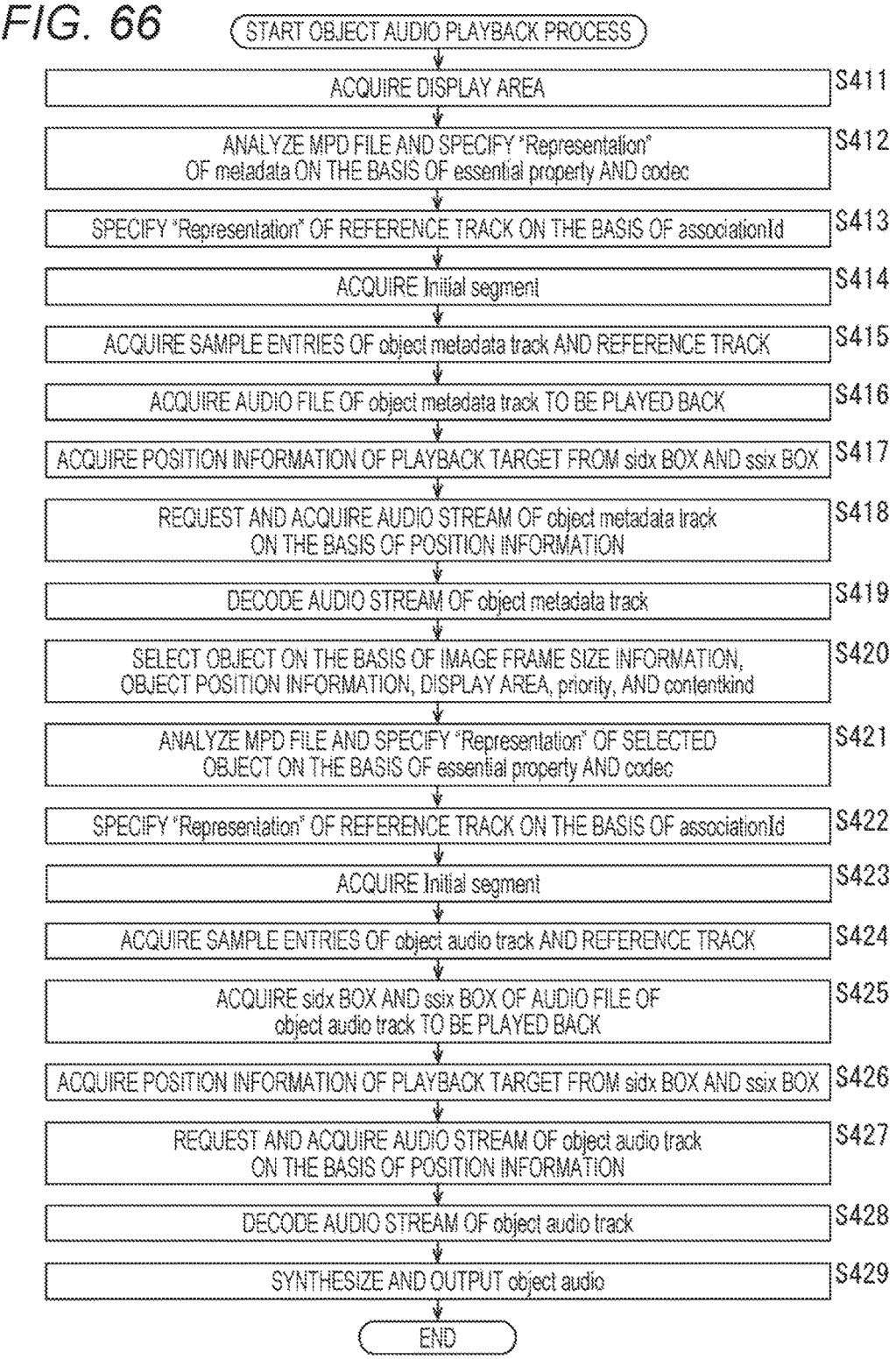
FIG. 66 is a flowchart illustrating a third example of the object audio playback process of the streaming playback unit shown in FIG. 62.

FIG. 66 is a flowchart illustrating the object audio playback process when the audio selection unit 263 selects only the audio object of the predetermined content with a high processing priority among the objects in the display area.

The object audio playback process shown in FIG. 66 is similar to the object audio playback process shown in FIG. 64, except that the process of step S420 shown in FIG. 66 is performed instead of step S360 shown in FIG. 64. Specifically, the process of steps S381 to S389 and steps S391 to S399 shown in FIG. 66 is similar to the process of steps S411 to S419 and steps S421 to S429 shown in FIG. 64. Accordingly, only the process of step S420 will be described below.

In step S420 shown in FIG. 66, the audio file acquisition unit 264 selects the audio object of the predetermined content with a high processing priority in the display area on the basis of the image frame size information, the object position information, the display area, the priority of each object, and the contentkind of each object. Specifically, the audio file acquisition unit 264 specifies each object in the display area on the basis of the image frame size information, the object position information, and the display area. The audio file acquisition unit 264 selects, from among the specified objects, an object that has a priority equal to or higher than a predetermined value and has a contentkind indicated by a predetermined value.

Note that, for example, the MPD processing unit 261 analyzes the MPD file, thereby acquiring the priority and contentkind from "Representation" of the object audio of the specified object. The audio selection unit 263 requests the MPD processing unit 261 to transmit information such as the URL of the audio file of the object audio track of the selected object.

Figure 67:
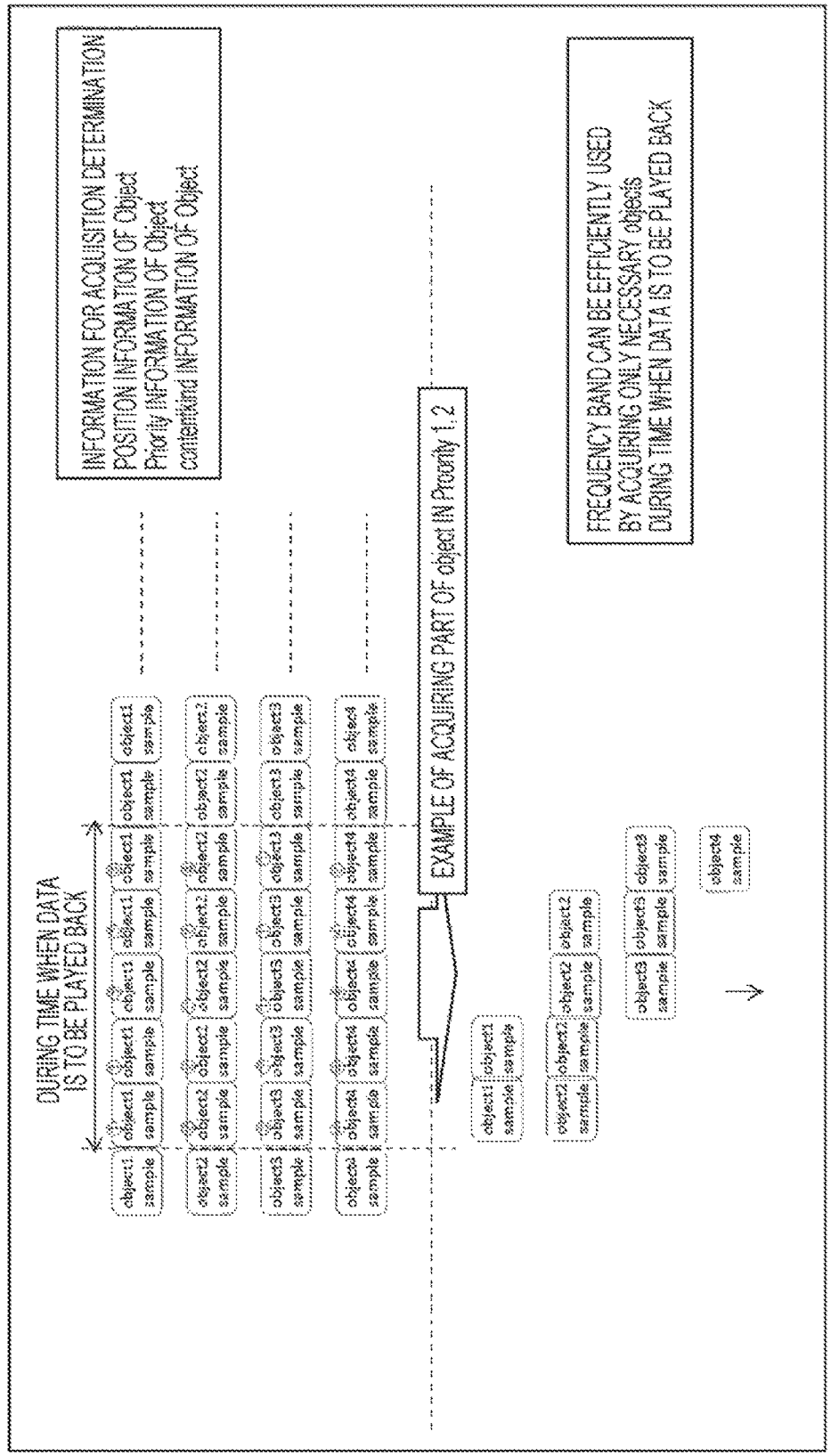
FIG. 67 is a diagram showing an example of an object selected on the basis of a priority.

FIG. 67 is a diagram showing an example of the object selected on the basis of the priority.

In the example of FIG. 67, the objects #1 (object1) to #4 (object4) are objects in the display area, and objects having a priority equal to or lower than 2 are selected from among the objects in the display area. Assume that the smaller the number, the higher the processing priority. Further, in FIG. 67, the circled number represents the value of the priority of the corresponding object.

In the example shown in FIG. 67, when the priorities of the objects #1 to #4 are 1, 2, 3, and 4, respectively, the object #1 and the object #2 are selected. Further, the priorities of the objects #1 to #4 are changed to 3, 2, 1, and 4, respectively, the object #2 and the object #3 are selected. Further, when the priorities of the objects #1 to #4 are changed to 3, 4, 1, and 2, the object #3 and the object #4 are selected.

As described above, only the audio stream of the object audio of objects having a high processing priority are selectively acquired from among the objects in the display area, the frequency band between the Web server 142 (212) and the video playback terminal 144 (214) is efficiently utilized. The same holds true when an object is selected on the basis of the contentkind of the object.

Fifth Embodiment (Outline of Tracks)

Figure 68:
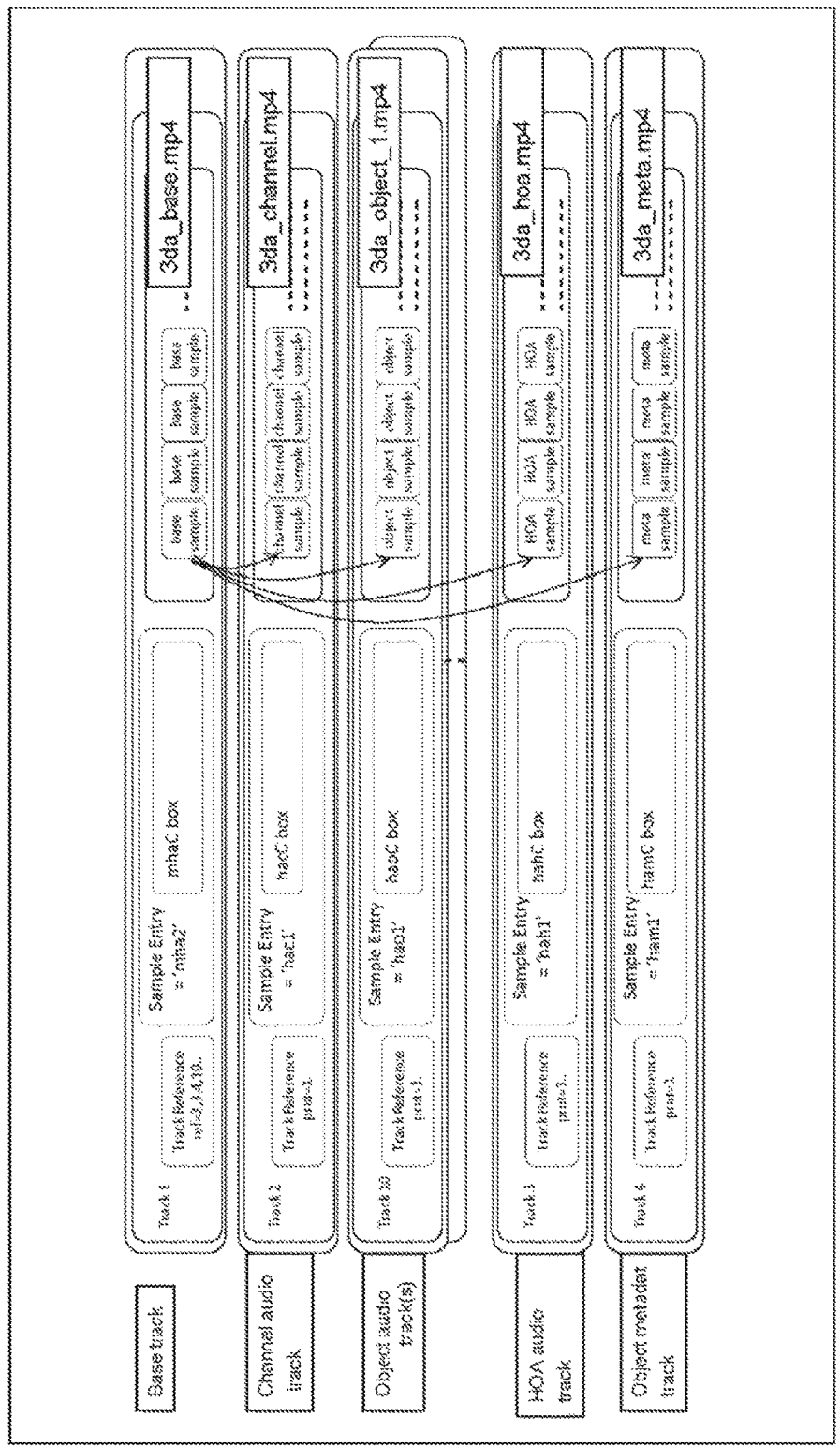
FIG. 68 is a diagram illustrating an outline of tracks in a fifth embodiment to which the present disclosure is applied.

FIG. 68 is a diagram illustrating the outline of tracks in a fifth embodiment to which the present disclosure is applied.

As shown in FIG. 68, the fifth embodiment differs from the second embodiment in that the tracks are recorded as different files (3da_base.mp4/3da_channel.mp4/3da_object_1.mp4/3da_hoa.mp4/3da_meta.mp4).

The information processing system and the process performed by the information processing system according to the fifth embodiment are similar to those of the fourth embodiment, and thus the descriptions thereof are omitted.

Sixth Embodiment

Figure 69:
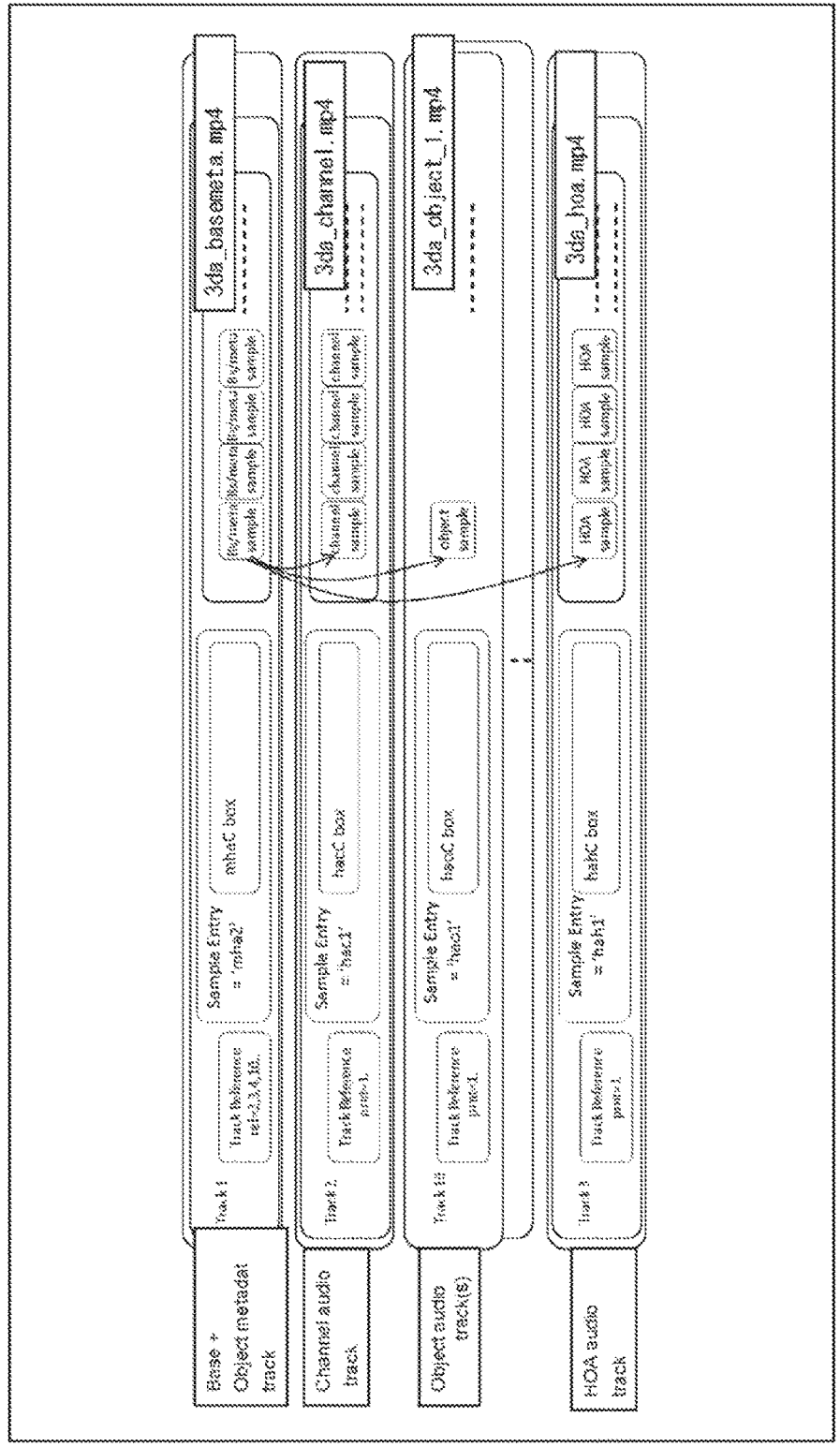
FIG. 69 is a diagram illustrating an outline of tracks in a sixth embodiment to which the present disclosure is applied.

FIG. 69 is a diagram illustrating the outline of tracks in a sixth embodiment to which the present disclosure is applied.

As shown in FIG. 69, the sixth embodiment differs from the third embodiment in that the tracks are recorded as different files (3da_basemeta.mp4/3da_channel.mp4/3da_object_1.mp4/3da_hoa.mp4).

The information processing system and the process performed by the information processing system according to the sixth embodiment are similar to those of the fourth embodiment, except that the audio stream of the Base track is acquired instead of the Object metadata track so as to acquire the object position information. Accordingly, the descriptions thereof are omitted.

Note that also in the first to third embodiments, the fifth embodiment, and the sixth embodiment, an object in the display area can be selected on the basis of the priority or contentkind of the object.

Further, in the first to sixth embodiments, the streaming playback unit may acquire the audio stream of objects outside the display area and synthesize and output the object audio of the objects, like the streaming playback unit 120 shown in FIG. 23.

Further, in the first to sixth embodiments, the object position information is acquired from the metadata, but instead the object position information may be acquired from the MPD file.

Seventh Embodiment (Explanation of Computer to which the Present Disclosure is Applied)

A series of processes of the Web server 142 (212) described above can also be executed by hardware or software. When the series of processes is executed by software, a program constituting the software is installed in a computer. Examples of the computer include a computer incorporated in dedicated hardware and a general-purpose personal computer capable of executing various functions by installing various programs therein.

Figure 70:
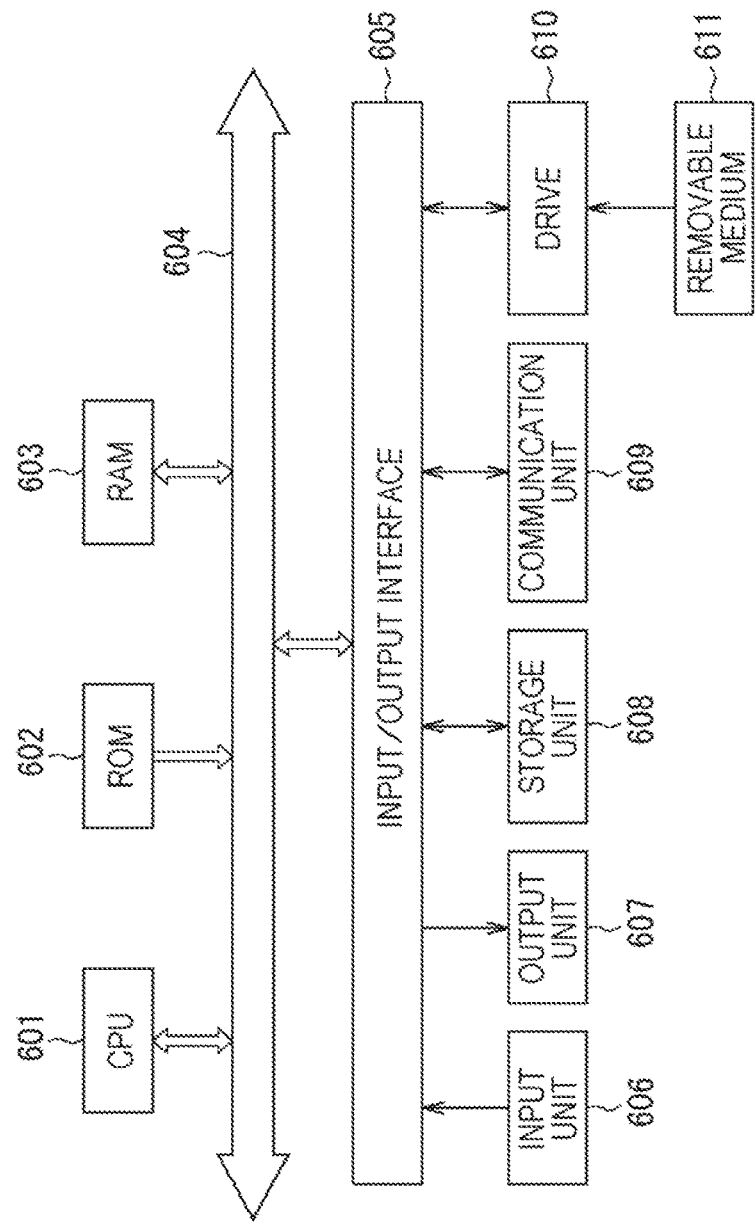
FIG. 70 is a block diagram showing a configuration example of hardware of a computer.

FIG. 70 is a block diagram showing a configuration example of hardware of a computer that executes a series of processes for the Web server 142 (212) by using a program.

In the computer, a central processing unit (CPU) 601, a read only memory (ROM) 602, and a random access memory (RAM) 603 are interconnected via a bus 604.

The bus 604 is also connected to an input/output interface 605. The input/output interface 605 is connected to each of an input unit 606, an output unit 607, a storage unit 608, a communication unit 609, and a drive 610.

The input unit 606 is formed with a keyboard, a mouse, a microphone, and the like. The output unit 607 is formed with a display, a speaker, and the like. The storage unit 608 is formed with hardware, a non-volatile memory, and the like. The communication unit 609 is formed with a network interface and the like. The drive 610 drives a removable medium 611 such as a magnetic disk, an optical disk, a magneto-optical disk, or a semiconductor memory.

In the computer configured as described above, a CPU 601 loads, for example, the program stored in the storage unit 608 in the RAM 603 via the input/output interface 605 and the bus 604, and executes the program, thereby performing the series of processes described above.

The program executed by the computer (CPU 601) can be provided by being recorded in the removable medium 611 serving as, for example, a package medium or the like. In addition, the program can be provided via a wired or wireless transmission medium such as a local area network, the Internet, or digital satellite broadcasting.

The program can be installed in the storage unit 608 via the input/output interface 605 by loading the removable medium 611 in the drive 610. Further, the program can be received by the communication unit 609 and installed in the storage unit 608 via the wired or wireless transmission medium. In addition, the program can be installed in advance in the ROM 602 or the storage unit 608.

Note that the program executed by the computer may be a program which performs the processes in a time series manner in the order described in the present description, or may be a program which performs the processes in parallel or at necessary timings when they are invoked, for example.

The video playback terminal 144 (214) may have a hardware configuration that is similar to that of the computer shown in FIG. 70. In this case, for example, the CPU 601 can execute the control software 161 (221), the video playback software 162 (222), and the access software 163 (223). The process of the video playback terminal 144 (214) may be executed by hardware.

In the present description, a system has the meaning of a set of a plurality of components (such as an apparatus or a module (part)), and does not take into account whether or not all the components are in the same casing. Therefore, the system may be either a plurality of apparatuses, which are stored in separate casings and connected through a network, or a plurality of modules within a single casing.

Note that embodiments of the present disclosure are not limited to the above-described embodiments, and can be modified in various ways without departing from the gist of the present disclosure.

For example, the file generation device 141 (211) may generate the video stream by multiplexing the coded data of all tiles to generate one image file, instead of generating the image file in units of tiles.

The present disclosure can be applied not only to MPEG-H 3D audio, but also to general audio codecs capable of creating a stream for each object.

Further, the present disclosure can also be applied to an information processing system that performs broadcasting and local storage playback, as well as streaming playback.

Furthermore, the present disclosure may have the following configurations.

(1)

An information processing apparatus including an acquisition unit that acquires audio data of a predetermined track in one file in which a plurality of types of audio data are divided into a plurality of tracks depending on the types and the tracks are arranged, the audio data of each track being successively arranged in the file for a predetermined length of time.

(2)

The information processing apparatus according to the above item (1), in which the file is configured in such a manner that the audio data of each track is successively arranged in the file by an amount corresponding to subsegments.

(3)

The information processing apparatus according to the above item (2), in which
the file is configured to be provided with a moof box and a mdat box for each track, and
the audio data corresponding to a subsegment of each track is configured to be arranged in the mdat box of the track.

(4)

The information processing apparatus according to the above item (3), in which the file is configured to include position information indicating a position of the mdat box in the file.

(5)

The information processing apparatus according to the above item (2), in which
the file is configured to be provided with a moof box and an mdat box, the moof box and the mdat box being common to all the tracks, and
the audio data corresponding to subsegments of all the tracks is configured to be arranged in the mdat box.

(6)

The information processing apparatus according to the above item (5), in which the file is configured to include position information indicating a position in the file of the audio data corresponding to a subsegment of each track in the mdat box.

(7)

The information processing apparatus according to any one of the above items (1) to (6), in which the acquisition unit is configured to acquire information indicating a reference relationships between the tracks, the information being arranged in a file different from the file.

(8)

The information processing apparatus according to any one of the above items (1) to (7), in which the acquisition unit is configured to acquire information indicating a priority of the audio data, the information being arranged in a file different from the file.

(9)

The information processing apparatus according to any one of the above items (1) to (8), in which the acquisition unit is configured to acquire information indicating a content of the audio data, the information being arranged in a file different from the file.

(10)

An information processing method including an acquisition step of acquiring, by an information processing apparatus, audio data of a predetermined track in one file in which a plurality of types of audio data are divided into a plurality of tracks depending on the types and the tracks are arranged, the audio data of each track being successively arranged in the file for a predetermined length of time.

(11)

An information processing apparatus including a generation unit that generates one file in which a plurality of types of audio data are divided into a plurality of tracks depending on the types and the tracks are arranged, the audio data of each track being successively arranged in the file for a predetermined length of time.

(12)

An information processing method including a generation step of generating, by an information processing apparatus, one file in which a plurality of types of audio data are divided into a plurality of tracks depending on the types and the tracks are arranged, the audio data of each track being successively arranged in the file for a predetermined length of time.

REFERENCE SIGNS LIST

141 File generation device
144 Moving image playback terminal
172 Audio file generation unit
192 Audio file acquisition unit
193 Audio selection unit
211 File generation device
214 Moving image playback terminal
241 Audio file generation unit
264 Audio file acquisition unit

The invention claimed is:

1. An information processing apparatus, comprising:
a file generation unit configured to:
generate a single audio stream which has a structure divided into a plurality of tracks for each type of a plurality of audio data items, wherein each type of the plurality of audio data items is different;
generate an audio file that includes the single audio stream; and
generate a plurality of files in unit of segment for each track of the single audio stream, wherein the plurality of files includes data associated with each track of the plurality of tracks,
wherein the data associated with each track of the plurality of tracks is successively arranged in the generated plurality of files,
wherein a time duration associated with each of the plurality of files is a specific length of time, and
wherein each of the plurality of files includes:
a moof box, and
a mdat box.

2. The information processing apparatus according to claim 1,
wherein the plurality of audio data items corresponds to a Channel audio, an Object audio, a higher-order ambisonic (HOA) audio, and metadata.

3. The information processing apparatus according to claim 1,
wherein the data corresponding to a specific file of the plurality of files is arranged in the mdat box of the specific file of the plurality of files, and
wherein the plurality of files further includes position information that indicates a position of the mdat box in each file of the plurality of files.

4. The information processing apparatus according to claim 1,
wherein the moof box and the mdat box are common to the plurality of tracks,
wherein the data corresponding to a specific file of the plurality of files is arranged in the mdat box of the specific file, and
wherein the plurality of files further includes position information indicating a position of the data corresponding to the specific file of the plurality of files.

5. The information processing apparatus according to claim 1, further comprising a control file generation unit configured to generate a control file which includes first information that indicates a reference relationship between the plurality of tracks.

6. The information processing apparatus according to claim 1, further comprising a storage unit configured to arrange second information as a single track, wherein the second information corresponds to the single audio stream.

7. The information processing apparatus according to claim 1, wherein the file generation unit is further configured to arrange second information as a base track that is different from the plurality of tracks, and wherein the second information corresponds to the single audio stream.

8. The information processing apparatus according to claim 7, further comprising a media presentation description (MPD) generation unit configured to generate an MPD file,
wherein third information to access the plurality of tracks and fourth information on audio stream for each type of the plurality of audio data items are stored in SubRepresentation field of the generated MPD file.

9. The information processing apparatus according to claim 8, wherein the fourth information includes a reference relationship between a first track of the plurality of tracks and a second track of the plurality of tracks.

10. The information processing apparatus according to claim 8, wherein the fourth information includes object position information for a plurality of objects that are inputted corresponding to the single audio stream.

* * * * *